US008210930B2

(12) United States Patent
Graham et al.

(10) Patent No.: US 8,210,930 B2

(45) Date of Patent: Jul. 3, 2012

(54) SERVER BASED GAMING SYSTEM HAVING SYSTEM TRIGGERED LOYALTY AWARD SEQUENCES

(75) Inventors: Jacob Graham, Reno, NV (US); Greg Schlottmann, Sparks, NV (US); Michael N. Low, Sparks, NV (US); Anthony J. Baerlocher, Reno, NV (US); Richard J. Schneider, Las Vegas, NV (US); Cara L. Iddings, Henderson, NV (US)

(73) Assignee: IGT, Reno, NV (US)

( * ) Notice: Subject to any disclaimer, the term of this patent is extended or adjusted under 35 U.S.C. 154(b) by 1239 days.

(21) Appl. No.: 11/830,115

(22) Filed: Jul. 30, 2007

(65) Prior Publication Data

US 2008/0076576 A1 Mar. 27, 2008

Related U.S. Application Data

(63) Continuation of application No. 11/558,256, filed on Nov. 9, 2006, now Pat. No. 7,674,180, which is a continuation-in-part of application No. 11/535,815, filed on Sep. 27, 2006, now Pat. No. 7,862,430.

(51) Int. Cl.
*A63F 13/00* (2006.01)

(52) U.S. Cl. ............................... 463/25; 463/20; 463/42

(58) Field of Classification Search .................... 463/16, 463/20, 21, 23, 25, 29, 42
See application file for complete search history.

(56) References Cited

U.S. PATENT DOCUMENTS 4,236,717 A 12/1980 Wichinsky
4,335,809 A 6/1982 Wain
4,572,509 A 2/1986 Sitrick
4,652,998 A 3/1987 Koza et al.
4,842,278 A 6/1989 Markowicz
4,856,787 A 8/1989 Itkis
4,866,515 A 9/1989 Tagawa et al.
4,924,378 A 5/1990 Hershey et al.
5,116,055 A 5/1992 Tracy
5,138,712 A 8/1992 Corbin
5,142,622 A 8/1992 Owens
5,179,517 A 1/1993 Sarbin et al.

(Continued)

FOREIGN PATENT DOCUMENTS

EP 0843272 5/1998

(Continued)

OTHER PUBLICATIONS

International Search Report dated Feb. 27, 2010 for Macau Patent Application No. I/00796 (104).

(Continued)

*Primary Examiner* — James S McClellan

(74) *Attorney, Agent, or Firm* — Neal, Gerber & Eisenberg LLP

(57) ABSTRACT

A gaming system including a central server linked to a plurality of gaming machines. In one embodiment, the gaming system provides players with one or more loyalty incentives, such as one or more loyalty awards, utilizing one or more loyalty incentive award sequences. In one embodiment, the gaming system determines a loyalty award to provide to a player and then determines an appropriate loyalty award sequence to utilize to provide the player the determined loyalty award, wherein the loyalty award sequence is determined based on the individual gaming device that the player is currently playing.

41 Claims, 14 Drawing Sheets

U.S. PATENT DOCUMENTS

| | | | |
|---|---|---|---|
| 5,265,874 | A | 11/1993 | Dickinson et al. |
| 5,276,312 | A | 1/1994 | McCarthy |
| 5,288,978 | A | 2/1994 | Iijima |
| 5,290,033 | A | 3/1994 | Bittner et al. |
| 5,305,195 | A | 4/1994 | Murphy |
| 5,344,144 | A | 9/1994 | Canon |
| 5,349,642 | A | 9/1994 | Kingdon |
| 5,375,206 | A | 12/1994 | Hunter et al. |
| 5,377,993 | A | 1/1995 | Josephs |
| 5,404,567 | A | 4/1995 | DePietro et al. |
| 5,429,361 | A | 7/1995 | Raven et al. |
| 5,430,791 | A | 7/1995 | Feit et al. |
| 5,438,508 | A | 8/1995 | Wyman |
| 5,470,079 | A | 11/1995 | LeStrange et al. |
| 5,476,259 | A | 12/1995 | Weingardt |
| 5,499,340 | A | 3/1996 | Barritz |
| 5,507,491 | A | 4/1996 | Gatto et al. |
| 5,511,781 | A | 4/1996 | Wood et al. |
| 5,530,232 | A | 6/1996 | Taylor |
| 5,559,313 | A | 9/1996 | Claus et al. |
| 5,560,603 | A | 10/1996 | Seelig et al. |
| 5,564,700 | A | 10/1996 | Celona |
| 5,566,337 | A | 10/1996 | Szymanski et al. |
| 5,578,808 | A | 11/1996 | Taylor |
| 5,586,257 | A | 12/1996 | Perlman |
| 5,586,937 | A | 12/1996 | Menashe |
| 5,617,331 | A | 4/1997 | Wakai et al. |
| 5,626,341 | A | 5/1997 | Jones et al. |
| 5,630,757 | A | 5/1997 | Gagin et al. |
| 5,640,192 | A | 6/1997 | Garfinkle |
| 5,643,086 | A | 7/1997 | Alcorn et al. |
| 5,649,118 | A | 7/1997 | Carlisle et al. |
| 5,655,603 | A | 8/1997 | Schulte et al. |
| 5,655,961 | A | 8/1997 | Acres et al. |
| 5,664,998 | A | 9/1997 | Seelig et al. |
| 5,671,412 | A | 9/1997 | Christiano |
| 5,702,304 | A | 12/1997 | Acres et al. |
| 5,708,709 | A | 1/1998 | Rose |
| 5,717,604 | A | 2/1998 | Wiggins |
| 5,741,183 | A | 4/1998 | Acres et al. |
| 5,745,879 | A | 4/1998 | Wyman |
| 5,752,882 | A | 5/1998 | Acres et al. |
| 5,755,621 | A | 5/1998 | Marks et al. |
| 5,758,069 | A | 5/1998 | Olsen |
| 5,759,102 | A | 6/1998 | Pease et al. |
| 5,762,552 | A | 6/1998 | Vuong et al. |
| 5,766,076 | A | 6/1998 | Pease et al. |
| 5,768,382 | A | 6/1998 | Schneier et al. |
| 5,779,545 | A | 7/1998 | Berg et al. |
| 5,779,549 | A | 7/1998 | Walker et al. |
| 5,800,268 | A | 9/1998 | Molnick |
| 5,806,855 | A | 9/1998 | Cherry |
| 5,820,459 | A | 10/1998 | Acres et al. |
| 5,828,840 | A | 10/1998 | Cowan et al. |
| 5,833,538 | A | 11/1998 | Weiss |
| 5,833,540 | A | 11/1998 | Miodunski et al. |
| 5,836,817 | A | 11/1998 | Acres et al. |
| 5,845,283 | A | 12/1998 | Williams et al. |
| 5,851,011 | A | 12/1998 | Loff |
| 5,851,149 | A | 12/1998 | Xidos et al. |
| 5,855,515 | A | 1/1999 | Pease et al. |
| 5,871,398 | A | 2/1999 | Schneier et al. |
| 5,876,284 | A | 3/1999 | Acres et al. |
| 5,885,158 | A | 3/1999 | Torango et al. |
| 5,903,732 | A | 5/1999 | Reed et al. |
| 5,905,248 | A | 5/1999 | Russell et al. |
| 5,913,164 | A | 6/1999 | Pawa et al. |
| 5,917,725 | A | 6/1999 | Thacher et al. |
| 5,918,039 | A | 6/1999 | Buswell et al. |
| 5,925,127 | A | 7/1999 | Ahmad |
| 5,941,769 | A | 8/1999 | Order |
| 5,941,773 | A | 8/1999 | Harlick |
| 5,947,822 | A | 9/1999 | Weiss |
| 5,951,611 | A | 9/1999 | La Pierre |
| 5,971,271 | A | 10/1999 | Wynn et al. |
| 5,971,849 | A | 10/1999 | Falciglia |
| 5,974,409 | A | 10/1999 | Sanu et al. |
| 5,980,093 | A | 11/1999 | Jones et al. |
| 5,983,190 | A | 11/1999 | Trower, II et al. |
| 5,991,760 | A | 11/1999 | Gauvin et al. |
| 5,991,790 | A | 11/1999 | Shah et al. |
| 5,996,068 | A | 11/1999 | Dwyer, III et al. |
| 5,997,401 | A | 12/1999 | Crawford |
| 5,999,808 | A | 12/1999 | LaDue |
| 6,001,016 | A | 12/1999 | Walker et al. |
| 6,003,066 | A | 12/1999 | Ryan et al. |
| 6,003,094 | A | 12/1999 | Dean |
| 6,003,123 | A | 12/1999 | Carter et al. |
| 6,011,850 | A | 1/2000 | Bertrand et al. |
| 6,012,832 | A | 1/2000 | Saunders et al. |
| 6,024,640 | A | 2/2000 | Walker et al. |
| 6,048,269 | A | 4/2000 | Burns et al. |
| 6,068,552 | A | 5/2000 | Walker et al. |
| 6,068,982 | A | 5/2000 | Rolfe et al. |
| 6,071,190 | A | 6/2000 | Weiss et al. |
| 6,085,247 | A | 7/2000 | Parsons, Jr. et al. |
| 6,089,975 | A | 7/2000 | Dunn |
| 6,089,982 | A | 7/2000 | Holch et al. |
| 6,099,408 | A | 8/2000 | Schneier et al. |
| 6,106,396 | A | 8/2000 | Alcorn et al. |
| 6,108,420 | A | 8/2000 | Larose et al. |
| 6,110,041 | A | 8/2000 | Walker et al. |
| 6,113,098 | A | 9/2000 | Adams |
| 6,113,495 | A | 9/2000 | Walker et al. |
| 6,117,013 | A | 9/2000 | Eiba |
| 6,135,884 | A | 10/2000 | Hendrick et al. |
| 6,135,887 | A | 10/2000 | Pease et al. |
| 6,141,737 | A | 10/2000 | Krantz et al. |
| 6,142,872 | A | 11/2000 | Walker et al. |
| 6,149,522 | A | 11/2000 | Alcorn et al. |
| 6,151,707 | A | 11/2000 | Hecksel et al. |
| 6,162,122 | A | 12/2000 | Acres et al. |
| 6,206,782 | B1 | 3/2001 | Walker et al. |
| 6,213,877 | B1 | 4/2001 | Walker et al. |
| 6,217,448 | B1 | 4/2001 | Olsen |
| 6,219,836 | B1 | 4/2001 | Wells et al. |
| 6,224,486 | B1 | 5/2001 | Walker et al. |
| 6,227,969 | B1 | 5/2001 | Yoseloff |
| 6,241,608 | B1 | 6/2001 | Torango |
| 6,244,958 | B1 | 6/2001 | Acres |
| 6,251,014 | B1 | 6/2001 | Stockdale et al. |
| 6,254,483 | B1 | 7/2001 | Acres |
| 6,257,981 | B1 | 7/2001 | Acres et al. |
| 6,264,561 | B1 | 7/2001 | Saffari et al. |
| 6,267,671 | B1 | 7/2001 | Hogan |
| 6,270,412 | B1 | 8/2001 | Crawford et al. |
| 6,287,200 | B1 | 9/2001 | Sharma |
| 6,287,202 | B1 | 9/2001 | Pascal et al. |
| 6,293,866 | B1 | 9/2001 | Walker et al. |
| 6,302,793 | B1 | 10/2001 | Fertitta, III et al. |
| 6,304,905 | B1 | 10/2001 | Clark |
| 6,308,271 | B2 | 10/2001 | Tanaka |
| 6,312,332 | B1 | 11/2001 | Walker et al. |
| 6,312,333 | B1 | 11/2001 | Acres |
| 6,319,122 | B1 | 11/2001 | Packes, Jr. et al. |
| 6,319,125 | B1 | 11/2001 | Acres |
| 6,328,649 | B1 | 12/2001 | Randall et al. |
| 6,345,386 | B1 | 2/2002 | Delo et al. |
| 6,353,928 | B1 | 3/2002 | Altberg et al. |
| 6,354,946 | B1 | 3/2002 | Finn |
| 6,358,147 | B1 | 3/2002 | Jaffe et al. |
| 6,358,150 | B1 | 3/2002 | Mir et al. |
| 6,361,437 | B1 | 3/2002 | Walker et al. |
| 6,361,441 | B1 | 3/2002 | Walker et al. |
| 6,364,314 | B1 | 4/2002 | Canterbury |
| 6,368,216 | B1 | 4/2002 | Hedrick et al. |
| 6,371,852 | B1 | 4/2002 | Acres |
| 6,383,074 | B1 | 5/2002 | Boggs |
| 6,389,538 | B1 | 5/2002 | Gruse et al. |
| 6,389,589 | B1 | 5/2002 | Mishra et al. |
| 6,394,907 | B1 | 5/2002 | Rowe |
| 6,397,381 | B1 | 5/2002 | Delo et al. |
| 6,398,643 | B1 | 6/2002 | Knowles et al. |
| 6,402,614 | B1 | 6/2002 | Schneier et al. |
| 6,409,602 | B1 | 6/2002 | Wiltshire et al. |
| 6,418,554 | B1 | 7/2002 | Delo et al. |
| 6,419,578 | B1 | 7/2002 | Moody et al. |

| | | | |
|---|---|---|---|
| 6,425,828 | B2 | 7/2002 | Walker et al. |
| 6,427,227 | B1 | 7/2002 | Chamberlain |
| 6,431,983 | B2 | 8/2002 | Acres |
| 6,439,996 | B2 | 8/2002 | LeMay et al. |
| 6,442,529 | B1 | 8/2002 | Krishan et al. |
| 6,443,452 | B1 | 9/2002 | Brune |
| 6,443,839 | B2 | 9/2002 | Stockdale et al. |
| 6,450,887 | B1 | 9/2002 | Mir et al. |
| 6,454,649 | B1 | 9/2002 | Mattice et al. |
| 6,457,175 | B1 | 9/2002 | Lerche |
| RE37,885 | E | 10/2002 | Acres et al. |
| 6,464,581 | B1 | 10/2002 | Yoseloff et al. |
| 6,485,367 | B1 | 11/2002 | Joshi |
| 6,488,585 | B1 | 12/2002 | Wells et al. |
| 6,503,146 | B2 | 1/2003 | Walker et al. |
| 6,506,118 | B1 | 1/2003 | Baerlocher et al. |
| 6,508,710 | B1 | 1/2003 | Paravia et al. |
| 6,523,166 | B1 | 2/2003 | Mishra et al. |
| 6,527,638 | B1 | 3/2003 | Walker et al. |
| 6,532,543 | B1 | 3/2003 | Smith et al. |
| 6,533,664 | B1 | 3/2003 | Crumby |
| 6,558,255 | B2 | 5/2003 | Walker et al. |
| 6,565,434 | B1 | 5/2003 | Acres |
| 6,575,832 | B1 | 6/2003 | Manfredi et al. |
| 6,578,199 | B1 | 6/2003 | Tsou et al. |
| 6,592,457 | B1 | 7/2003 | Frohm et al. |
| 6,595,856 | B1 | 7/2003 | Ginsburg et al. |
| 6,607,439 | B2 | 8/2003 | Schneier et al. |
| 6,609,978 | B1 | 8/2003 | Paulsen |
| 6,620,047 | B1 | 9/2003 | Alcorn et al. |
| 6,628,939 | B2 | 9/2003 | Paulsen |
| 6,638,167 | B1 | 10/2003 | Sawyer et al. |
| 6,638,170 | B1 | 10/2003 | Crumby |
| 6,645,077 | B2 | 11/2003 | Rowe |
| 6,656,046 | B1 | 12/2003 | Yoseloff et al. |
| 6,656,048 | B2 | 12/2003 | Olsen |
| 6,676,512 | B2 | 1/2004 | Fong et al. |
| 6,682,423 | B2 | 1/2004 | Brosnan et al. |
| 6,685,567 | B2 | 2/2004 | Cockerille et al. |
| 6,692,355 | B2 | 2/2004 | Baerlocher et al. |
| 6,699,124 | B2 | 3/2004 | Suchocki |
| 6,712,697 | B2 | 3/2004 | Acres |
| 6,712,699 | B2 | 3/2004 | Walker et al. |
| 6,712,702 | B2 | 3/2004 | Goldberg et al. |
| 6,722,986 | B1 | 4/2004 | Lyons et al. |
| 6,726,563 | B1 | 4/2004 | Baerlocher et al. |
| 6,729,957 | B2 | 5/2004 | Burns et al. |
| 6,729,958 | B2 | 5/2004 | Burns et al. |
| 6,733,390 | B2 | 5/2004 | Walker et al. |
| 6,736,725 | B2 | 5/2004 | Burns et al. |
| 6,746,327 | B2 | 6/2004 | Frohm et al. |
| 6,749,510 | B2 | 6/2004 | Giobbi |
| 6,755,742 | B1 | 6/2004 | Hartman et al. |
| 6,758,749 | B2 | 7/2004 | Krintzman |
| 6,782,477 | B2 | 8/2004 | McCarroll |
| 6,790,141 | B2 | 9/2004 | Muir |
| 6,790,142 | B2 | 9/2004 | Okada et al. |
| 6,790,143 | B2 | 9/2004 | Crumby |
| 6,800,030 | B2 | 10/2004 | Acres |
| 6,802,774 | B1 | 10/2004 | Carlson et al. |
| 6,802,778 | B1 | 10/2004 | LeMay et al. |
| 6,804,763 | B1 | 10/2004 | Stockdale et al. |
| 6,805,349 | B2 | 10/2004 | Baerlocher et al. |
| 6,805,634 | B1 | 10/2004 | Wells et al. |
| 6,811,488 | B2 | 11/2004 | Paravia et al. |
| 6,813,765 | B1 | 11/2004 | Flores |
| 6,816,882 | B1 | 11/2004 | Conner et al. |
| 6,823,456 | B1 | 11/2004 | Dan et al. |
| 6,824,465 | B2 | 11/2004 | Luciano, Jr. |
| 6,830,515 | B2 | 12/2004 | Rowe |
| 6,832,958 | B2 | 12/2004 | Acres et al. |
| 6,834,245 | B2 | 12/2004 | Ota et al. |
| 6,836,794 | B1 | 12/2004 | Lucovsky et al. |
| 6,843,723 | B2 | 1/2005 | Joshi |
| 6,843,725 | B2 | 1/2005 | Nelson |
| 6,846,238 | B2 | 1/2005 | Wells |
| 6,848,995 | B1 | 2/2005 | Walker et al. |
| 6,852,031 | B1 | 2/2005 | Rowe |
| 6,855,054 | B2 | 2/2005 | White et al. |

| | | | |
|---|---|---|---|
| 6,855,057 | B2 | 2/2005 | Namba et al. |
| 6,857,959 | B1 | 2/2005 | Nguyen |
| 6,863,608 | B1 | 3/2005 | LeMay et al. |
| 6,866,581 | B2 | 3/2005 | Martinek et al. |
| 6,866,584 | B2 | 3/2005 | Michaelson |
| 6,866,586 | B2 | 3/2005 | Oberberger et al. |
| 6,869,360 | B2 | 3/2005 | Marks et al. |
| 6,875,109 | B2 | 4/2005 | Stockdale |
| 6,875,110 | B1 | 4/2005 | Crumby |
| 6,878,063 | B2 | 4/2005 | Manfredi et al. |
| 6,884,162 | B2 | 4/2005 | Raverdy et al. |
| 6,884,166 | B2 | 4/2005 | Leen et al. |
| 6,884,170 | B2 | 4/2005 | Rowe |
| 6,884,171 | B2 | 4/2005 | Eck et al. |
| 6,884,173 | B2 | 4/2005 | Gauselmann |
| 6,884,174 | B2 | 4/2005 | Lundy et al. |
| 6,887,151 | B2 | 5/2005 | Leen et al. |
| 6,887,156 | B2 | 5/2005 | DeWeese et al. |
| 6,889,159 | B2 | 5/2005 | Klotz et al. |
| 6,890,256 | B2 | 5/2005 | Walker et al. |
| 6,892,182 | B1 | 5/2005 | Rowe et al. |
| 6,896,616 | B2 | 5/2005 | Weiss |
| 6,896,618 | B2 | 5/2005 | Benoy et al. |
| 6,899,627 | B2 | 5/2005 | Lam et al. |
| 6,899,628 | B2 | 5/2005 | Leen et al. |
| 6,901,375 | B2 | 5/2005 | Fernandez |
| 6,902,481 | B2 | 6/2005 | Breckner et al. |
| 6,905,406 | B2 | 6/2005 | Kaminkow et al. |
| 6,905,411 | B2 | 6/2005 | Nguyen et al. |
| 6,908,391 | B2 | 6/2005 | Gatto et al. |
| 6,910,965 | B2 | 6/2005 | Downes |
| 6,923,721 | B2 | 8/2005 | Luciano et al. |
| 6,929,952 | B2 | 8/2005 | Baerlocher |
| 6,939,234 | B2 | 9/2005 | Beatty |
| 6,942,571 | B1 | 9/2005 | McAllister et al. |
| 6,945,870 | B2 | 9/2005 | Gatto et al. |
| 6,955,600 | B2 | 10/2005 | Glavich et al. |
| 6,969,319 | B2 | 11/2005 | Rowe et al. |
| 6,991,544 | B2 | 1/2006 | Soltys et al. |
| 6,997,807 | B2 | 2/2006 | Weiss |
| 7,008,321 | B2 | 3/2006 | Rowe et al. |
| 7,025,674 | B2 | 4/2006 | Adams et al. |
| 7,040,985 | B2 | 5/2006 | Vancura |
| 7,051,004 | B2 | 5/2006 | Nuttall et al. |
| 7,063,617 | B2 | 6/2006 | Brosnan et al. |
| 7,066,814 | B2 | 6/2006 | Glavich et al. |
| 7,070,501 | B2 | 7/2006 | Cormack et al. |
| 7,070,503 | B2 | 7/2006 | Rudolph |
| 7,074,127 | B2 | 7/2006 | Cuddy et al. |
| 7,081,050 | B2 | 7/2006 | Tarantino |
| 7,086,947 | B2 | 8/2006 | Walker et al. |
| 7,094,149 | B2 | 8/2006 | Walker et al. |
| 7,291,068 | B2 | 11/2007 | Bryant et al. |
| 7,318,774 | B2 | 1/2008 | Bryant et al. |
| 7,500,913 | B2 | 3/2009 | Baerlocher |
| 7,585,222 | B2 | 9/2009 | Muir |
| 2001/0018361 | A1 | 8/2001 | Acres |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0055990 | A1 | 12/2001 | Acres |
| 2002/0032049 | A1 | 3/2002 | Walker et al. |
| 2002/0034977 | A1 | 3/2002 | Burns et al. |
| 2002/0045484 | A1 | 4/2002 | Eck et al. |
| 2002/0057800 | A1 | 5/2002 | Gordon et al. |
| 2002/0058546 | A2 | 5/2002 | Acres |
| 2002/0068629 | A1 | 6/2002 | Allen et al. |
| 2002/0068631 | A1 | 6/2002 | Raverdy et al. |
| 2002/0071557 | A1 | 6/2002 | Nguyen |
| 2002/0071560 | A1 | 6/2002 | Kurn et al. |
| 2002/0080969 | A1 | 6/2002 | Giobbi |
| 2002/0116615 | A1 | 8/2002 | Nguyen et al. |
| 2002/0123376 | A1 | 9/2002 | Walker et al. |
| 2002/0137217 | A1 | 9/2002 | Rowe |
| 2002/0138594 | A1 | 9/2002 | Rowe |
| 2002/0144116 | A1 | 10/2002 | Giobbi |
| 2002/0151356 | A1 | 10/2002 | Burns et al. |
| 2002/0151360 | A1 | 10/2002 | Durham et al. |
| 2002/0160826 | A1 | 10/2002 | Gomez et al. |

| | | | |
|---|---|---|---|
| 2002/0169022 | A1 | 11/2002 | Canterbury |
| 2002/0173355 | A1 | 11/2002 | Walker et al. |
| 2002/0174160 | A1 | 11/2002 | Gatto et al. |
| 2002/0174444 | A1 | 11/2002 | Gatto et al. |
| 2002/0177483 | A1 | 11/2002 | Cannon |
| 2002/0188940 | A1 | 12/2002 | Breckner et al. |
| 2003/0027638 | A1 | 2/2003 | Schneider et al. |
| 2003/0045351 | A1 | 3/2003 | Gauselmann |
| 2003/0045354 | A1 | 3/2003 | Giobbi |
| 2003/0054879 | A1 | 3/2003 | Schneier et al. |
| 2003/0060286 | A1 | 3/2003 | Walker et al. |
| 2003/0064771 | A1 | 4/2003 | Morrow et al. |
| 2003/0064807 | A1 | 4/2003 | Walker et al. |
| 2003/0069058 | A1 | 4/2003 | Byrne et al. |
| 2003/0073497 | A1 | 4/2003 | Nelson |
| 2003/0078094 | A1 | 4/2003 | Gatto et al. |
| 2003/0078101 | A1 | 4/2003 | Schneider et al. |
| 2003/0083943 | A1 | 5/2003 | Adams et al. |
| 2003/0092489 | A1 | 5/2003 | Veradej |
| 2003/0093669 | A1 | 5/2003 | Morais et al. |
| 2003/0100359 | A1 | 5/2003 | Loose et al. |
| 2003/0100369 | A1 | 5/2003 | Gatto et al. |
| 2003/0100370 | A1 | 5/2003 | Gatto et al. |
| 2003/0100371 | A1 | 5/2003 | Gatto et al. |
| 2003/0100372 | A1 | 5/2003 | Gatto et al. |
| 2003/0104854 | A1 | 6/2003 | Cannon |
| 2003/0115351 | A1 | 6/2003 | Giobbi |
| 2003/0140134 | A1 | 7/2003 | Swanson et al. |
| 2003/0162589 | A1 | 8/2003 | Nguyen et al. |
| 2003/0171145 | A1 | 9/2003 | Rowe |
| 2003/0171149 | A1 | 9/2003 | Rothschild |
| 2003/0176219 | A1 | 9/2003 | Manfredi et al. |
| 2003/0181231 | A1 | 9/2003 | Vancura et al. |
| 2003/0188306 | A1 | 10/2003 | Harris et al. |
| 2003/0190941 | A1 | 10/2003 | Byrne |
| 2003/0195033 | A1 | 10/2003 | Gazdic et al. |
| 2003/0212597 | A1 | 11/2003 | Ollins |
| 2003/0216182 | A1 | 11/2003 | Gauselmann |
| 2003/0224852 | A1 | 12/2003 | Walker et al. |
| 2003/0228904 | A1 | 12/2003 | Acres et al. |
| 2003/0228907 | A1 | 12/2003 | Gatto et al. |
| 2003/0228912 | A1 | 12/2003 | Wells et al. |
| 2003/0232650 | A1 | 12/2003 | Beatty |
| 2004/0002379 | A1 | 1/2004 | Parrott et al. |
| 2004/0002381 | A1 | 1/2004 | Alcorn et al. |
| 2004/0002385 | A1 | 1/2004 | Nguyen |
| 2004/0003389 | A1 | 1/2004 | Reynar et al. |
| 2004/0005919 | A1 | 1/2004 | Walker et al. |
| 2004/0010700 | A1 | 1/2004 | Mont |
| 2004/0015423 | A1 | 1/2004 | Walker et al. |
| 2004/0023721 | A1 | 2/2004 | Giobbi |
| 2004/0024666 | A1 | 2/2004 | Walker et al. |
| 2004/0029635 | A1 | 2/2004 | Giobbi |
| 2004/0038723 | A1 | 2/2004 | Schneier et al. |
| 2004/0048650 | A1 | 3/2004 | Mierau et al. |
| 2004/0048660 | A1 | 3/2004 | Gentles et al. |
| 2004/0048667 | A1 | 3/2004 | Rowe |
| 2004/0053664 | A1 | 3/2004 | Byrne |
| 2004/0054952 | A1 | 3/2004 | Morrow et al. |
| 2004/0063489 | A1 | 4/2004 | Crumby |
| 2004/0072604 | A1 | 4/2004 | Toyoda |
| 2004/0072608 | A1 | 4/2004 | Toyoda |
| 2004/0082385 | A1 | 4/2004 | Silva et al. |
| 2004/0092310 | A1 | 5/2004 | Brosnan et al. |
| 2004/0097280 | A1 | 5/2004 | Gauselmann |
| 2004/0098597 | A1 | 5/2004 | Giobbi |
| 2004/0106452 | A1 | 6/2004 | Nguyen et al. |
| 2004/0110557 | A1 | 6/2004 | Rowe |
| 2004/0124243 | A1 | 7/2004 | Gatto et al. |
| 2004/0127279 | A1 | 7/2004 | Gatto et al. |
| 2004/0132532 | A1 | 7/2004 | Brosnan et al. |
| 2004/0133485 | A1 | 7/2004 | Schoonmaker et al. |
| 2004/0142739 | A1 | 7/2004 | Loose et al. |
| 2004/0142742 | A1 | 7/2004 | Schneider et al. |
| 2004/0142743 | A1 | 7/2004 | Oliver |
| 2004/0152509 | A1 | 8/2004 | Hornik et al. |
| 2004/0162144 | A1 | 8/2004 | Loose et al. |
| 2004/0166923 | A1 | 8/2004 | Michaelson et al. |
| 2004/0166931 | A1 | 8/2004 | Criss-Puszkiewicz et al. |

| | | | |
|---|---|---|---|
| 2004/0166940 | A1 | 8/2004 | Rothschild |
| 2004/0166942 | A1 | 8/2004 | Muir |
| 2004/0176162 | A1 | 9/2004 | Rothschild |
| 2004/0176167 | A1 | 9/2004 | Michaelson et al. |
| 2004/0179701 | A1 | 9/2004 | Boyd |
| 2004/0180721 | A1 | 9/2004 | Rowe |
| 2004/0180722 | A1 | 9/2004 | Giobbi |
| 2004/0185936 | A1 | 9/2004 | Block et al. |
| 2004/0193726 | A1 | 9/2004 | Gatto et al. |
| 2004/0198494 | A1 | 10/2004 | Nguyen et al. |
| 2004/0198496 | A1 | 10/2004 | Gatto et al. |
| 2004/0204244 | A1 | 10/2004 | Rathsack et al. |
| 2004/0214622 | A1 | 10/2004 | Atkinson |
| 2004/0214627 | A1 | 10/2004 | Jordan et al. |
| 2004/0214640 | A1 | 10/2004 | Giobbi |
| 2004/0214641 | A1 | 10/2004 | Giobbi |
| 2004/0215756 | A1 | 10/2004 | VanAntwerp et al. |
| 2004/0219967 | A1 | 11/2004 | Giobbi et al. |
| 2004/0219983 | A1 | 11/2004 | Giobbi |
| 2004/0224770 | A1 | 11/2004 | Wolf et al. |
| 2004/0229684 | A1 | 11/2004 | Blackburn et al. |
| 2004/0229698 | A1 | 11/2004 | Lind et al. |
| 2004/0229699 | A1 | 11/2004 | Gentles et al. |
| 2004/0235559 | A1 | 11/2004 | Brosnan et al. |
| 2004/0235563 | A1 | 11/2004 | Blackburn et al. |
| 2004/0242298 | A1 | 12/2004 | Inamura et al. |
| 2004/0242328 | A1 | 12/2004 | Blackburn et al. |
| 2004/0242329 | A1 | 12/2004 | Blackburn et al. |
| 2004/0242330 | A1 | 12/2004 | Blackburn et al. |
| 2004/0242331 | A1 | 12/2004 | Blackburn et al. |
| 2004/0243848 | A1 | 12/2004 | Blackburn et al. |
| 2004/0243849 | A1 | 12/2004 | Blackburn et al. |
| 2004/0248642 | A1 | 12/2004 | Rothschild |
| 2004/0248645 | A1 | 12/2004 | Blackburn et al. |
| 2004/0248646 | A1 | 12/2004 | Canterbury |
| 2004/0248651 | A1 | 12/2004 | Gagner |
| 2004/0254006 | A1 | 12/2004 | Lam et al. |
| 2004/0254013 | A1 | 12/2004 | Quraishi et al. |
| 2004/0254014 | A1 | 12/2004 | Quraishi et al. |
| 2004/0254954 | A1 | 12/2004 | Gatto et al. |
| 2004/0255139 | A1 | 12/2004 | Giobbi |
| 2004/0259629 | A1 | 12/2004 | Michaelson et al. |
| 2004/0259633 | A1 | 12/2004 | Gentles et al. |
| 2004/0259640 | A1 | 12/2004 | Gentles et al. |
| 2004/0259643 | A1 | 12/2004 | Gentles |
| 2004/0266532 | A1 | 12/2004 | Blackburn et al. |
| 2004/0266533 | A1 | 12/2004 | Gentles et al. |
| 2005/0003886 | A1 | 1/2005 | Englman et al. |
| 2005/0009599 | A1 | 1/2005 | Ryan |
| 2005/0009601 | A1 | 1/2005 | Manfredi et al. |
| 2005/0009607 | A1 | 1/2005 | Russell et al. |
| 2005/0010738 | A1 | 1/2005 | Stockdale et al. |
| 2005/0014557 | A1 | 1/2005 | Duhamel |
| 2005/0014559 | A1 | 1/2005 | Mattice et al. |
| 2005/0020354 | A1 | 1/2005 | Nguyen et al. |
| 2005/0032573 | A1 | 2/2005 | Acres et al. |
| 2005/0032577 | A1 | 2/2005 | Blackburn et al. |
| 2005/0037708 | A1 | 2/2005 | Torvinen |
| 2005/0043072 | A1 | 2/2005 | Nelson |
| 2005/0043088 | A1 | 2/2005 | Nguyen et al. |
| 2005/0043090 | A1 | 2/2005 | Pryzby et al. |
| 2005/0043094 | A1 | 2/2005 | Nguyen et al. |
| 2005/0044535 | A1 | 2/2005 | Coppert |
| 2005/0049037 | A1 | 3/2005 | Anderson et al. |
| 2005/0054431 | A1 | 3/2005 | Walker et al. |
| 2005/0054438 | A1 | 3/2005 | Rothschild et al. |
| 2005/0054445 | A1 | 3/2005 | Gatto et al. |
| 2005/0054447 | A1 | 3/2005 | Hiroyama et al. |
| 2005/0054448 | A1 | 3/2005 | Frerking et al. |
| 2005/0059457 | A1 | 3/2005 | Rothschild et al. |
| 2005/0059493 | A1 | 3/2005 | Tyson et al. |
| 2005/0059494 | A1 | 3/2005 | Kammler |
| 2005/0064939 | A1 | 3/2005 | McSheffrey et al. |
| 2005/0070354 | A1 | 3/2005 | Baerlocher et al. |
| 2005/0075983 | A1 | 4/2005 | St. Denis |
| 2005/0081623 | A1 | 4/2005 | Frank |
| 2005/0086286 | A1 | 4/2005 | Gatto et al. |
| 2005/0090313 | A1 | 4/2005 | Rowe |
| 2005/0096114 | A1 | 5/2005 | Cannon et al. |

| | | | | |
|---|---|---|---|---|
| 2005/0096126 | A1 | 5/2005 | Prasad et al. | |
| 2005/0096133 | A1 | 5/2005 | Hoefelmeyer et al. | |
| 2005/0097342 | A1 | 5/2005 | Gatto et al. | |
| 2005/0101370 | A1 | 5/2005 | Lind et al. | |
| 2005/0113172 | A1 | 5/2005 | Gong | |
| 2005/0114272 | A1 | 5/2005 | Herrmann et al. | |
| 2005/0119045 | A1 | 6/2005 | Fujimoto | |
| 2005/0119046 | A1 | 6/2005 | Fujimoto | |
| 2005/0120672 | A1 | 6/2005 | Gargiulo | |
| 2005/0130731 | A1 | 6/2005 | Englmann et al. | |
| 2005/0130737 | A1 | 6/2005 | Englmann et al. | |
| 2005/0137012 | A1 | 6/2005 | Michaealson | |
| 2005/0148385 | A1 | 7/2005 | Michaealson | |
| 2005/0153768 | A1 | 7/2005 | Paulsen | |
| 2005/0153773 | A1 | 7/2005 | Nguyen et al. | |
| 2005/0239546 | A1 | 10/2005 | Hedrick et al. | |
| 2005/0261059 | A1 | 11/2005 | Nguyen et al. | |
| 2005/0261060 | A1 | 11/2005 | Nguyen et al. | |
| 2005/0261061 | A1 | 11/2005 | Nguyen et al. | |
| 2005/0266517 | A1 | 12/2005 | Ikeda et al. | |
| 2005/0266919 | A1 | 12/2005 | Rowe et al. | |
| 2005/0282629 | A1 | 12/2005 | Gagner | |
| 2005/0282638 | A1 | 12/2005 | Rowe | |
| 2006/0009273 | A2 | 1/2006 | Moshal | |
| 2006/0019734 | A1 | 1/2006 | Roemer | |
| 2006/0019747 | A1 | 1/2006 | Loose et al. | |
| 2006/0019750 | A1 | 1/2006 | Beatty | |
| 2006/0030409 | A1 | 2/2006 | Lechner et al. | |
| 2006/0031829 | A1 | 2/2006 | Harris et al. | |
| 2006/0035705 | A1 | 2/2006 | Jordan et al. | |
| 2006/0036573 | A1 | 2/2006 | Watanabe et al. | |
| 2006/0039132 | A1 | 2/2006 | Chen | |
| 2006/0040732 | A1 | 2/2006 | Baerlocher et al. | |
| 2006/0046830 | A1 | 3/2006 | Webb | |
| 2006/0046839 | A1 | 3/2006 | Nguyen | |
| 2006/0068892 | A1 | 3/2006 | Gomez et al. | |
| 2006/0084502 | A1 | 4/2006 | Downs et al. | |
| 2006/0094508 | A1 | 5/2006 | D'Amico et al. | |
| 2006/0143085 | A1 | 6/2006 | Adams et al. | |
| 2006/0148561 | A1 | 7/2006 | Moser | |
| 2006/0194633 | A1 | 8/2006 | Paulsen | |
| 2006/0287036 | A1 | 12/2006 | Daly et al. | |
| 2006/0287107 | A1 | 12/2006 | Okada | |
| 2007/0004519 | A1 | 1/2007 | Swart et al. | |
| 2007/0021182 | A1 | 1/2007 | Gauselmann | |
| 2007/0026924 | A1* | 2/2007 | Taylor | 463/16 |
| 2007/0060332 | A1* | 3/2007 | Anderson et al. | 463/29 |
| 2008/0194335 | A1 | 8/2008 | Byng | |

FOREIGN PATENT DOCUMENTS

| | | |
|---|---|---|
| EP | 1004970 | 5/2000 |
| EP | 1199690 | 2/2004 |
| EP | 0813132 | 1/2005 |
| EP | 1378873 | 3/2005 |
| EP | 1238688 | 5/2005 |
| EP | 1378874 | 5/2005 |
| EP | 1471710 | 5/2005 |
| EP | 1291048 | 6/2005 |
| JP | 2006289009 | 10/2006 |
| WO | WO 9835309 | 8/1998 |
| WO | WO 9941718 | 8/1999 |
| WO | WO 9965579 | 12/1999 |
| WO | WO 0025281 | 5/2000 |
| WO | WO 0161437 | 8/2001 |
| WO | WO 03045515 | 6/2003 |
| WO | WO 03045516 | 6/2003 |
| WO | WO 2004004855 | 1/2004 |
| WO | WO 2004103495 | 12/2004 |
| WO | WO 2005028056 | 3/2005 |
| WO | WO 2005029220 | 3/2005 |
| WO | WO 2005033825 | 4/2005 |
| WO | WO 2005033826 | 4/2005 |
| WO | WO 2005120672 | 12/2005 |
| WO | WO 2006027677 | 3/2006 |
| WO | WO 2006039067 | 4/2006 |
| WO | WO 2007035388 | 3/2007 |

OTHER PUBLICATIONS

Office Action for U.S. Appl. No. 11/756,344 dated May 10, 2010.
Office Action for U.S. Appl. No. 11/756,344 dated Sep. 2, 2010.
Final Office Action for U.S. Appl. No. 11/756,344 dated Jan. 12, 2011.
Office Action for U.S. Appl. No. 11/830,083 dated Jun. 10, 2010.
Final Office Action for U.S. Appl. No. 11/830,083 dated Nov. 15, 2010.
Office Action for U.S. Appl. No. 11/830,102 dated Jul. 9, 2010.
Final Office Action for U.S. Appl. No. 11/830,102 dated Nov. 12, 2010.
Office Action for U.S. Appl. No. 11/830,108 dated Jan. 14, 2011.
Bally Live-Server Based Gaming brochure, written by Bally Gaming Systems, published in 2006.
Bonusing Solutions without Limits brochure, written by Bally Gaming Systems, published in 2005.
SB Products—The Next Big Innovation, printed from www.igt.com in Aug. 2006.
Server Based: Other Possibilities Article; published by www.casinocenter.com in May 2006.
Transferring Gaming brochure, written by Cyberview Technology, published in 2006.
Letter from Reina Kakimoto of Mots Law dated Jan. 24, 2012 regarding Third Party Submission Filed for U.S. Appl. No. 13/196,374 (2 pages).
Third Party Submission in Published Application Under 37 C.F.R. 1.99 for U.S. Appl. No. 13/196,374, dated Jan. 24, 2012 (3 pages).
U.S. Patent No. 5,941,769 submitted with Third Party Submission in Published Application Under 37 C.F.R. 1.99 for U.S. Appl. No. 13/196,374 (2 pages).
Non-Final Office Action dated Jan. 28, 2009 for U.S. Appl. No. 11/535,815.
Non-Final Office Action dated Mar. 6, 2009 for U.S. Appl. No. 11/558,256.
Non-Final Office Action dated Jan. 13, 2012 for U.S. Appl. No. 11/756,344.
Final Office Action dated Mar. 17, 2011 for U.S. Appl. No. 11/830,108.
Non-Final Office Action dated Feb. 17, 2011 for U.S. Appl. No. 11/830,361.

* cited by examiner

FIG. 6

| Free Spin | Free Spin Award Amount |
|---|---|
| 1 | $1.00 |
| 2 | $0.00 |
| 3 | $2.00 |
| 4 | $0.00 |
| 5 | $5.00 |
| 6 | $3.00 |
| 7 | $0.00 |
| 8 | $0.00 |
| 9 | $0.00 |
| 10 | $0.00 |
| 11 | $3.00 |
| 12 | $0.00 |
| 13 | $0.00 |
| 14 | $4.00 |
| 15 | $0.00 |
| 16 | $5.00 |
| 17 | $2.00 |
| 18 | $0.00 |
| 19 | $0.00 |
| 20 | $1.00 |

Total Award: $26.00

SERVER BASED GAMING SYSTEM HAVING SYSTEM TRIGGERED LOYALTY AWARD SEQUENCES

PRIORITY CLAIM

This application is a continuation of, claims priority to and the benefit of U.S. patent application Ser. No. 11/558,256, filed on Nov. 9, 2006, which is a continuation-in-part application of, claims priority to and the benefit of U.S. patent application Ser. No. 11/535,815 filed on Sep. 27, 2006, the entire contents of which are incorporated herein.

This application relates to the following co-pending commonly owned patent applications: "SERVER BASED GAMING SYSTEM HAVING SYSTEM TRIGGERED LOYALTY AWARD SEQUENCES," Ser. No. 11/756,344; "SERVER BASED GAMING SYSTEM HAVING SYSTEM TRIGGERED LOYALTY AWARD SEQUENCES," Ser. No. 11/830,083; "SERVER BASED GAMING SYSTEM HAVING SYSTEM TRIGGERED LOYALTY AWARD SEQUENCES," Ser. No. 11/830,102; "SERVER BASED GAMING SYSTEM HAVING SYSTEM TRIGGERED LOYALTY AWARD SEQUENCES," Ser. No. 11/830,108; and "SERVER BASED GAMING SYSTEM HAVING SYSTEM TRIGGERED LOYALTY AWARD SEQUENCES," Ser. No. 11/830,361.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (i.e., the higher the wager, the higher the award). Symbols or symbol combinations which are less likely to occur usually provide higher awards.

In such known gaming machines, the amount of the wager made on the base game by the player may vary. For instance, the gaming machine enables the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game has one or more paylines and the slot game enables the player to make a wager on each payline in a single play of the primary game. Slot games with 1, 3, 5, 9, 15 and 25 lines are widely commercially available. Thus, it is known that a gaming machine, such as a slot game, enables players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. It should be appreciated that different players play at substantially different wagering amounts or levels and at substantially different rates of play.

Secondary or bonus games are also known in gaming machines. These secondary or bonus games usually provide an additional award to the player. Such bonus awards are accounted for when determining the overall paytable for the gaming machine. Secondary or bonus games usually do not require an additional wager by the player to be activated. Secondary or bonus games are often activated or triggered upon an occurrence of a designated triggering symbol or triggering symbol combination in the primary or base game of the gaming machine. For instance, a bonus symbol occurring on a payline on the third reel of a three reel slot machine triggers the secondary bonus game on that gaming device. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Player tracking systems are also known. Player tracking systems enable gaming establishments to recognize the value of customer loyalty through identifying frequent customers and rewarding them for their patronage. The cumulative history of a particular player's gaming activity, which is included in a player profile, enables gaming establishments to target individual players with direct marketing promotions or customized compensation plans. In existing player tracking systems, a player is issued a player identification card which has an encoded player identification number that uniquely identifies the player. Player tracking on gaming devices such as slot machines, is typically accomplished with a card reader mounted to the gaming device. When the player first sits down at a gaming device, the player inserts the card into the card reader. The card reader reads the player identification number off the player tracking card and communicates information through a network to a central computer regarding the player's subsequent gaming activity. Based on this communicated information or data, the gaming establishment classifies each player and provides one or more of such players certain benefits based on these classifications.

Gaming establishment or casino loyalty programs are also well known. A casino loyalty programs works in conjunction with a player tracking system to offer incentives to players in exchange for the player's loyalty to and play history at the gaming establishment. Such loyalty incentives are often provided and funded by the gaming establishment's marketing department. These marketing department promotions are not accounted for in determining the overall paytable for the gaming machines.

One known way to provide loyalty incentives to players is by offering the player cash via a direct mailing. However, the overhead associated with such mailings is relatively expensive. Another known way to provide loyalty incentives to players is by offering access to certain specific prizes or awards, such as celebration prizes or progressive awards, which are only available to loyal players, such as players that play at certain designated minimum levels.

Another known way to provide loyalty incentives to players is by offering promotional credits (delivered as either direct mail offers or as a result of a loyalty bonus) to be utilized in one or more wagering games. Such promotional credits are often offered as a one time event such as for a player signing up for a player tracking card. It should be appreciated that providing promotional credits to a player is often preferable over providing non-promotional or cash credits to a player because known promotional credits are not immediately redeemable by a player for cash and must first be played through the gaming machine. Accordingly, gaming establishments are in need of new and exciting ways to provide awards to loyal players as part of their gaming experience.

More specifically, there is a continuing need to provide a gaming establishment with options for more types of frequent player or loyalty incentives. Such loyalty offerings should: target frequent or loyal players; be adjustable in amount and triggering frequency to meet the level of the player's loyalty (i.e., frequent or loyal players deserve more frequent or larger awards); and be viewed as a loyalty offering provided by the gaming establishment. Additionally, if possible, such loyalty offerings should: be viewed as being more valuable or enticing than promotional credits; provide a mechanism or way for the gaming establishment to know and control costs associated with awarding such loyalty bonuses.

Accordingly, there is a continuing need to provide new and different gaming machines and gaming systems as well as new and different ways to provide awards to players including loyalty awards.

SUMMARY

In one embodiment, the gaming system disclosed herein provides players with one or more loyalty incentives, such as one or more loyalty awards, utilizing one or more loyalty incentive award sequences. In one embodiment, the gaming system determines a loyalty incentive to provide to a player and a specific loyalty award sequence is determined based on the individual gaming device that the player is currently playing. That is, the gaming system first determines a loyalty award to provide to a player and second determines an appropriate loyalty award sequence to utilize to provide the player a loyalty award. In this embodiment, the gaming system determines a loyalty award sequence to provide to a player based on the loyalty award the gaming system wants to provide to the player, one or more attributes of the gaming device being currently played by the player and one or more attributes of the player's gaming activity. Providing a player a loyalty award utilizing a loyalty award sequence at the player's currently played gaming device provides a unique and powerful tool for providing incentives to players. That is, the instant a player qualifies for a loyalty award, the loyalty award and an appropriate loyalty award sequence is communicated from a central server to the player's gaming device. The communicated loyalty award sequence and loyalty award are provided to the player at the player's gaming device. Such a configuration enables the gaming system to provide the player a loyalty award immediately and at the gaming device they are currently playing. Accordingly, the gaming system disclosed herein provides one or more loyalty awards to a player as part of their gaming experience.

In one embodiment, the gaming system disclosed herein includes a central server, central controller or remote host in communication with or linked to a plurality of gaming machines or gaming devices. In one embodiment, the central server is in communication with one or more player tracking or player loyalty systems to identify one or more players currently playing at one or more of the gaming devices in the gaming system in a conventional manner.

In one embodiment, the central server determines whether to provide one of the players at one of the gaming devices in the gaming system a loyalty award. In one such embodiment, the central server utilizes information or data communicated from the player tracking system to determine which player(s) to provide the loyalty award. In this embodiment, the central server is adapted to target specific players or groups of players based on each individual player's gaming activity, such as the player's amount wagered, time played, games won or player tracking status.

In another such embodiment, the central server determines to provide a loyalty award to a player based on the collection of a designated amount of wagers or coin-in placed at one or more of the gaming devices in the gaming system. In other such embodiments, the central server determines whether to provide one of the players a loyalty award based on one or more game play events, based on one or more players exceeding a certain amount of game play (such as number of games, number of credits, or amount of time), or reaching a specified number of points earned during game play. In other embodiments, the central server determines to provide a loyalty award to a player based on an elapsed amount of time of play, based on one or more predictive models or algorithms or based on any other suitable criteria.

If the central server determines to provide a player a loyalty award, in one embodiment, the central server determines an amount or value to provide to the player as the loyalty award. As described below, this determined amount or value may or may not actually be provided to the player as the loyalty award. In one embodiment, the value (or expected value) for the loyalty award is determined based on the player's status (such as determined through a player tracking system), wherein the greater the player's status, the greater the value (or expected value) for the loyalty award for that player. In different embodiments, the value (or expected value) for the loyalty award is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one embodiment, after determining an amount or value to provide to the player as the loyalty award, the central server determines an appropriate loyalty award sequence to communicate to the player's gaming device. In an alternative embodiment, the central server communicates suitable instructions or commands to the gaming device to implement a loyalty award sequence stored by the gaming device. As described below, the player's gaming device utilizes the communicated loyalty award sequence to provide an amount or value to the player as the player's loyalty award. In this embodiment, central server determines the loyalty award sequence based on the value (or expected value) determined to provide to the player as the loyalty award, the player's specific wagering activity and the specific paytable associated with the player's currently played gaming device. That is, since the player may be playing at and thus utilizing any paytable of any gaming device in the gaming system, in determining an appropriate loyalty award sequence to communicate to the player's gaming device, the central server must account for the paytable of the specific game played by the player, including the average expected payout of each game played.

In one example embodiment, the central server determines to provide the player a loyalty award utilizing a free spin loyalty award sequence. In this example embodiment, in determining the number of free spins to include in the free spin loyalty award sequence, the central server must account for the average expected payout or value of each free spin (which is based on the game of the specific gaming device played and the paytable utilized for each free spin, wherein the paytable utilized is based on the player's wager amount) and equate this value or amount to the value or amount previously determined to provide to the player as the loyalty award. For example, if the central server previously determined a value or amount of $9.00 to provide to the player as the loyalty award and the player is currently playing a gaming device that has a payout percentage of 90.00% (i.e., the average expected payout or value for each spin is $0.90 for every $1.00 wagered), the central server determines to provide the player 10 free spins in the loyalty award sequence. That is, the 10 free spins with an average expected payout of $0.90 per spin equals a total value of $9.00 (10 free spins×$0.90 per free spin) which is equal to the determined value or amount of $9.00 to provide to the player as the loyalty award.

In another example embodiment, the central server determines to provide the player a loyalty award utilizing a multiplied payout loyalty award sequence. In such a multiplied payout loyalty award sequence, the central server determines a number of wagering games to play wherein any credits won (during the determined number of games) are multiplied by a gaming system specified integer multiplier value. In this embodiment, in determining the multiplier value and the number of games to play (which the determined multiplier value will be applicable for) in the multiplied payout loyalty award sequence, the central server must take into account the average expected payout of each game played (which is based on the game of the specific gaming device played, the paytable utilized and the player's wager amount) modified by any applicable multiplier value and equate this value or amount to the value or amount previously determined to provide to the player as the loyalty award. For example, if the central server previously determined a value or amount of $9.00 to provide to the player as the loyalty award and the player is currently playing a gaming device that has a payout percentage of 90.00% (i.e., the average expected payout or value for each game is $0.90 for every $1.00 wagered), the central server determines to provide the player 10 games (each operable upon an individual wager amount of $1) in the loyalty award sequence wherein any award provided during these 10 games is modified by a multiplier of 2×. In this example, the $1 wager amount for each played game funds the base portion of the game (i.e., the first 1× multiplier) and the value or amount previously determined to be provided to the player as the loyalty award funds the loyalty portion of the game (i.e., the second 1× multiplier which in combination with the first 1× multiplier yield a 2× multiplier). That is, the 10 games with an applicable modified of 2× result in a value of $18.00 (i.e., ($0.90 average expected payout per game played×multiplier of 2)=$1.80×10 games played with applicable modifier=$18.00). When accounting for the $1 the player wagered on each of the 10 games of the loyalty award sequence, the loyalty award sequence provided the player $9.00 which is equal to the determined value or amount of $9.00 to provide to the player as the loyalty award. It should be appreciated that since the multiplier value and the number of games played are determined based on the specific gaming device played, its associated paytable and the player's current wager amount, in this example embodiment, the central server limits or restricts the player's ability to change game types and wager amounts during the provided number of games of the player's loyalty award sequence.

It should be appreciated that the paytable utilized in determining a loyalty award sequence is based, at least in part, on the player's wager amount, wherein different wager amounts are associated with different paytables. For example, a player's wager of $1.00 is associated with a first paytable with a payout percentage of 90.00% while a player's wager of $5.00 is associated with a second paytable with a payout percentage of 92.00%. Such different payout percentages correlate to different average expected payouts or values for each game played, which correlate to different numbers of games (or other determined aspects) to provide during the loyalty award sequence. Accordingly, different player wager amounts correspond to different paytables which are utilized by the central server in determining the loyalty award sequence to provide to the player.

Determining a loyalty award sequence specific to the parameters of the gaming device the player is currently playing enables the central server to provide the player a loyalty award regardless of which gaming device the player is playing. For example, if a player is playing a first gaming device, the gaming system determines and utilizes a first loyalty award sequence specific to the first gaming device (i.e., based on the player's bet and the paytable associated with the game of the first gaming device being played) to provide the player a loyalty award. In this example, if the player moves to a second gaming device in communication with the central server, the gaming system determines and utilizes a different, second loyalty award sequence specific to the second gaming device (i.e., based on the player's bet and the paytable associated with the second gaming device) to provide the player the same loyalty award. Such a configuration provides that if it is determined to provide a player a loyalty award, the central server can utilize an appropriate loyalty award sequence to immediately provide the loyalty award via any gaming device in communication with the central server which the player is playing. It should be appreciated that the gaming systems and methods disclosed herein enable a player to receive an equitable loyalty award at a gaming device of the player's choosing. That is, the central server is operable to adjust the loyalty award sequence based on which game at which gaming device the player is currently playing and thus each player is provided a loyalty award sequence with a true theoretical loyalty award value.

After determining a value of the loyalty award and the appropriate loyalty award sequence, the central server signals the start of the loyalty award sequence on the player's currently played gaming device. In one embodiment, such a triggering message includes information or data regarding the determined loyalty award sequence to utilize to provide a loyalty award to the player of that gaming device. In one embodiment, a message controller or message module associated with the central server sends one or more messages to be displayed on the player's gaming device to inform the player that a loyalty award sequence is being offered and what the loyalty award sequence entails. In one embodiment, the messaging is positioned and/or timed to not interfere with the current game played. In another embodiment, the gaming establishment operator is enabled, via the message controller, to configure the presentation, look, and feel of the messages displayed to the player.

In one embodiment, the gaming system disclosed herein enables the player to accept or reject the determined loyalty award sequence. For example, the player may reject or deny the loyalty award sequence if they do not have time or enough credits on their gaming machine to play the loyalty award sequence at this present moment. In one such embodiment, if the player rejects the loyalty award sequence, the gaming system stores part or all of the theoretical value (i.e., the amount or value determined to be provided to the player as the loyalty award) associated with the rejected loyalty award sequence. In this embodiment, the gaming system enables, at a subsequent time, the player to play a loyalty award sequence which is based on the stored theoretical value (or part of the stored theoretical value). In another embodiment, the gaming system disclosed herein enables the gaming device to accept or reject the determined loyalty award sequence. For example, the gaming device may reject or deny the determined loyalty award sequence if the gaming device determines that there are not enough credits on the gaming device to fund the play of the loyalty award sequence. In these embodiments, if the player and/or gaming device accept the determined loyalty award sequence, the loyalty award sequence is set to begin.

In one embodiment, as mentioned above, once the loyalty award sequence is set to begin, the gaming device does not enable player initiated changes in denomination, coins bet per line, or lines played until completion of the loyalty award sequence. In this embodiment, since the central server determines the loyalty award sequence based on certain gaming parameters, such as denomination, coins bet per line, or lines played, any player initiated changes to these parameters would alter the previously determined loyalty award sequence. It should be appreciated that such a configuration encourages players to wager consistently so that when the central server determines to provide that player a loyalty award, the gaming parameters of the loyalty award sequence will be the same or substantially the same as the gaming parameters which the player was previously playing. It also should be appreciated that such a setup prohibits the player from setting their wager much higher at the beginning of a loyalty award sequence (thus earning a much higher award than is indicative of their play). In another embodiment, for one or more provided loyalty award sequences, the central server enhances one or more gaming parameters, such as setting the wager amount to the maximum bet for the applicable paytable, to increase the player's excitement at the win potential.

After receiving information regarding the determined loyalty award sequence, the gaming device triggers the determined loyalty award sequence and provides the player a loyalty award. It should be appreciated that while the utilized loyalty award sequence is determined, at least in part, based on a value or amount the central server wants to provide to the player as the loyalty award, the actual loyalty award provided to the player may differ. That is, the central server determined a theoretical value or amount to provide to the player as a loyalty award, but the actual value or amount provided to the player as the loyalty award is determined by the gaming device. For example, using the free spin loyalty award sequence described above, if the player's 10 provided free spins result in a total payout of $14.00 (as opposed to the total payout of $9.00 previously determined to be provided to the player as the loyalty award), the actual total payout of $14 is provided to the player. It should be appreciated that the while the actual gaming device determined value or amount provided to the player as the loyalty award may be less than, equal to or greater than the central server determined value or amount to provide to the player as the loyalty award, a defined relationship exists between the central server determined value and the gaming device determined value. That is, as the loyalty award sequence is determined based on the central server determined value and the gaming device determined value is determined based on the determined loyalty award sequence, the gaming device determined value is indirectly based on the central server determined value. It should be further appreciated that over a large sample of time, the payout of the actual value and that of the theoretical value should be equal or substantially equal. In other words, while the value of every loyalty award provided will not match the determined value to provide as a loyalty award, over time the actual values will average out to match or substantially match the theoretical values.

After providing the player a loyalty award, the gaming device ends the loyalty award sequence and enables the player to return to normal game play mode. Additionally, the gaming device communicates a completion message to the central server, wherein the completion message includes information regarding the loyalty award actually paid to the player in the triggered loyalty award sequence. In one embodiment, this information is used for accounting and auditing purposes. For example, once the gaming system receives (or issues) a request to extract a loyalty award sequence, the gaming system is able to track the actual result and determine how much is provided to a player (i.e., the actual value) versus how much was expected to be provided to the player (i.e., the theoretical value). This information is important for accounting and auditing purposes and can be used to determine a variance (which may be used at a later time) between the determined values to provide as loyalty awards and the actual values provided as loyalty awards. Providing a player one or more loyalty awards based on the player's loyalty to a gaming establishment increases the player's excitement and enjoyment at the gaming establishment and further increases the player's loyalty to the gaming establishment.

In one alternative embodiment, rather than providing a loyalty award sequence which includes one or more plays of one or more games (that utilize one or more attributes of the player's currently played gaming device), a provided loyalty award sequence includes one or more modifications to a previously determined game play outcome. In this embodiment, such game outcome modification loyalty award sequences, when selectively activated by the player, cause a modification to one or more aspects of a previously generated game outcome in an attempt to improve such previously generated game outcome for the player. That is, if the central server determines to provide a player a loyalty award, the central server determines and provides a player with one or more selectively activated game outcome modification loyalty award sequences which the player may selectively utilize to try and improve a previously generated game outcome. Such an embodiment provides increased excitement and enjoyment for players because the player must decide the optimum time to selectively activate a stored game outcome modification loyalty award sequence so as to maximum the value of the provided loyalty award.

In one such embodiment, one or more game outcome modification loyalty award sequences are associated with moving, such as respinning, one or more reels of a slot gaming device. In this embodiment, if a first outcome associated with a first award is generated in a slot gaming device, the player has at least one stored game outcome modification loyalty award sequence and the player wants to improve the first generated outcome, then the player utilizes (i.e., selectively activates) the stored loyalty award sequence to respin one or more, but not all, of the reels to generate a second outcome potentially associated with a second, greater award. For example, if along an active payline a five-reel gaming device generates a cherry symbol on the first, second, fourth and fifth reels and a seven symbol on the third reel (which is associated with a first award of $0), and the player has at least one stored game outcome modification loyalty award sequence, then the player may utilize the stored game outcome modification loyalty award sequence to respin the third reel (while holding the remaining reels constant) in an attempt to generate a cherry symbol on the third reel to modify the existing generated game outcome and cause a second award of $100 associated with a five cherry symbol combination to be provided to the player.

In another such embodiment, one or more game outcome modification loyalty award sequences are associated with nudging one or more reels of a slot gaming device to obtain a better generated symbol. In this embodiment, if a first outcome associated with a first award is generated in a slot gaming device, the player has at least one stored game outcome modification loyalty award sequence and the player wants to improve the first generated outcome by nudging at least one symbol, then the player utilizes (i.e., selectively activates) the stored loyalty award sequence to nudge one or more of the reels to generate a second outcome.

In another such embodiment, one or more game outcome modification loyalty award sequences are associated with causing one or more symbols to function as wild symbols for one or more symbol evaluations. In this embodiment, if a first set of symbols is generated to form a first outcome associated with a first award, the player has at least one stored game outcome modification loyalty award sequence and the player wants to improve the first generated outcome by causing at least one of the generated symbols to function as a wild symbols, the player utilizes (i.e., selectively activates) the stored loyalty award sequence to cause at least one of the generated symbols to function as a wild symbol to modify the set of symbols to form a second outcome associated with a different, second outcome. In another embodiment, one or more game outcome modification loyalty award sequences are associated with causing one or more symbols to be analyzed in a scatter evaluation. In another embodiment, one or more game outcome modification loyalty award sequences are associated with causing one or more symbols to be analyzed in a ways to win evaluation (as described in more detail below). In different embodiments, one or more game outcome modification loyalty award sequences are associated with causing one or more symbols to be analyzed based on an additional payline (which the player may selectively activate) or based on an additional winning symbol combination that is independent of the paytable (which the player may selectively activate). It should be appreciated that these game outcome modification loyalty award sequences may be associated with modifying any suitable game play feature to cause a modification or alteration of any generated game outcome in any suitable game.

In one embodiment, the gaming system and method disclosed herein contemplates employing one or more displays to provide the players of the gaming machines information about the loyalty awards. This displayed information increases player's awareness of these awards and increases interaction between players of the gaming machines. The display(s) provide any suitable information about the gaming system, gaming machines, loyalty events and loyalty awards, such as which gaming machines are winning or have recently won loyalty awards, the amount of the loyalty awards, and when a loyalty award is about to be hit. In one embodiment, the central server communicates information to the players via one or more loyalty award tracking meters on each separate machine, on an overhead sign that is common to all machines in the bank and/or on one or more signs which are not associated with any gaming machines in the gaming system (such as signs placed anywhere in the gaming establishment).

Accordingly, the gaming system and method disclosed herein provides a gaming establishment operator maximum flexibility in offering loyalty awards to the player while providing the players with a loyalty award that is useful to them and immediately gratifying. Such a gaming system further provides the gaming establishment operator an alternative means to provide incentives to players without requiring all of the associated costs of mailings and announcements. These savings can be returned back to the players to further increase their loyalty to the gaming establishment.

Additional features and advantages are described in, and will be apparent from, the following Detailed Description and the figures.

BRIEF DESCRIPTION OF THE FIGURES

FIG. 6 is a chart illustrating the results of the free spin loyalty award sequence of FIGS. 5A and 5B.

DETAILED DESCRIPTION

Figure 1:
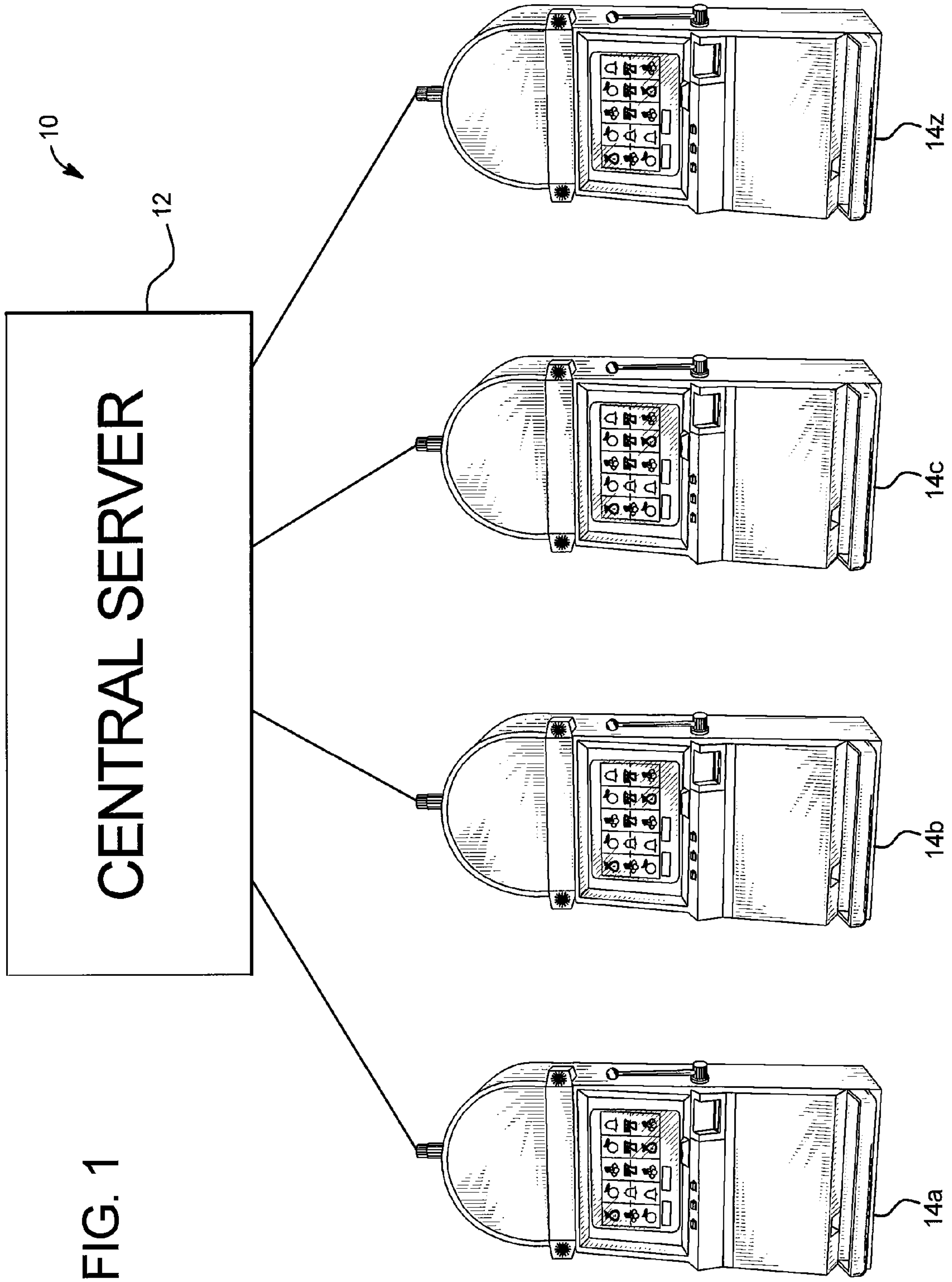
FIG. 1 is a schematic diagram of the central server in communication with a plurality of gaming devices in accordance with one embodiment of the gaming system disclosed herein.

Referring to FIG. 1, one embodiment of the gaming system 10 includes a central server, central controller or remote host 12 and a plurality of gaming machines or gaming devices 14*a*, 14*b*, 14*c* . . . 14*z* in communication with or linked to the central server 12 through a data network or a remote communication link. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. The play of each of the gaming machines in the group is monitored by the central server.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 2A:
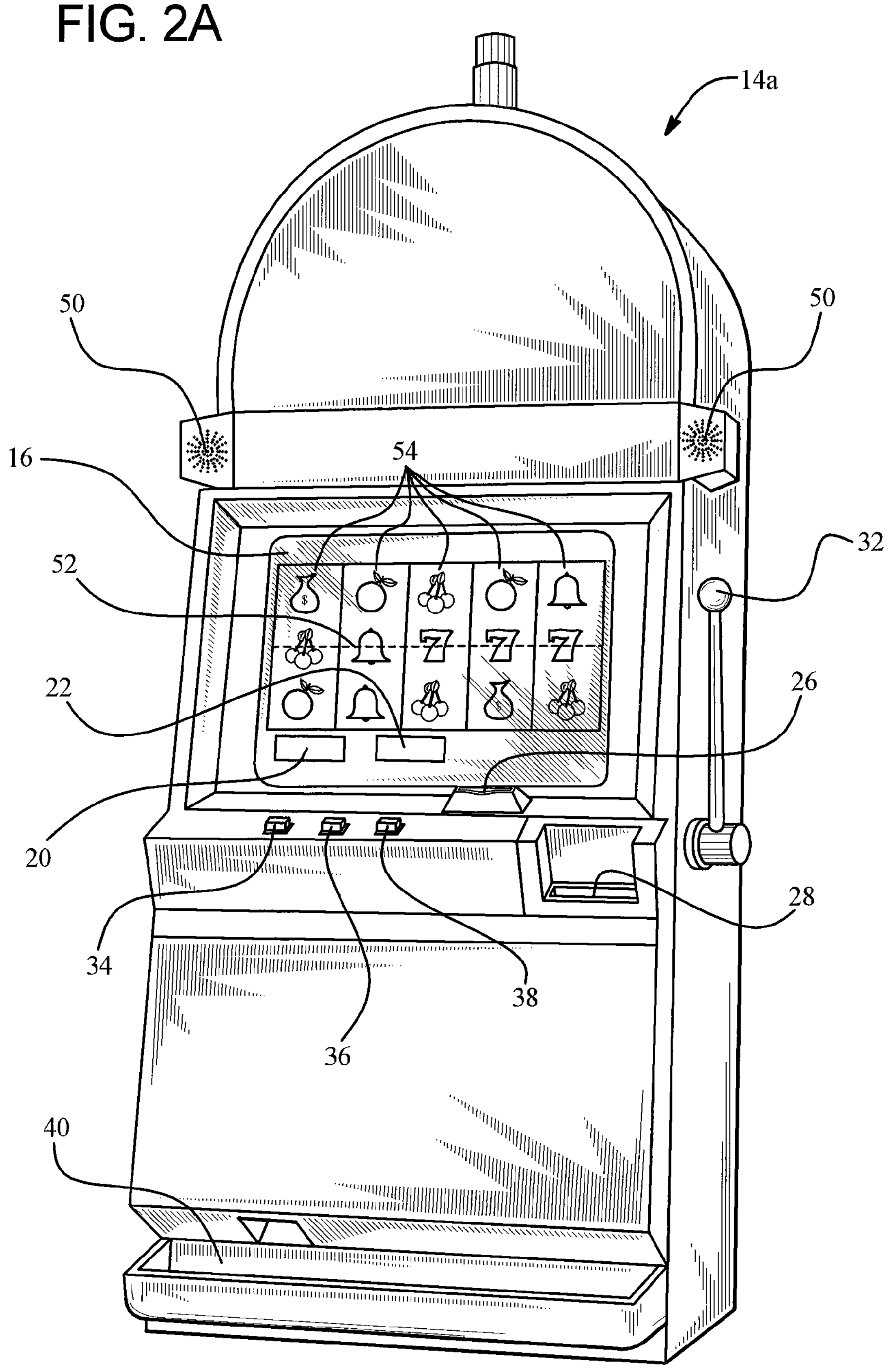
FIGS. 2A and 2B are front perspective views of alternative embodiments of gaming devices disclosed herein.
Figure 2B:
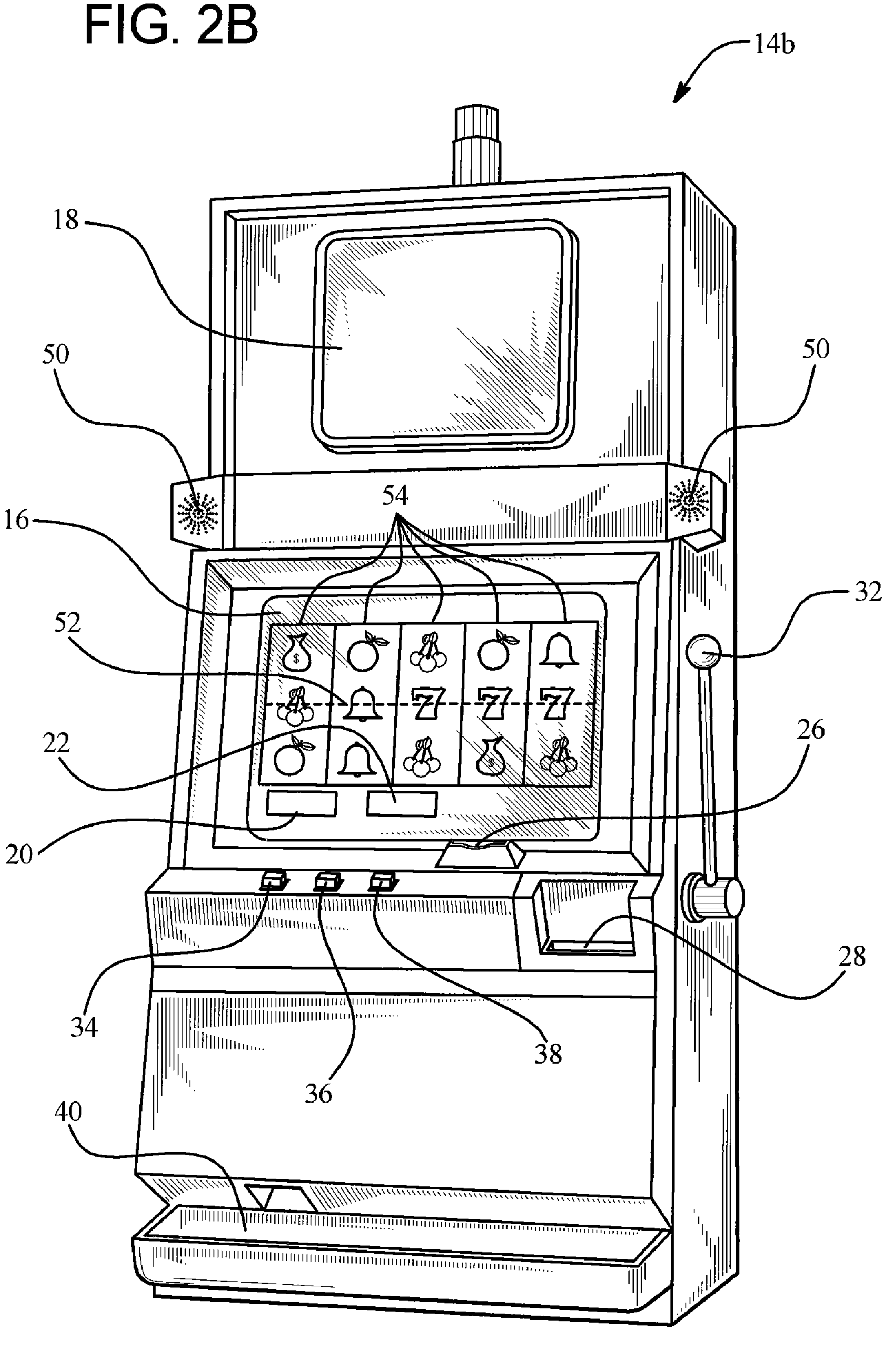

Two example alternative embodiments of the gaming device of the disclosed herein are illustrated in FIGS. 2A and 2B as gaming device 14*a* and gaming device 14*b*, respectively. Gaming device 14*a* and/or gaming device 10*b* are generally referred to herein as gaming device 14.

Figure 3:
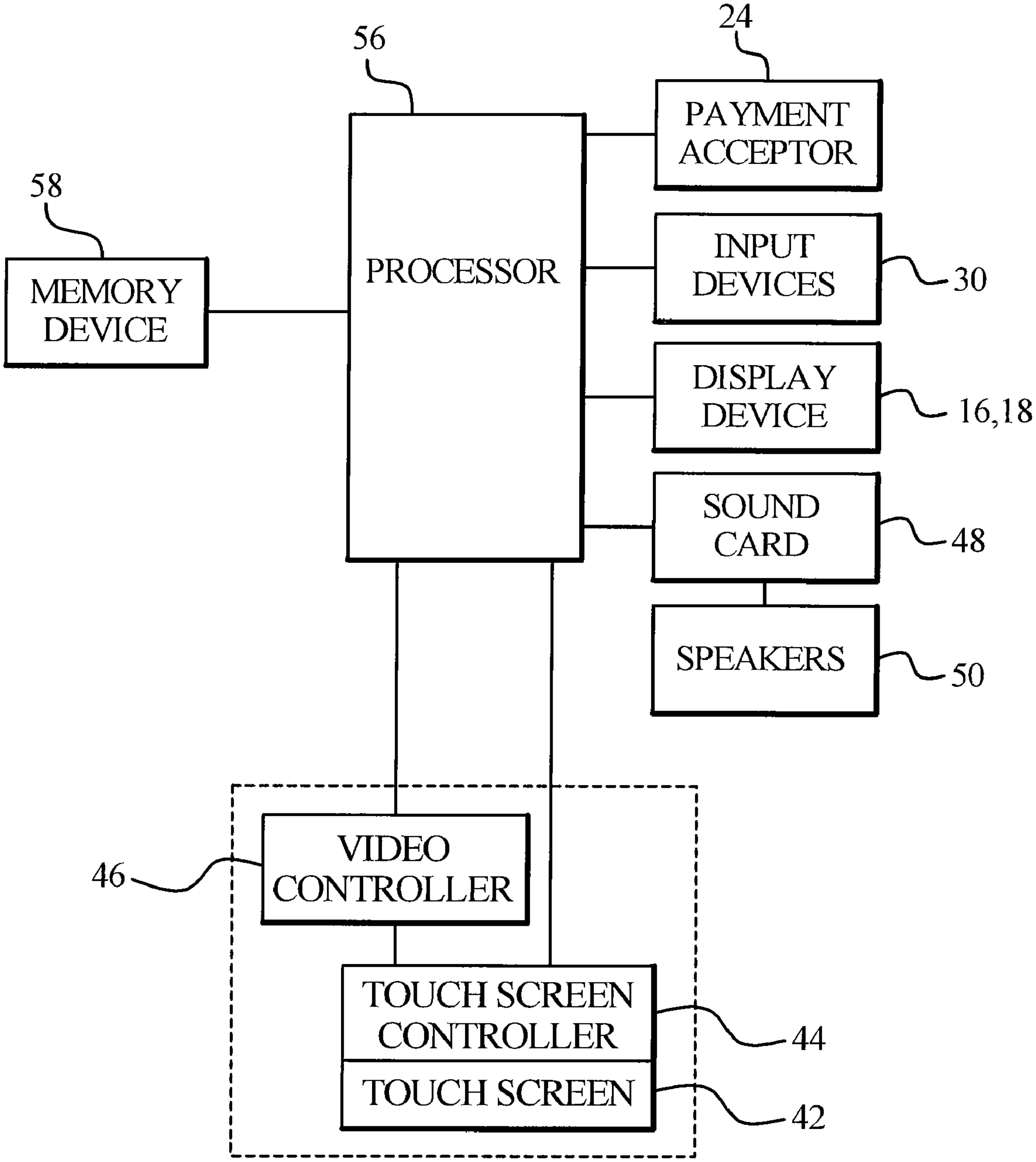
FIG. 3 is a schematic block diagram of the electronic configuration of one embodiment of a gaming device disclosed herein.

In the embodiments illustrated in FIGS. 3 and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any suitable secondary game associated with the primary game as well as information relating to the primary or secondary game. The alternative embodiment shown in FIG. 2B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle. In another embodiment, at least one display device may be a mobile display device, such as a PDA or tablet PC, that enables play of at least a portion of the primary or secondary game at a location remote from the gaming device.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 3, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols 60, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second×reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In other embodiments, the triggering event or qualifying condition may be by exceeding a certain amount of game play (such as number of games, number of credits, amount of time), or reaching a specified number of points earned during game play.

In another embodiment, the gaming device processor 56 or central server 12 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, as mentioned above, one or more of the gaming devices 14 are in communication with each other and/or at least one central server, central controller or remote host 12 through a data network or remote communication link. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions. In another embodiment, the central server is operable to access paytable information for one, more or each of the gaming devices in the gaming system for accounting and auditing purposes only.

In one embodiment, the central server or controller maintains or keeps track of the play and/or other activity on or relating to the gaming machines in the gaming system. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming device includes a separate coin-in, wager meter or pool which tracks the total or partial coin-in or wagers placed at that gaming device. It should be appreciated that the player of a gaming machine may change during this tracking and that this tracking can be independent of the specific player playing the gaming machine. It should be further appreciated that the wagers placed are tracked in any suitable compatible or comparable manner such as credits wagered (i.e., if all of the system gaming machines are of the same denomination) or monetary units (e.g., total dollars or other currency) wagered. It should be further appreciated that tracking in monetary units accounts for gaming machines having multi-denominations and/or for gaming machines of different denominations and/or gaming machines which accept different currencies.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In these embodiments, the player tracking system and/or central controller timely tracks when a player inserts their playing tracking card (i.e., Card In) to begin game play. The player tracking system and/or central controller also timely tracks when a player removes their player tracking card (i.e., Card Out) to conclude game play.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Loyalty Award Sequence

Figure 4:
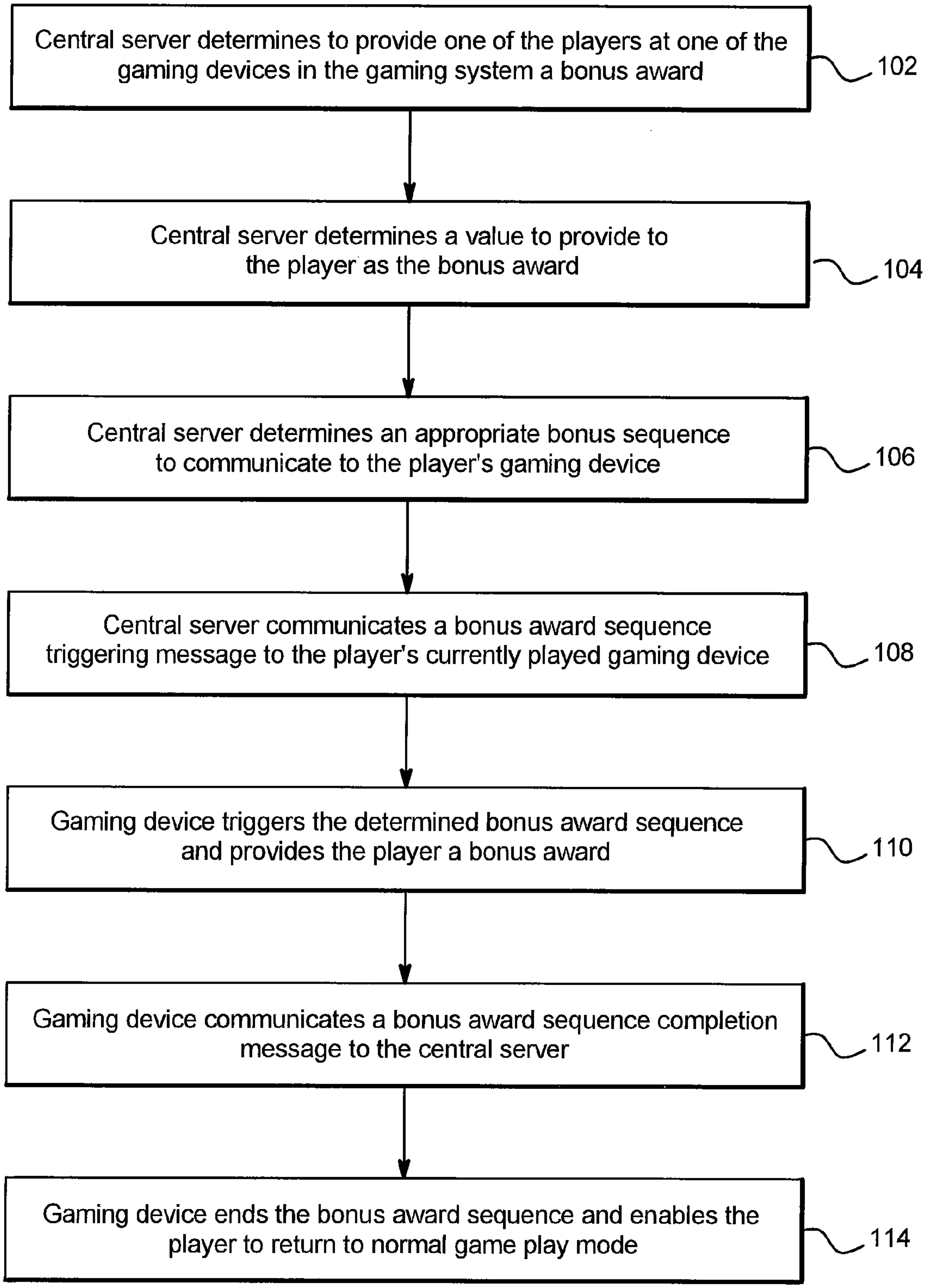
FIG. 4 is a flowchart of one embodiment of the gaming system disclosed herein illustrating one of the gaming devices providing a player a loyalty award via a loyalty award sequence.

In one embodiment, as illustrated in block 102 of FIG. 4, the central server determines to provide one of the players at one of the gaming devices in the gaming system an incentive, such as a loyalty award.

In one embodiment, the central server determines when to provide a loyalty award and which player to provide such loyalty award to based on applicable player tracking information. In one such embodiment, the central server utilizes information or data maintained by the player tracking system to ascertain betting history and wagers about each player. In this embodiment, the player tracking system (or alternatively a player tracking module associated with the central server) communicates such information or data to the central server and the central server determines which player(s), if any, to provide a loyalty award to based on such information. In one embodiment, the central server enables a player to play as normal and recognizes when the player meets a designated threshold to be eligible for a loyalty award. In this embodiment, upon the player meeting the designated threshold, such as the player accumulating a designated number of player tracking points, the central server provides the player a loyalty award. It should be appreciated that in this embodiment, since a player's player tracking points or status may be associated with the player's wager and/or amount of time spent at a gaming establishment, players who consistently bet high and spend substantial amounts of time and/or money at a gaming establishment may be more likely to be eligible to win or receive a loyalty award than a player who has little or no recorded history with the gaming establishment (i.e., a player with little or no tracked information). In another embodiment, if the player's number of player tracking points (determined via a player tracking system) is not enough for the player to win a loyalty award, the central server enables the player to purchase a suitable amount of player tracking points such that the player's player tracking account is associated with enough player tracking points for the player to win a loyalty award.

In one embodiment, the central server utilizes player tracking information and tracked wagering activity to determine when to provide a loyalty award and to which player to provide such loyalty award. In one such embodiment, for each player playing a gaming device in the gaming system, the central server determines whether to provide that player a loyalty award, wherein the determination is based, at least in part, on that player's player tracking status and that player's wagering activity. In this embodiment, upon the player meeting a designated threshold, such as a player of a defined player tracking status placing a defined amount of wagers, the central server provides the player a loyalty award. In one such embodiment, players of different player tracking statuses must wager different amounts to be eligible to win loyalty awards. For example, a bronze level player must wager a first amount to win any loyalty award and a gold level player must wager a second, different amount to win any loyalty award. In another such embodiment, players of different player tracking status who wager the same amount are provided different loyalty awards.

In one embodiment, the central server utilizes player tracking information associated with a plurality of players and picks one of these players to provide a loyalty award. In this embodiment, the gaming device selects one of these players to provide a loyalty award, wherein the probability of the central server selecting each player is based on that player's player tracking or player loyalty information. For example, the central server might rate the players as follows: 1) Player A with a player tracking card with a long history of high bets, 2) Player B with a player tracking card with a long history of average bets, 3) Player C with no player tracking card currently wagering high on a gaming machine for a specified period of time, 4) Player D with a player tracking card with a history of low bets, 5) Player E with no player tracking card currently wagering average bets and 6) Player F with no player tracking card currently wagering low bets. In this example, Player A would be more likely to receive a loyalty award than Player F; however, in this example, each of the players are still eligible to receive one of the loyalty awards. It should be appreciated that just because the player tracking system does not maintain information about a player (i.e., the player does not have a tracking card), the player could still obtain a higher likelihood of receiving one of the loyalty awards by wagering high bet amounts. In one such embodiment, upon providing an uncarded player a loyalty award, the gaming system prompts the player to join the player tracking club to obtain the award.

In another such embodiment, the determination of which player(s), if any, to provide a loyalty award to is based on the player's status (determined via a player tracking system). For example, a bronze player may have a 0.5% chance of winning a loyalty award, a silver player may have a 1.0% chance of winning a loyalty award, a gold player may have a 1.5% chance of winning a loyalty award and a platinum player may have a 2.0% chance of winning a loyalty award. Accordingly, it should be appreciated that the central server is adapted to target specific players or groups of players based on each player's gaming activity, such as each player's amount wagered, time played, games won or player tracking status.

It should be appreciated that by utilizing such a player tracking system, the central server does not provide a loyalty award to an empty or un-carded gaming device. In this embodiment, a card-in event starts the tracking of a player's gaming activity for loyalty award determinations. Thus, the carding of the player ensures the person who actually "wins" the loyalty award is provided the loyalty award because such a loyalty award is associated with the player tracking card and not the gaming machine. In another embodiment, the tracking of gaming activity for loyalty award determinations starts when the gaming machine is activated. In this instance, the central controller knows only that the gaming machine is being wagered on and keeps track of these wagers. If the gaming machine is chosen as the winner of a loyalty award, the central controller provides that loyalty award to the gaming machine (and not necessarily to the player who may have been responsible for the gaming activity recorded from that gaming machine).

In another embodiment, in determining whether to provide a player a loyalty award, the central server determines if enough coin-in has been collected by the gaming system to provide a loyalty award. That is, a loyalty award coin-in pool must be sufficiently funded or funded to a designated level to enable the central sever to provide one or more loyalty awards. In one such embodiment, the central server utilizes an average expected payout associated with a loyalty award sequence to determine if the coin-in pool is sufficiently funded. In one embodiment, upon the central server's determination that the coin-in pool is sufficiently funded to provide one or more loyalty awards, the central server immediately initiates one or more loyalty award sequences on at least one selected gaming device. In another embodiment, as opposed to automatically initiating one or more loyalty award sequences, after the coin-in pool is sufficiently funded, the central server randomly determines whether to initiate one or more loyalty award sequences. In one such embodiment, after enough coin-in has been collected, the central server determines, at designated intervals, whether to initiate a loyalty award sequence. In different embodiments, the designated intervals are based on monetary units wagered or based on time elapsed.

In another embodiment, the central server utilizes a true time based model to determine whether to provide a player a loyalty award. In this embodiment, the loyalty awards are funded by a pool that is built up and subsequently depleted as each loyalty award is provided to a player. In this embodiment, as described below, the central server initiates one or more loyalty award sequences to last for a designated amount of game plays or time (or alternatively until the pool is depleted).

In another embodiment, the central server utilizes a reverse pool to determine whether to provide a player a loyalty award. In this embodiment, the central server fills or funds a reverse pool after one or more loyalty award sequences actually occur. In one such embodiment, the central server builds and depletes the reverse pool between loyalty award sequences. For example, if a loyalty award sequence which provided a loyalty award of 300 monetary units occurred when the reverse pool had 0 monetary units, the central server must wait until the reverse pool fills up for the loyalty award previously provided (in this example 300 monetary units) before determining to provide another loyalty award. In another embodiment, the reverse pool includes a designated quantity of monetary units to start with (as opposed to always refilling from 0 monetary units). This situation occurs if the reverse pool is required to carry at least a certain amount of monetary units or if a loyalty award sequence does not trigger immediately when the reverse pool parameters are met (such as triggering after 400 monetary units have been refilled when the previous provided loyalty award was 300 monetary units).

In another embodiment including a reverse pool, the central server utilizes a random variable to determine when to provide a loyalty award in a loyalty award sequence. In this embodiment, a variable X is set, such that ±X % of the reverse pool must be accumulated before the next loyalty award sequence is triggered. In one such embodiment, the variable X is calculated based on historical data. In one example, X is derived from the relative percentage which, over a determined time period, the determined theoretical loyalty awards are greater than the actual provided loyalty awards. In another example, X is derived from the relative percentage which, over a determined time period, the determined theoretical loyalty awards are less than the actual provided loyalty awards. These examples enable X to be utilized to bring the actual provided loyalty awards closer in line with the determined theoretical loyalty awards.

In another embodiment, the central server utilizes predictive modeling to determine whether to provide a player a loyalty award. The central server accounts for the number of gaming devices that are being actively played, the wager amounts or bets being made at each gaming device, and how much is expected to be provided at each actively played gaming device. The central server uses this information to determine when to provide a player a loyalty award. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); (c) the number of plays within a period of time, and (d) the existence of credits on the gaming device may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria). In one embodiment, the central server uses one or more pools to fund the loyalty award, wherein the central server adjusts the pool as needed. In another embodiment, each player has their own separate pool which is based on a percentage of their play. In this embodiment, when a player's personal pool reaches a predetermined amount or threshold, the player is provided with a loyalty sequence based on the amount associated with their personal pool.

In another embodiment including a reverse pool, the gaming system provides a set time when a loyalty award sequence is triggered and also provides a set amount or period of time for the loyalty award sequence. In one such embodiment, one, more or each player is informed how long the loyalty award sequence will last and qualified or active players are enabled to participate in the loyalty award sequence. Based on the set amount or period of time for the loyalty award sequence and the number of active players participating in the loyalty award sequence, the central server determines a theoretical amount which will be provided as loyalty awards during the loyalty award sequence. In this embodiment, each active player is provided a loyalty award sequence and a loyalty award as described herein. During the provided loyalty award sequences, all actual loyalty awards provided to players are metered or otherwise suitably tracked. After the loyalty award sequences are complete, the central server determines any difference between the theoretical amount determined to be provided as loyalty awards and the actual amount provided as loyalty awards. If the actual amount provided as loyalty awards is greater than the theoretical amount determined to be provided as loyalty awards, the central server determines an amount of wagers that must be subsequently placed to make up for the additional awards provided. In this embodiment, after recovering the excess amount of wagers provided, the central server randomly selects an amount of coin-in to fund the next pool. If the actual amount provided as loyalty awards is less than the theoretical amount determined to be provided as loyalty awards, the central server either retriggers one or more loyalty award sequences (to provide any unaccounted for awards) or utilizes the unaccounted for amount to fund the next pool. In one such embodiment, the gaming system is operable to set a minimum threshold amount for the pool, wherein if the minimum threshold amount is not provided as actual loyalty awards, the central server is operable to retrigger one or more loyalty award sequences.

In an alternative embodiment, the gaming system enables the player to determine, at least in part, if they will win a loyalty award. In this embodiment, independent of the central server, at least one determination occurs pertaining to if the player will win a loyalty award. In one such embodiment, based on at least one event which occurs in associated with a gaming device service window or a player tracking device, a determination occurs regarding if the player will win a loyalty award.

In different embodiments, the central server's determination to provide at least one of the players a loyalty award is predetermined, determined based on one or more game play events, such as a symbol-driven trigger, determined based on a random determination by the central server, determined based on a random determination at one of the gaming devices, determined based on one or more side wagers placed, determined based on a player's primary game wager or determined based on any other suitable method or criteria. In different embodiments, the central server determines to provide a loyalty award if one or more players exceed a certain amount of game play (such as number of games, number of credits, or amount of time), or reaching a specified number of points earned during game play. In one such embodiment, the gaming device does not provide any apparent reasons to the player for triggering a loyalty award sequence. In this embodiment, winning a loyalty award in a loyalty award sequence is not triggered by an event in or based specifically on any of the plays of any primary game. That is, the gaming device may simply qualify a player to win a loyalty award in a loyalty award sequence without any explanation or alternatively with simple explanations.

If the central server determines to provide a player a loyalty award, as indicated in block 104 of FIG. 4, the central server determines an amount or value to provide to the player as the loyalty award. In one embodiment, the value of the loyalty award is based on the player's status (such as determined through a player tracking system). In one such embodiment, the central server determines different amounts or values to provide as loyalty awards to different players of different player status levels who are wagering the same amount. For example, the central server determines a first amount or value to provide to a first player (of a first player status level) wagering a first amount and a second, greater amount or value to provide to a second player (of a second, greater player status level) also wagering the first amount. In different embodiments, the value for the loyalty award is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, if a loyalty award coin-in pool is funded to at least a threshold level, the central server divides the loyalty award coin-in pool amongst one or more qualified players. That is, the central server allocates or assigns a portion of the loyalty award coin-in pool to each of one or more players. In different embodiments, the loyalty award coin-in pool is divided based on each player's respective game play activity during a designated qualifying time period, based on each player's status (determined via a player tracking system), based on a random determination by the central server, based on a random determination at one of the gaming devices, based on one or more side wagers placed, based on a player's primary game wager or based on any other suitable method or criteria. In these embodiment, after the loyalty award coin-in pool is allocated appropriately, the central server determines an amount or value to provide to one or more players as their loyalty awards, wherein the amount of value for each player is based on the portion of the loyalty award coin-in pool allocated to that player. For example, if a player is allocated 10% of a loyalty award coin-in pool, then the amount or value the central server will determine to provide to that player as a loyalty award is based on the current value of 10% of the loyalty award coin-in pool.

In one embodiment, the loyalty award is funded, at least in part, via an amount provided by one or more marketing and/or advertising departments, such as a gaming establishment's marketing department. Such funding provides that the loyalty awards do not take away from the gaming payouts of any gaming devices. In another embodiment, the loyalty award is funded, at least in part, via one or more loyalty award pools of coin-in. In this embodiment, as described above, the central server allocates a certain percentage of each wager placed to a loyalty award pool, where the loyalty award is funded from the wagers or coins-in allocated to the loyalty award pool. In another embodiment, the loyalty award is funded, at least in part, via one or more funds set up for such loyalty awards.

In one embodiment, after determining an amount or value to provide to the player as the loyalty award, as illustrated in block 106 of FIG. 4, the central server determines an appropriate loyalty award sequence to communicate to the player's gaming device. As described in more detail below, the determined attributes, parameters or characteristics of the loyalty award sequence are based on the central server determined amount or value to provide to the player as the loyalty award, the attributes, parameters or characteristics of the player's wagering activity and the attributes, parameters or characteristics associated with the player's currently played gaming device. In one embodiment, in addition to these considerations when determining the loyalty award sequence specific to the player's currently played gaming device, the central server and gaming device communicate information regarding various aspects of the determined loyalty award, such as which awards are not applicable for any determined modifier and/or whether or not any progressive awards may be won during the loyalty award sequence.

In one embodiment, in determining the loyalty award sequence, the player's currently played gaming device communicates information or data to the central server regarding that gaming device and the central server determines the appropriate loyalty award sequence based on this communicated information or data. In another embodiment, when the central server communicates or downloads information or data relating to the currently played game program to the gaming device, the central server logs in and/or stores the appropriate information. In this embodiment, when determining the loyalty award sequence, the central server accesses this logged in and/or stored information to determine the appropriate loyalty award sequence for the player's currently played gaming device. In another embodiment, the central server periodically checks which games are being played on one or more gaming devices and stores information or data resulting from these checks. In this embodiment, when determining the loyalty award sequence, the central server accesses this stored information or data to determine the appropriate loyalty award sequence for the player's currently played gaming device.

It should be appreciated that since the player may be playing at and thus utilizing any paytable of any gaming device in the gaming system, in determining an appropriate loyalty award sequence to communicate to the player's gaming device, the central server must account for the average expected payout or value of each game played utilizing the paytable associated with the player's currently played gaming device. That is, determining a loyalty award sequence specific to the parameters of the gaming device the player is currently playing enables the central server to provide the player a loyalty award regardless of which gaming device the player is playing. For example, if a player is playing a first gaming device, the gaming system determines and utilizes a first loyalty award sequence specific to the first gaming device to provide the player a loyalty award. In this example, if the player moves to a second gaming device in communication with the central server, the gaming system determines and utilizes a different, second loyalty award sequence specific to the second gaming device to provide the player the same loyalty award. In another example, if a player is playing a game at a first wager amount (and thus utilizing a first paytable) on a gaming device, the gaming system determines and utilizes a first loyalty award sequence specific to the game played at the first wager amount to provide the player a loyalty award. In this example, if the player switches to playing a game at a second wager amount (and thus utilizing a second paytable) on the same gaming device or a different gaming device, the gaming system determines and utilizes a second loyalty award sequence specific to the game played at the second wager amount to provide the player a loyalty award.

In one embodiment, in determining a gaming device's paytable (or overall payback percentage), the base or primary game payback percentage is separate from the bonus or secondary game payback percentage. In one such embodiment, in determining the loyalty award sequence for a determined amount to be provided as the loyalty award, the central server accounts for the base game payback percentage (and not the bonus game payback percentage). In another such embodiment, in determining the loyalty award sequence for a determined amount to be provided as the loyalty award, the central server accounts for both the base game payback percentage and the bonus game payback percentage.

It should be appreciated that differing from promotional credits, the determined loyalty award sequence is instantaneously provided to a player. That is, the moment the player qualifies for a loyalty award, an appropriate loyalty award sequence is downloaded from the central server and playable on the player's currently played gaming device. Such a configuration provides that if it is determined to provide a player a loyalty award, the central server determines an appropriate loyalty award sequence to immediately provide a loyalty award (via any gaming device in communication with the central server) which the player is playing. Such a configuration further enables immediate access to a loyalty award utilizing the gaming device the player is currently playing and does not require the player to make another trip to the gaming establishment at another time to obtain their loyalty award.

After determining a value of the loyalty award and the appropriate loyalty award sequence, as illustrated in block 108 of FIG. 4, the central server communicates a loyalty award sequence triggering message to the player's currently played gaming device. In one such embodiment, a triggering message includes information or data regarding the determined loyalty award sequence. In another such embodiment, the triggering message included information or data regarding a value or amount to be provided as the loyalty award and the determined loyalty award sequence to be utilized to provide such a value or amount to the player. In one embodiment, the triggering message includes the determined loyalty award sequence. In another embodiment, the triggering message includes instructions that cause the gaming device to execute the determined loyalty award sequence (which is stored locally by the gaming device). In an alternative embodiment, the central server decides to hold the loyalty award until a later time for any number of reasons, such as: the player does not have enough funds to use it, the player is cashing out, or the gaming establishment is currently at a "busy" time and no incentive is needed to influence the player to play more.

In one embodiment, a message controller or message module associated with the central server sends one or more messages to be displayed on the player's gaming device to inform the player that a loyalty award sequence is being offered and what the loyalty award sequence entails. In one embodiment, the messaging is positioned and/or timed to not interfere with the current game played. In another embodiment, the gaming establishment operator is enabled, via the message controller, to configure the presentation, look, and feel of the messages displayed to the player. In one embodiment, the gaming device forms or opens a window on the main game display to provide information regarding the loyalty award sequence. In one embodiment, the message regarding the loyalty award sequence is provided by the gaming device processor. In another embodiment, the message regarding the loyalty award sequence is remotely provided by the central server.

After receiving information regarding the determined value to be provided as the loyalty award and the determined loyalty award sequence, as illustrated in block 110 of FIG. 4, the gaming device triggers the determined loyalty award sequence and provides the player a loyalty award.

It should be appreciated that any suitable primary game or secondary game may be incorporated into the loyalty award sequence provided to the player. In different embodiments, the loyalty award sequence may incorporate any of the types of games described herein, as well as any suitable wheel game, any suitable selection game, any suitable offer and acceptance game, any suitable cascading symbols game, any suitable ways to win game, any suitable scatter pay game or any other suitable type of game. In one embodiment, the gaming system incorporates different games to incorporate into the loyalty award sequence based on different values determined to be provided as the loyalty award. In one embodiment, if the determined value is within a first range of values, the gaming system utilizes a first type of game in the loyalty award sequence and if the determined value is within a second range of values, the gaming system utilizes a second type of game in the loyalty award sequence. In different embodiments, the type of game utilized in the loyalty award sequence is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, once the loyalty award sequence is set to begin, the gaming device does not enable player initiated changes in denomination, coins bet per line, or lines played until completion of the loyalty award sequence. In this embodiment, since the central server determines the loyalty award sequence based on certain gaming parameters specific to the player's game play at the player's currently played gaming device, any player initiated changes to these parameters would alter the previously determined loyalty award sequence. For example, if the central server determined a value of $5.00 to be provided as the loyalty award and further determined a loyalty award sequence of a player playing 10 games with an average expected payout of $0.50 per game played, and prior to initiating the loyalty award sequence, the player switched to a game with a $0.95 average expected payout per game played, then the 10 games of the loyalty award sequence would theoretically provide the player a value of $9.50 for the loyalty award sequence. For this reason, once the loyalty award sequence is set to begin, the gaming device does not enable player initiated changes in denomination, coins bet per line, or lines played until completion of the loyalty award sequence. Such a configuration encourages players to wager consistently so that when the central server determines to provide that player a loyalty award, the gaming parameters of the loyalty award sequence will be the same or substantially the same as the gaming parameters which the player was previously playing.

In another embodiment, the gaming system disclosed herein determines and provides the loyalty award sequence based on a maximum wager. In this embodiment, even if the player is not currently playing a primary game at the maximum wager amount, the gaming system determines and provides the loyalty award sequence at such maximum wager amount. That is, the loyalty award sequence includes an upgrade of the player's current wager amount to the maximum wager amount for one or more plays of one or more games of the loyalty award sequence.

In another embodiment, the gaming system disclosed herein enables a player to change one or more aspects of their gaming activity. In this embodiment, as the player changes one or more aspects of their gaming activity (such as changes in denomination, coins bet per line, or lines played until completion), the gaming device and/or central server dynamically changes the loyalty award sequence such that the player is still provided the same or substantially the same loyalty award. In one such embodiment, the player is enabled to change one or more aspects of their gaming activity, the gaming device/central server reconfigures the loyalty award sequence and the player is enabled to accept or reject the reconfigured loyalty award sequence. In this embodiment, if the player accepts the reconfigured loyalty award sequence, the reconfigured loyalty award sequence proceeds with the changed aspects of gaming activity.

It should be appreciated that while the utilized loyalty award sequence is determined based on a value or amount the central server wants to provide to the player as the loyalty award, the actual loyalty award provided to the player may differ. That is, the central server determines, based on an average expected payout, a theoretical value or amount to provide to the player as a loyalty award, but the actual value or amount provided to the player as the loyalty award is determined by the gaming device. This configuration provides that while there is a relatively high probability that the actual value of the loyalty award will be the same or substantially the same as the theoretical value of the loyalty award, the actual gaming device determined value for the loyalty award may be substantially higher than the central server determined theoretical value for the loyalty award or substantially lower than the central server determined theoretical value for the loyalty award. Such a configuration creates excitement for players by providing perceived volatility of the gaming system/gaming device disclosed herein. However, it should be appreciated that over a large enough sample of time, the actual value provided to the players as the loyalty awards should be equal or substantially equal to the determined theoretical value to provide to the players as the loyalty awards.

After providing the player a loyalty award, as indicated in block 112 of FIG. 4, the gaming device communicates a loyalty award sequence completion message to the central server, wherein the completion message includes information regarding the loyalty award actually paid to the player in the triggered loyalty award sequence. Upon communicating the loyalty award completion message to the central server, as indicated in block 114, the gaming device ends the loyalty award sequence and enables the player to return to normal game play mode.

In another embodiment, the central server provides the determined award information to the gaming device and the gaming device determines the appropriate loyalty award sequence. In this embodiment, the central server communicates information or data to a gaming device, wherein the information or data relates to the determined theoretical value to be provided as the loyalty award. Upon receiving such communicated information or data, the gaming device determines the appropriate loyalty award sequence to attempt to provide the determined theoretical value for the loyalty award to a player. After determining a loyalty award sequence and providing the player an actual loyalty award, the gaming device communicates back to the central server information or data related to the actual loyalty award provided as the loyalty award.

In one embodiment, the general flow of the loyalty award sequence, and the pertinent information displayed to the player should be fixed and is preferably unalterable by the gaming establishment operator once entered into the gaming system. However, it should be appreciated that the screens and audio should be configured to be customizable by the gaming establishment operator to allow for insertion of downloadable artwork, sound and other information adaptable for branding. That is, in one embodiment, the gaming system provides a facility for downloading this content to the gaming machine including (1) default artwork and sound in the event branding is not desired or not downloaded to the machine at the time of the award sequence, (2) files should be in common industry standard formats, (3) a means to load these files into the back-of-house server and download them to the gaming machine, and (4) a way to update and confirm changes to the content (such as a scheduler).

In one embodiment, the gaming system/gaming device enables the player to accept or reject to player a loyalty award sequence. That is, the gaming system/gaming device enables the player to choose whether or not to play the loyalty award sequence at the time it is offered. In one embodiment, if the player rejects the offered loyalty award sequence, then the player will lose (i.e., be unable to later play) the loyalty award sequence. In another embodiment, if the player rejects the offered loyalty award sequence, the player's loyalty award sequence is stored or escrowed for use at a later time. In this embodiment, the stored data includes, but is not limited to, the player's name, the player's ID, the date/time of earning the loyalty award sequence, any expiration of the stored loyalty award sequence, any applicable multiplier, the determined theoretical amount to provide to the player as the loyalty award, the applicable denomination of the loyalty award sequence, any applicable wager amount, any applicable maximum wager amount and/or any other suitable criteria.

In various embodiments which utilize storing a loyalty award sequence, the central server continuously or at regular intervals reevaluates the player's gaming activity to determine if the correct condition exists to offer the player the ability to play the stored loyalty award sequence. In this embodiment, when the central server determines that the situation is correct to attempt to provide a stored loyalty award sequence, the central server prompts the gaming device to provide the stored loyalty award sequence. If the gaming device rejects the central server's request to provide the stored loyalty award sequence (i.e., the gaming device determines that the condition is not right to provide the loyalty award sequence), the central server continues to store the rejected loyalty award sequence for any subsequent reattempts. If the gaming device accepts the stored loyalty award sequence (i.e., the gaming device concurs that the conditions are correct to provide the stored loyalty award sequence), the gaming device presents the stored loyalty award sequence to the player. In one such embodiment, the gaming device enables the player to reject (i.e., decline to initiate) a previously stored loyalty award sequence, wherein the rejected loyalty award sequence is stored for any subsequent reattempts. In these embodiments, the conditions for providing a stored loyalty award sequence include, but are not limited to, does the player have sufficient credits on the credit meter, is the date and time within an established date and time range, has the player wagered a minimum or maximum amount of coin-in, is the jackpot at or around a jackpot win, is the player playing the same type of game they won the loyalty award on, is the player wagering within a suitable range of wager amounts and/or any other suitable criteria.

In one embodiment, player's may desire to hold off on playing their stored loyalty award sequences until they feel "lucky". The gaming system/gaming device disclosed herein is configured to enable the player to choose when to use the stored loyalty award sequence. In this embodiment, the player initiates a request to play a stored loyalty award sequence at the player's currently played gaming device, such as via the gaming device's screen or via a player tracking panel. In one such embodiment, the player is required to enter a identifying device and/or to enter a suitable security code, such as a PIN number. Upon receiving the request to use the stored loyalty award sequence, the central server determines, as described above, if the conditions are correct to provide the stored loyalty award sequence. As described above, if the conditions are not correct (i.e., the loyalty award sequence is rejected by the gaming device), the rejected loyalty award sequence is stored by the central server. In these embodiments, such conditions include, but are not limited to, does the player have sufficient credits on the credit meter, is the player wagering a suitable amount, is the player playing a suitable game, has the player wagered a suitable amount of coin-in, is the jackpot at or around a jackpot win, is the player a suitable ranking, has the player earned a suitable amount of player tracking points and/or any other suitable criteria In another embodiment, the gaming system is configured to enable the player to simultaneously escrow or store multiple loyalty award sequences. In one such embodiment, the gaming system is configured to enable the player to combine two or more loyalty award sequences into one loyalty award sequence. In this embodiment, when combining two or more loyalty award sequences, the central server adds the theoretical amount associated with each of the loyalty award sequences together. In different embodiments, the central server determines a loyalty award sequence to provide to the player based on the combined theoretical amounts, the gaming device currently played, any applicable wager amount, the wager amount currently played, the player's rank and/or any other suitable characteristic. For example, for a designated player, the gaming system simultaneously stores a first stored loyalty award sequence associated with a theoretical value of $20 and a second stored loyalty award sequence associated with a theoretical value of $10. In this example, the central server is operable to combine the first and second stored loyalty award sequences and offer the player a new loyalty award sequence based on a theoretical value of $30.

In another embodiment, stored loyalty award sequences are associated with a time period for usage. Such stored loyalty award sequences may be associated with a time of day, certain day(s) of week, a month and/or a year which they can be used. In one such embodiment, the central server excludes the player from playing a stored loyalty award sequence during certain days and times. For example, a player's previously stored loyalty award sequence is available for play every day in July from 8:00 am to 5:00 pm except July 4.

In another embodiment, stored loyalty award sequences are associated with a designated storage period before usage. In one such embodiment, a stored loyalty award sequence cannot be used until a specified number of games have been played (by the player or on one or more gaming devices). In another such embodiment, a stored loyalty award sequence cannot be used for a designated period of time from when such loyalty award sequence is stored.

In another embodiment, loyalty award sequences are associated with an expiration date and time. In this embodiment, the gaming system/gaming device is configured to communicate to the player the proximity of the expiration of any stored loyalty award sequences (i.e., "your award will expire at 6:00 am tomorrow"). In one embodiment, such notice of expiration of a stored loyalty award sequence is at the player's currently played gaming device. In another embodiment, such notice of expiration of a stored loyalty award sequence is external from the player's currently played gaming device, such as via e-mail.

In another embodiment, one or more loyalty award sequences expire after a designated number of games have been played (since the loyalty award sequence was offered to the player or since the loyalty award sequence was stored). In another embodiment, one or more loyalty award sequences expire after a designated period of time (since the loyalty award sequence was offered to the player or since the loyalty award sequence was stored). In another embodiment, one or more loyalty award sequences expire upon completion of a player's current gaming session. In another embodiment, if multiple loyalty award sequences are stored in associated with a player's account, the gaming system limits or caps the number of loyalty award sequences that may be stored at any one time. In different embodiments, if multiple loyalty award sequences are stored in associated with a player's account, the presentation of stored loyalty award sequences are provided to the player in order of expiration (first to expire shows first), in order of first earned basis, in order of being associated with the greatest theoretical amount or in order of being associated with the least theoretical amount. In another embodiment, the theoretical amount associated with a stored loyalty award sequence is dynamic and changes based on current gaming status. For example, if it is a busy time the theoretical amount associated with a stored loyalty award sequence may be worth less, if it is a slow time, the theoretical amount may be worth more. In one such embodiment, the gaming system provides the player notice of the implications of using a stored loyalty award sequence at different times.

In another embodiment, the gaming system enables a player to stop or pause a loyalty award sequence in the middle of the sequence. In this embodiment, the gaming system stores the remaining portion of the loyalty award sequence. In one such embodiment, the same adjustment algorithm is applied to the remaining sequence as is applied to the full sequence. In another embodiment, if a time-out parameter is satisfied (i.e., a designated amount of time without gaming activity) in the middle of a loyalty award sequence, the gaming system stores the remaining, unused portion of the loyalty award sequence.

In another embodiment, if a player stores one or more loyalty award sequences, such stored loyalty award sequences are associated with a plurality of points or tickets derived from the value to be provided to the player as the loyalty award for the stored loyalty award sequence. In this embodiment, different games at different gaming devices are associated with different numbers of points or tickets to play such games. The gaming system enables the player to choose which games they want to play (as part of their loyalty award sequence) based on the points associated with the player's stored loyalty award sequence and the number of points required to play the different games.

In one embodiment, the gaming system disclosed herein displays any stored loyalty award sequences to the player as one or more tokens. In one such embodiment, any characteristics or attributes associated with a stored loyalty award sequence, such as an expiration time or a designated time period prior to usage, are displayed with the token that corresponds to a stored loyalty award sequence. In these embodiments, if a player wants to utilize their stored loyalty award sequence (or part of their stored loyalty award sequence), the gaming system enables the player to select the token which corresponds to such stored loyalty award sequence. In +different embodiments, the player selects one or more tokens utilizing a gaming device input, a gaming device service window, a player tracking device, or any suitable manner.

In another embodiment, the gaming system disclosed herein provides a player a loyalty award from a loyalty award sequence in the form of non-redeemable credits. Such non-redeemable credits cannot be cashed out of the gaming device but must be wagered at the gaming device. This embodiment enables the gaming system to provide larger loyalty awards (as opposed to loyalty awards credits which may be immediately cashed out) because the non-redeemable credits are cycled through the gaming device and its associated paytable at least one additional time.

In one embodiment, the central server determines to provide the player a loyalty award utilizing a free spin loyalty award sequence. In this type of loyalty award sequence, the gaming device is commanded by the central server to provide a certain quantity of free spins. In this embodiment, in determining the number of free spins to include in the free spin loyalty award sequence, the central server must account for the average expected payout or average expected value of each free spin (which is based on the game being played and its associated paytable) and equate this value to the value or amount determined to be provided to the player as the loyalty award. This determination requires analysis of the bet placed, the paytable utilized and the value or amount previously determined by the central server to be provided as the loyalty award. That is, a defined relationship exists between the determined number of free spins and the determined value or amount to provide to the player as a loyalty award.

For example, if the central server determines a value of $19.00 to be provided to the player as a loyalty award and the player is currently playing a first game that has an overall payout percentage of 95.00% (i.e., the average expected payout for each spin is $0.95 for every $1.00 wagered), the central server determines to provide the player 20 free spins in the loyalty award sequence. That is, the 20 free spins with an average expected payout of $0.95 per spin equals a total expected value of $19.00 for the free spins (which is equal to the value of $19.00 previously determined to be provided to the player as the loyalty award). In another example embodiment, rather than utilizing 20 free spins to provide the player a loyalty award, the central server determines a free spin loyalty award sequence of 10 free spins wherein any award is modified by a multiplier of 2× (or 5 free spins wherein any award is modified by a multiplier of 4×) to attempt to provide the player a loyalty award of $19.00. In another example embodiment, rather than utilizing a set number of free spins with a designated number of activated paylines to provide the player a loyalty award, the central server modifies the number of activated paylines and thus modifies the number of free spins in the loyalty award sequence. For example, rather than utilizing 20 free spins wherein 4 paylines are activated per free spin, the central server determines a free spin loyalty award sequence of 10 free spins wherein 8 paylines are activated per free spin (or 40 free spins wherein 2 paylines are activated per free spin) to attempt to provide the player a loyalty award of $19.00.

In another example, if the central server determines the same value of $19.00 to be provided to the player as a loyalty award, but the player is currently playing a second game (at a second gaming device) that has an overall payout percentage of 76.00% (i.e., the average expected payout for each spin is $0.76 for every $1.00 wagered), the central server determines to provide the player 25 free spins in the loyalty award sequence. That is, the 25 free spins with an average expected payout of $0.76 per spin equals a total expected value of $19.00 for the free spins (which is equal to the value of $19.00 previously determined to be provided to the player as the loyalty award). It should be appreciated that these two examples illustrate how the central server determines to provide the player a loyalty award, the central server determines an appropriate loyalty award sequence regardless of which gaming device in the gaming system the player is currently playing. In another such embodiment, if the player is playing a first game and the central server determines a first number of free spins to provide in the loyalty award sequence, but prior to playing the first number of free spins, the player switches to a second, different game, the central server is programmed to reconfigure the number of free spins to provide in the loyalty award sequence to correspond to the second, different game.

It should be appreciated that in the event the determination of how many free spins to provide in the free spin sequence does not evenly match the previously determined value to provide as the loyalty award, the gaming establishment may utilize any suitable manner to provide the difference to the player. In one embodiment, the gaming system provides the difference to the player as an additional payout in a primary or secondary game. In another embodiment, the gaming system allocates the difference to an escrow account to be used the next time the player wins a loyalty award. In another embodiment, the gaming system rounds up the number of free spins to provide in the free spin loyalty award sequence (wherein a negative escrow is used, as described above, to subtract the difference from the player's next loyalty awards).

In another embodiment, if a free spin loyalty award sequence is triggered, the central server utilizes a fixed number of free spins and determines an applicable multiplier to apply to each of the fixed number of free spins. In this embodiment, the central server determines, based on the average expected payout of each spin and the central server determined value to provide to the player as the loyalty award, a multiplier to apply to one or more of the fixed number of free spins. In different embodiments, the fixed number of free spins provided is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

Figure 5A:
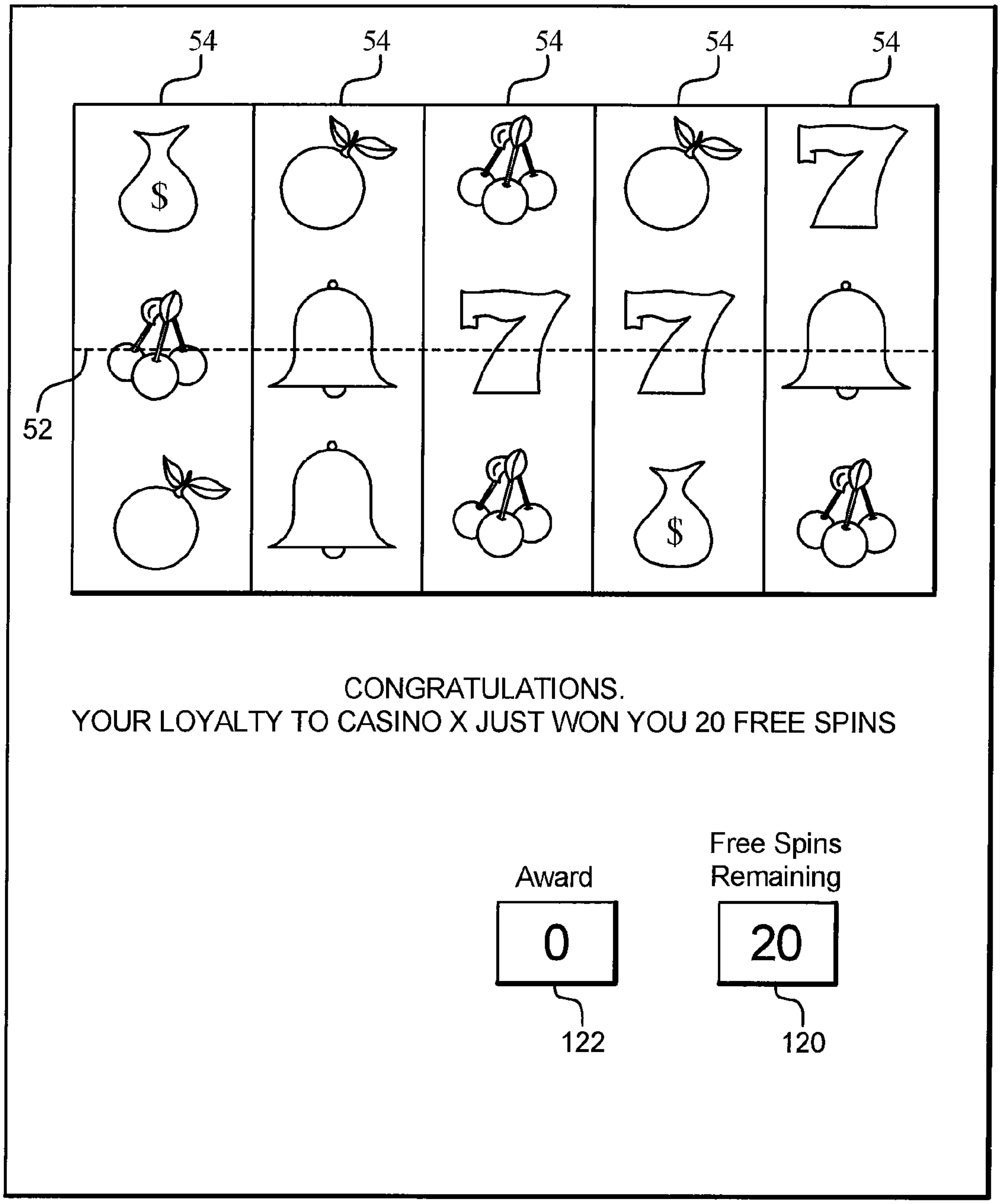
FIGS. 5A and 5B are front-side perspective views of one embodiment of the gaming device disclosed herein illustrating a free spin loyalty award sequence provided to a player.

As described above, after determining the value to provide as the loyalty award and the appropriate free spin loyalty award sequence, the central server communicates such information to gaming device. In one embodiment, the gaming machine checks to make sure the number of free spins to be provided in the free spin loyalty award sequence is within a valid range of possible free spins. In another embodiment, the free spin loyalty award sequence triggering message includes a time-out parameter to let the gaming machine know how long to wait in idle before initiating the free spin loyalty award sequence. Upon receiving the free spin loyalty award sequence triggering message from the central server, the gaming device waits until the conclusion of any gaming activity currently underway and presents a message to the player that indicates what they have won, what the rules are, and how to initiate the loyalty award sequence. For example, as seen in FIG. 5A, the gaming device displays appropriate messages such as "CONGRATULATIONS, YOUR LOYALTY TO CASINO X JUST WON YOU 20 FREE SPINS" to the player visually, or through suitable audio or audiovisual displays. As further seen in FIG. 5A, the gaming device also displays a Free Spins Remaining indicator or meter 120 which informs the player of the number of free spins remaining in the free spin loyalty award sequence. In one embodiment, as mentioned above, the gaming device utilizes the digital top-glass and sound to display enticing messages and images that the gaming device is in a free spin loyalty award sequence.

In one embodiment, the gaming device provides the player the number of free spins of the free spin loyalty award sequence, wherein the free spins are granted at the wager amount, denomination, and lines bet that are in effect when the game received the free spin loyalty award sequence trigger command from the central server. In this embodiment, the free spin sequence is provided to the player utilizing a paytable associated with the player's last wager amount. For example, if the player was wagering $1 on each of three paylines prior to the triggering of the free spin loyalty award sequence, the triggered free spin loyalty award sequence would include three active paylines wherein the paytable associated with a $1 wager is applicable for each active payline. It should be appreciated that the utilization of the paytable associated with the player's current wager encourages players to maintain their bet at a constant level because the player's are fearful they may get a lower loyalty award when they bet below their normal wager level. In another embodiment, the free spin loyalty award sequence is provided to the player utilizing a paytable associated with the player's average wager amount over a session (i.e., the time between the start of the loyalty award tracking and the gaming device providing the player a loyalty award). In another embodiment, the free spin loyalty award sequence is provided to the player utilizing a paytable associated with the player's average wager amount over a week, a month, a year, or any other suitable duration of the player's gaming activity.

In this embodiment, once the free spins are initiated, the sequence cannot be stopped and the gaming device will provide each free spin of the free spin loyalty award sequence. For each free spin, the gaming device generates a plurality of symbols on the reels and analyzes the generated symbols to determine if the symbols generated along any active paylines form any winning symbols or symbol combinations. If any winning symbol or symbol combinations are generated for that free spin, the gaming device provides the player the award associated with such generated winning symbol or symbol combination. After providing the player any award associated with that free spin, the gaming device determines if at least one free spin remains. If at least one free spin remains, the gaming device generates another plurality of symbols and analyzes these generated symbols as described above. If zero free spins remain, the gaming device ends the free spin loyalty award sequence.

In one embodiment, upon the ending of the free spin loyalty award sequence, the gaming device communicates a completion message to the central server and returns to normal game play. The purpose of a completion message is to provide feed back on the free spin loyalty award sequence, including the number of free spins that were actually played by the player, the total amount paid to the player and any failure codes (to indicate any problems that may have occurred). In one embodiment, all messages are logged into the gaming machine's event log.

Figure 5B:
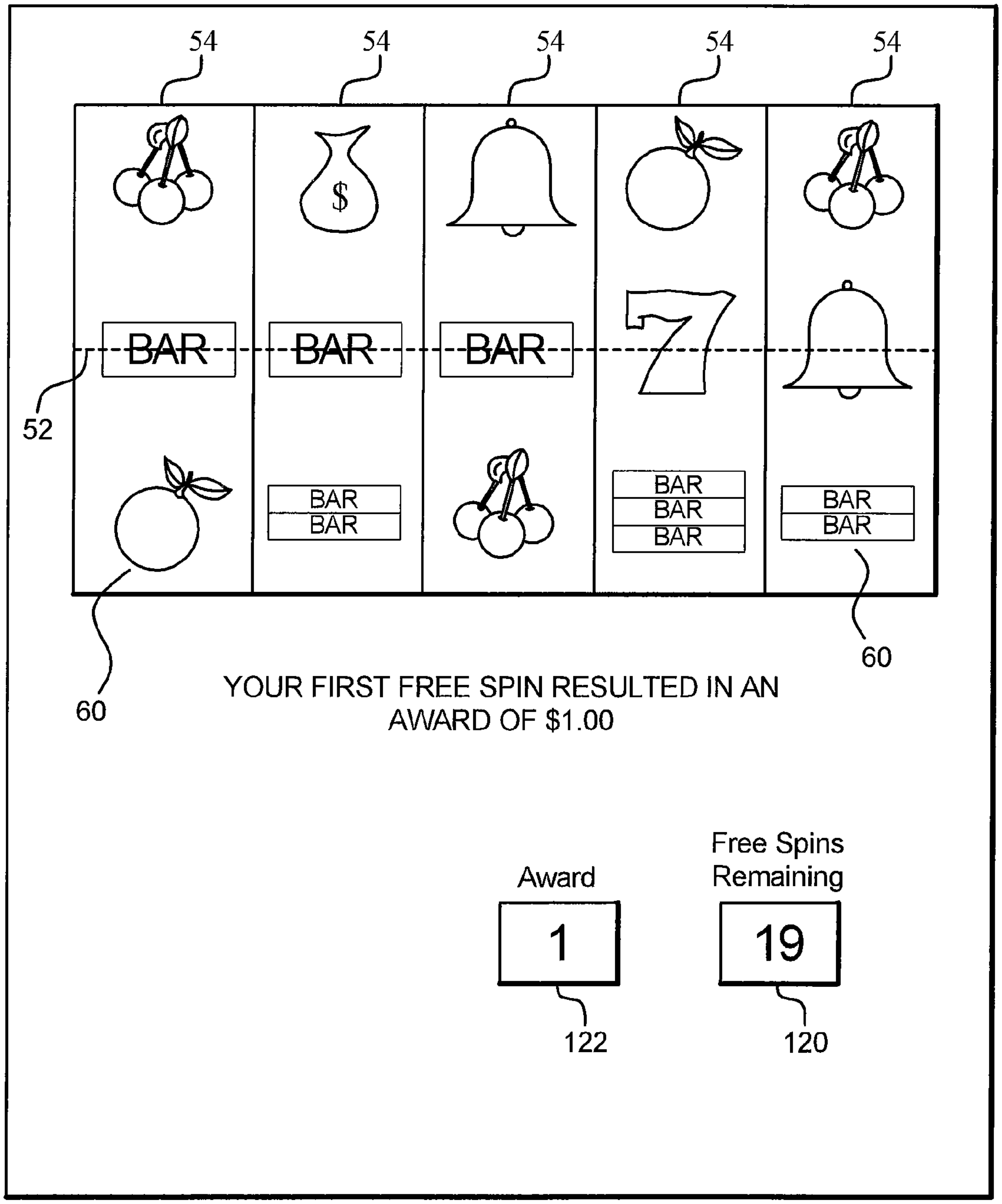

For example, as seen in FIG. 5B, for the first free spin of the free spin loyalty award sequence, the gaming device generated a plurality of symbols and the gaming device provided the player the award amount of $1.00 (as seen in award meter or indicator 122) associated with the generated symbol combination of bar symbol-bar symbol-bar symbol generated on active payline 52. As seen in FIG. 5B, appropriate messages such as "YOUR FIRST FREE SPIN RESULTED IN AN AWARD OF $1.00" may be provided to the player visually, or through suitable audio or audiovisual displays.

In this example, since at least one free spin remained in the free spin loyalty award sequence, the gaming device provided the player an additional free spin. As illustrated in FIG. 6, the gaming device continued providing the player free spins in the free spin loyalty award sequence until all twenty free spins are provided to the player. After providing the player all twenty free spins of the free spin loyalty award sequence, the gaming device communicates a completion message to the central server and returns to a normal game play mode.

It should be appreciated that as illustrated in FIG. 6, the actual loyalty award of $26.00 provided to the player for the free spin loyalty award sequence is different than the value of $19.00 previously determined by the central server to be provided to the player for the free spin loyalty award sequence. That is, in this example, the central server determined a theoretical value or amount of $19.00 to provide to the player as a loyalty award, but the actual value or amount of $26.00 provided to the player as the loyalty award was determined by the gaming device. In one embodiment, the gaming device communicates this information to the central server which stores the actual loyalty award amount and determines and stores any variance between the actual loyalty award amount and the theoretical loyalty award amount.

In one embodiment, the gaming device enables the player to auto-play the free spin loyalty award sequence. In one such embodiment, the gaming device auto-plays the free spins of the free spin loyalty award sequence once the player makes an initiating button press. In these embodiments, the award meter will be displayed to the player during the free spin loyalty award sequence. In another embodiment, the gaming device provides the player the option to initiate each free spin of the free spin loyalty award sequence. In one embodiment, the gaming device provides a timeout parameter that initiates the free spin loyalty award sequence if the player goes too long without pressing the initiating button.

In another embodiment, the gaming systems funds one or more free spin loyalty award sequences from promotional credits. In this embodiment, the central server provides the gaming device with a wagering value in the form of promotional credits. The gaming device holds or escrows the provided promotional credits in a promotional credit account, wherein the player cannot initially cash out the provided promotional credits. In this embodiment, for each free spin played of the free spin loyalty award sequence, the gaming device uses a portion of the held promotional credits until the played free spin games consume all of the provided promotional credits. For example, for a $20 free spin loyalty award sequence which includes 10 games for a theoretical loyalty award of $19.00, the gaming device provides a pool of $20 in promotional credits with instructions to place a $2 wager for ten consecutive games. It should be appreciated that the utilization of promotional credits provides certain tax advantages in some gaming establishment jurisdictions.

In another example embodiment, the central server determines to provide the player a loyalty award utilizing a multiplied payout loyalty award sequence. In such a multiplied payout loyalty award sequence, the central server determines a number of wagering games to play wherein any credits won (during the determined number of games) are multiplied by a gaming system specified integer multiplier value. In this embodiment, in determining the multiplier value and the number of games to play (which the determined multiplier value will be applicable for) in the multiplied payout loyalty award sequence, the central server must take into account the average expected payout or value of each game played (which is based on the specific gaming device played, its associated paytable and the player's current wager amount) modified by any applicable multiplier value and equate this value or amount to the value or amount previously determined by the central server to provide to the player as the loyalty award. It should be appreciated that any suitable primary game or secondary game may be implemented as the game played during the multiplied payout loyalty award sequence.

In operation of this embodiment, upon the central server determining to provide a loyalty award in a multiplied payout loyalty award sequence, the central server determines, based on the determined value or amount to provide to the player as a loyalty award, a number of games to provide in the multiplied payout loyalty award sequence and an appropriate multiplier to apply to each of these determined number of games. That is, a defined relationship exists between the determined multiplier amount, the determined number of games and the determined value or amount to provide to the player as a loyalty award.

In one such embodiment, the central server determines an appropriate multiplier amount and then determines, based on the determined multiplier and the value determined to be provided as the loyalty award, a number of games to provide in the multiplied payout loyalty award sequence. In another such embodiment, the central server determines a number of games to provide in the multiplied payout loyalty award sequence and then determines, based on the determined number of games and the value determined to be provided as the loyalty award, an appropriate multiplier amount. In another embodiment, the central server dictates the minimum win value to be multiplied. In another embodiment, the central server dictates the maximum win to be multiplied. In this embodiment, any win above this maximum win level is paid at the paytable payment rate only. In another embodiment, the central server defines a minimum and maximum win range such that any wins above or below the defined range are not multiplied.

In one embodiment, the multiplier is determined based on the player's status in a player tracking system. For example, bronze players receive a 2× multiplier, silver players receive a 3× multiplier, gold players receive a 4× multiplier, and platinum players receive a 6× multiplier. In different embodiments, the multiplier is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In another embodiment, the number of games to provide in the multiplied payout loyalty award sequence is determined based on the player's status in a player tracking system. For example, platinum players receive more games in the multiplied payout loyalty award sequence than gold players which receive more games than silver players which receive more games than bronze players. In different embodiments, the number of games to provide in the multiplied payout loyalty award sequence is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In another such embodiment, the central server utilizes an appropriate formula (which takes into account data on the number of games and the available multipliers) to compare such data to a number of free games awarded for calculation purposes. The central server analyzes this comparison with the game's payout percentage to determine a cost. The central server uses such a computation method to determine how many games are to be awarded to match the "cost" of the determined value to be provided as the loyalty award in the multiplied payout loyalty award sequence. For example, the central server (or alternatively a gaming establishment operator) configures a number of games and the multiplier for multiplied payout loyalty award sequence wherein the number of games (n) multiplied by the average multiplier (X) minus one $[n^*(X-1)]$ is equivalent to a number of free games awarded. In this example, the cost (C) of the promotion is this number times the game's payout percentage (p). Thus, $C=p^*[n^*(X-1)]$.

In this embodiment, after determining the number of games to provide and the applicable modifier for the determined number of games, the central server communicates such information to the gaming device. In one embodiment, the communicated information also includes a limit of the largest payout or win amount the multiplier may be applied to. In this embodiment, the gaming device informs the player of this limit so the player is aware of any limitations on the multipliers effect during the game session. In one embodiment, the gaming machine checks to confirm that the determined number of games in the multiplied payout loyalty award sequence is within a valid range of possible numbers of games. In one embodiment, a maximum allowable multiplier can be selected by a loyalty offer adjustment algorithm (in the event of low player credits on the machine). In another embodiment, the minimum win to be multiplied is selected by a loyalty offer adjustment algorithm. In this embodiment, any win less than the minimum win is not multiplied.

In one embodiment, upon receiving information from the central server regarding the number of games to provide and the applicable modifier for the multiplied payout loyalty award sequence, the gaming device evaluates the number of player credits currently on the gaming machine and determines if there are enough player credits on the gaming machine to complete the number of wagers required to complete an entire multiplied payout loyalty award sequence (assuming no winning outcomes result in the session). That is, the gaming device processor confirms the player credit meter value is equal to or greater than the associated cost of the number of determined games for the multiplied payout loyalty award sequence times the initiating bet.

In one embodiment, if there are not enough credits to complete the entire multiplied payout loyalty award sequence (or a portion of the multiplied payout loyalty award sequence), the gaming machine will reject the multiplied payout loyalty award sequence and communicate the appropriate messages back to the central server. For example, if the multiplied payout loyalty award sequence includes 20 games played wherein each game requires a wager of $1.00 (such that the entire multiplied payout loyalty award sequence requires $20.00 available on the player's gaming device) but the player's gaming device only has $8.00 available to play these games, the gaming device will reject the multiplied payout loyalty award sequence communicated from the central controller. In another example, if the wager amount required for one game played during the multiplied payout loyalty award sequence is 45 credits and the gaming device credit meter only contains 10 credits, the gaming device will not accept the multiplied payout loyalty award sequence and no multiplied payout loyalty award sequence will occur. In another embodiment, the gaming device provides the player a message about the loyalty sequence and prompts the player to accept the multiplied payout loyalty award sequence (and hence deposit more money) or reject the multiplied payout loyalty award sequence (e.g., if they do not have the money or do not wish to spend it).

In another embodiment, if there are not enough credits to complete the entire multiplied payout loyalty award sequence, the gaming machine modifies the communicated multiplied payout loyalty award sequence. In one embodiment, the gaming device determines, based on the amount of credits available, how many games of the multiplied payout loyalty award sequence can be played at the current wager amount. In this embodiment, after determining a modified number of games to play in the multiplied payout loyalty award sequence, the gaming device also determines a modified multiplier to be applied to the modified number of games. In one such example, the gaming device modifies the multiplied payout loyalty award sequence by increasing the multiplier while decreasing the number of games to play in the multiplied payout loyalty award sequence. For example, if the central server determined that the multiplied payout loyalty award sequence would include 20 games with an applicable modifier of 2×, but the gaming device does not have enough credits to fund 20 games, the gaming device modifies the multiplied payout loyalty award sequence by reducing the number of games in the multiplied payout loyalty award sequence to 10 games and increasing the applicable modifier to 4×. In this embodiment, in the event that the gaming device cannot suitably modify the multiplied payout loyalty award sequence, the gaming device will not initiate the multiplied payout loyalty award sequence and will communicate the appropriate messages to the central server.

Figure 7A:
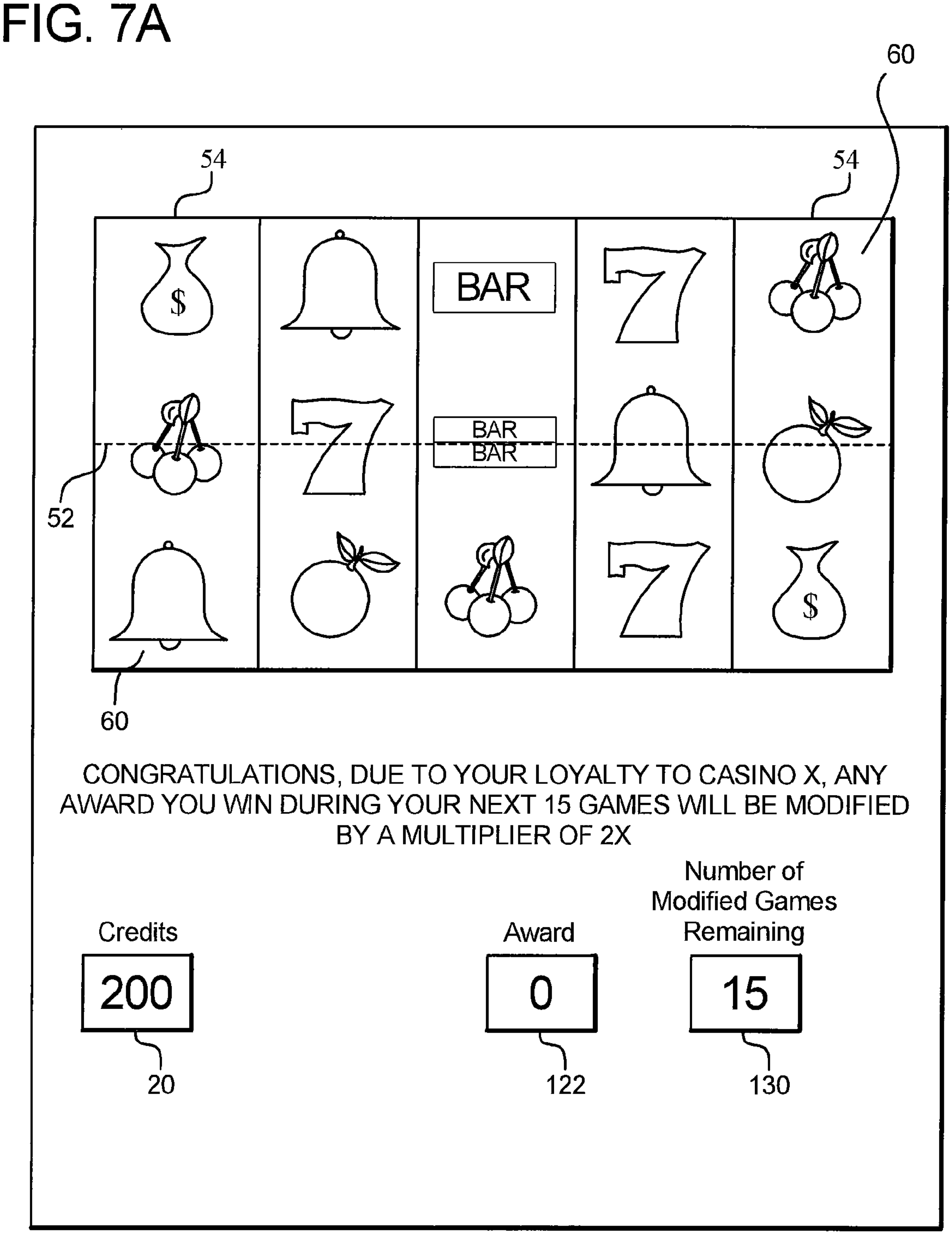
FIGS. 7A and 7B are front-side perspective views of one embodiment of the gaming device disclosed herein illustrating a multiplied payout loyalty award sequence provided to a player.

Upon receiving the multiplied payout loyalty award sequence triggering message from the central server and confirming that the gaming device has enough credits to fund the determined number of games of the multiplied payout loyalty award sequence (or alternatively modifying the multiplied payout loyalty award sequence to conform to the number of credits available on the gaming device), the gaming device waits until the conclusion of any gaming activity currently underway and presents a message to the player that indicates what they have won a loyalty award, what the rules are, and how to initiate the loyalty award sequence. For example, as seen in FIG. 7A, the gaming device displays appropriate messages such as "CONGRATULATIONS, DUE TO YOUR LOYALTY TO CASINO X, ANY AWARD YOU WIN DURING YOUR NEXT 15 GAMES WILL BE MODIFIED BY A MULTIPLIER OF 2×." to the player visually, or through suitable audio or audiovisual displays. As further seen in FIG. 7A, the gaming device displays a Number of Modified Games Remaining indicator or meter 130 which informs the player of the number of modified games remaining in the multiplied payout loyalty award sequence. In one embodiment, the gaming device utilizes the digital top-glass and sound to display enticing messages and images that the gaming device is in a multiplied payout loyalty award sequence.

For each game the player wagers on during the multiplied payout loyalty award sequence, the gaming device generates an outcome and determines if the generated outcome is a winning or losing outcome according to the applicable paytable. If the generated outcome is a winning outcome, the gaming device modifies any award associated with the winning outcome by the modifier in effect for that game and provides the modified award to the player. In one embodiment, the central server determined multiplier (or alternatively the gaming device modified multiplier) is fixed and applicable for all game played during the multiplied payout loyalty award sequence. In another embodiment, the gaming device randomly selects a multiplier for each game played during the multiplied payout loyalty award sequence. In this embodiment, the random multiplier is determined either utilizing a series of tables with weighted multipliers or utilizing a simple gaming device algorithm.

Figure 7B:
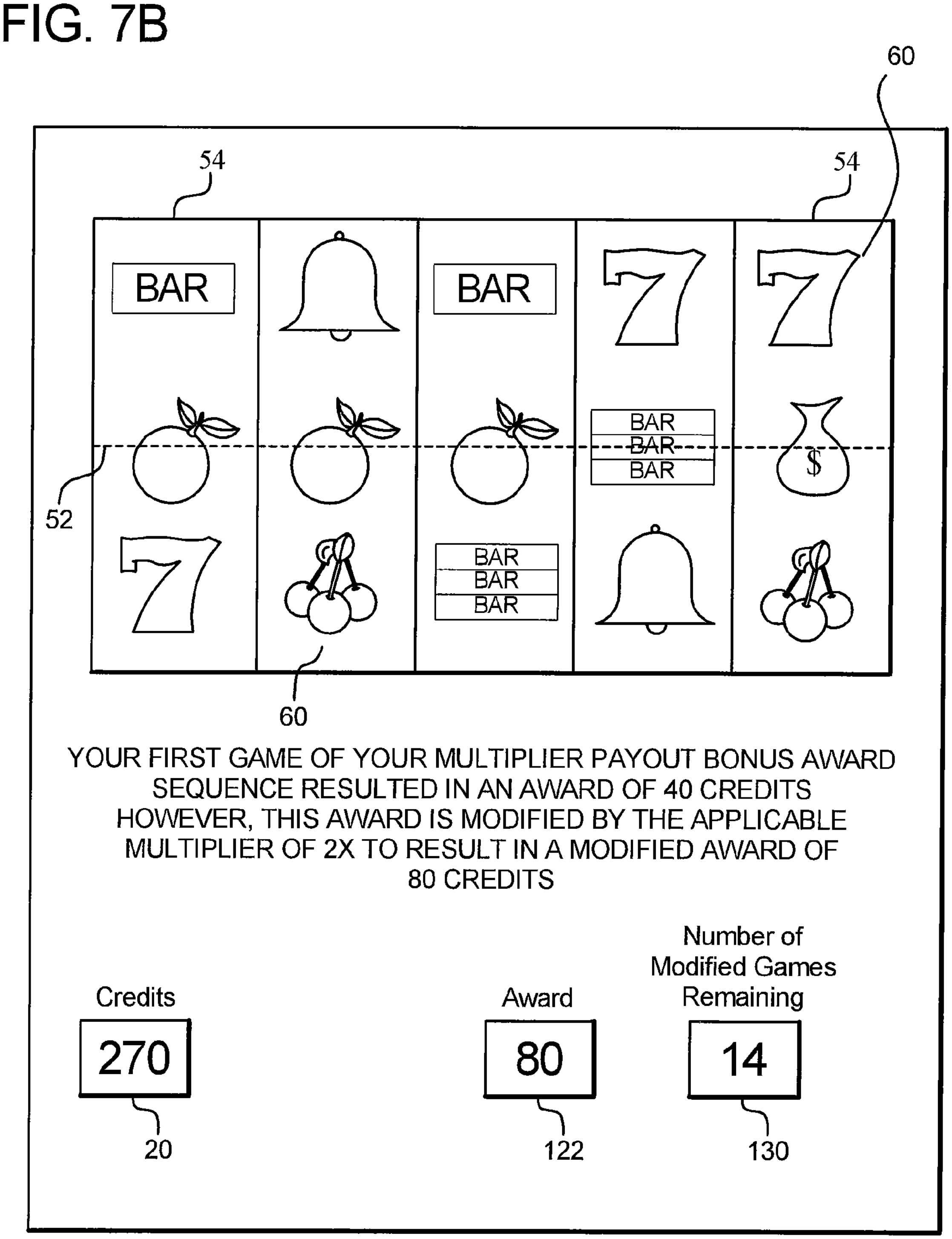

For example, as seen in FIG. 7B, upon the placing of an appropriate wager of 10 credits to initiate the first game of the multiplied payout loyalty award sequence (and thus reducing the available credits to 190 credits), the gaming device generated a plurality of symbols including the symbol combination of orange-orange-orange associated with an award of 40 credits. In this example, since any payouts or awards associated with any outcomes generated during the multiplied payout loyalty award sequence are modified by a multiplier of 2×, the gaming device provided the player a modified award amount of 80 credits for the generated orange-orange-orange symbol combination. As seen in FIG. 7B, appropriate messages such as "YOUR FIRST GAME OF YOUR MULTIPLIER PAYOUT LOYALTY AWARD SEQUENCE RESULTED IN AN AWARD OF 40 CREDITS" and "HOWEVER, THIS AWARD IS MODIFIED BY THE APPLICABLE MULTIPLIER OF 2× TO RESULT IN A MODIFIED AWARD OF 80 CREDITS" may be provided to the player visually, or through suitable audio or audiovisual displays.

After providing the modified award to the player (or if the generated outcome is a losing outcome), the gaming device determines if at least one game remains in the multiplied payout loyalty award sequence. If at least one game remains in the multiplied payout loyalty award sequence, the gaming device generates an outcome and proceeds as described above. If no games remain in the multiplied payout loyalty award sequence, the gaming device ends the multiplied payout loyalty award sequence. In another embodiment, the gaming device again checks at this point to make sure appropriate funding is still available. If it is not, the central server escrows the additional loyalty award for use at another time.

In one embodiment, upon the ending of the multiplied payout loyalty award sequence, the gaming device communicates a completion message to the central server and returns to normal game play. The purpose of a completion message is to provide feedback on the multiplied payout loyalty award sequence, including the total multiplied games that are actually played by the player, the final multiplier amount, a total paid to the player during the multiplied payout loyalty award sequence, and any failure code (to indicate any problems that may have occurred). In one embodiment, all messages are logged into the gaming machine's event log. In another embodiment, the gaming device is only responsible for the payment of the base game winnings during the multiplied payout loyalty award sequence. In this embodiment, the central server is responsible for the calculation of the multiplied win amounts, wherein the central server pays the multiplied portion of the win to the player's gaming device, the player's cashless account or balance management account, the player's credit card, to a voucher or any other suitable account.

In this example, since at least one game remained in the multiplied payout loyalty award sequence, the player's next placed wager initiated the second game of the multiplied payout loyalty award sequence. The gaming device continued providing the player game with an applicable modifier until the player separately wagered on and played each of the fifteen games of the multiplied payout loyalty award sequence. After providing the player all fifteen games of the multiplied payout loyalty award sequence, the gaming device communicates a completion message to the central server and returns to a normal game play mode. It should be appreciated that as described above with respect to the free spin loyalty award sequence, the actual value or amount the gaming device determines and provided to the player as the loyalty award during the multiplied payout loyalty award sequence may be the same, substantially the same, different or substantially different than the value or amount the central server determined to provide to the player as the loyalty award.

In one embodiment, the applicable multiplier is the same from game to game of the multiplier payout loyalty award sequence. In another embodiment, the applicable multiplier varies from game to game of the determined multiplier payout loyalty award sequence. In different embodiments, the applicable multiplier for each game of the multiplier payout loyalty award sequence is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria. It should be appreciated that in these embodiments, the average of the multiplier applied to each of the games of the multiplier payout loyalty award sequence equals or substantially equals the determined multiplier.

In one embodiment, the gaming device provides the player the determined number of games with the determined applicable multiplier in the multiplied payout loyalty award sequence, wherein the determined number of games are granted at the wager amount, denomination, and lines bet that are in effect when the game received the multiplied payout loyalty award sequence trigger command from the central server. That is, since the multiplier value and the number of games played for are determined based on the specific gaming device played, its associated paytable and the player's current wager amount or level, the central server limits or restricts the player's ability to change game types and wager amounts during the provided number of games of the player's loyalty award sequence.

In one embodiment, the central server determines the multiplied payout loyalty award sequence, and communicates the determined multiplied payout loyalty award sequence to an appropriate gaming device. In this embodiment, the appropriate gaming device executes the communicated multiplied payout loyalty award sequence and provides the results to the central server. In another embodiment, each gaming device communicates the results of each game played to the central server. In this embodiment, the central server determines, for each communicated game result, if the gaming device which communicated the game results is providing a multiplied payout loyalty award sequence. If the gaming device which communicated the game results is providing a multiplied payout loyalty award sequence, the central server modifies the communicated game results (based on the determined multiplier of the multiplied payout loyalty award sequence) and communicates the modified game results back to the gaming device to provide to the player.

In one embodiment, the multiplied payout loyalty award sequence is provided to the player utilizing a paytable associated with the player's last wager amount. In another embodiment, the multiplied payout loyalty award sequence is provided to the player utilizing a paytable associated with the player's average wager amount over a session (i.e., the time between the start of the loyalty award tracking and the gaming device providing the player a loyalty award). In another embodiment, the multiplied payout loyalty award sequence is provided to the player utilizing a paytable associated with the player's average wager amount over a week, a month, a year, or any other suitable duration of the player's gaming activity. It should be appreciated that the central server has increased flexibility in configuring the loyalty award sequence to accommodate any wager amount for each game of the loyalty award sequence.

It should be further appreciated that certain jurisdictions provide increased state income tax benefits to providing loyalty awards via the multiplied payout loyalty award sequence described above. In these jurisdictions, any amounts provided to the player in the multiplied payout loyalty award sequence which are based on the determined multiplier are deductible from the gaming establishment's gaming device or gaming related taxable income. That is, any amounts provided that are attributed to the determined multiplier of the multiplied payout loyalty award sequence are deductible for gaming tax purposes. In one example, a player wagered \$100 to fund the underlying base game portion of a multiplied payout loyalty award sequence, wherein the multiplied payout loyalty award sequence included a determined multiplier of 3× and the gaming device provided the player an amount of \$180 during the multiplied payout loyalty award sequence. In this example, the \$180 provided to the player is classified as \$60 (or \$60×1×) attributed to the play of the base game and \$120 (or \$60×2×) provides as an additional amount attributed to the determined multiplier of 3×. Based on this breakdown of provided payouts, certain jurisdictions enable the gaming establishment to deduct the \$120 provided as the loyalty award (and attributable to the determined multiplier) from the gaming establishment's gaming income. In these jurisdictions, for providing a player a loyalty award via a multiplied payout loyalty award sequence with a portion of the loyalty award based on the determined multiplier (wherein that portion is often funded by the gaming establishment's marketing department), a gaming establishment is enabled to receive additional tax benefits. Accordingly, this disclosed manner of providing one or more loyalty awards via a multiplied payout loyalty award sequence provides (in certain jurisdictions) substantial savings to a gaming establishment, which can in turn be returned back to the players to further increase their loyalty to the gaming establishment. It should be appreciated that this embodiment also provides enhanced accounting since the player's loyalty awards are earned from player's wager activities.

In one embodiment, the gaming device enables the player to auto-play the multiplied payout loyalty award sequence. In one such embodiment, the gaming device auto-plays the games of the multiplied payout loyalty award sequence once the player makes an initiating button press. In these embodiments, the award meter will be displayed to the player during the multiplied payout loyalty award sequence. In another embodiment, the gaming device provides the player the option to initiate each game of the multiplied payout loyalty award sequence. In one embodiment, the gaming device provides a timeout parameter that initiates the multiplied payout loyalty award sequence if the player does not activate the initiating button in a predetermined time period.

In one alternative embodiment, rather than providing a loyalty award sequence which includes one or more plays of one or more games (that utilize one or more attributes of the player's currently played gaming device as described above), a provided loyalty award sequence includes one or more modifications to a previously determined game play outcome. In this embodiment, such game outcome modification loyalty award sequences, when selectively activated by the player, cause a modification to one or more aspects of a previously generated game outcome in an attempt to improve such previously generated game outcome. That is, if the central server determines to provide a player a loyalty award, the central server determines and provides a player with one or more game outcome modifications (as part of a loyalty award sequence) which the player may utilize to try and improve or enhance a previously generated game outcome.

In one embodiment, the central server determines to provide one of the players a loyalty award and also determines a value of the loyalty award as described above. The central server further determines, based on the determined value of the loyalty award, a number of game outcome modifications and/or types of game outcome modifications to provide to the player as the game outcome modification loyalty award sequence. In this embodiment, the central server communicates with the player's currently played gaming device to determine which game outcome modifications are available to be included in the game outcome modification loyalty award sequence and the average expected payout (i.e., the cost) associated with each of the available game outcome modifications.

In one such embodiment, the number of game outcome modifications to include in the game outcome modification loyalty award sequence is based, at least in part, on the average expected payout associated with each of the game outcome modifications. For example, for a determined loyalty award value of $10, the central server determines to include 2 game outcome modifications in the game outcome modification loyalty award sequence and for a determined loyalty award value of $15, the central server determines to include 3 game outcome modifications in the game outcome modification loyalty award sequence. In different embodiments, the number of game outcome modifications to include in the game outcome modification loyalty award sequence is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In another such embodiment, the type of game outcome modifications to include in the game outcome modification loyalty award sequence is based, at least in part, on the average expected payout associated with each of the types of game outcome modifications. For example, for a first determined loyalty award value, the central server determines to include a first number of a first type of game outcome modifications (associated with a first average expected payout) in the game outcome modification loyalty award sequence or a second, lower number of a second type of game outcome modifications (associated with a second, greater average expected payout) in the game outcome modification loyalty award sequence. In different embodiments, the type of game outcome modifications to include in the loyalty award sequence is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

It should be appreciated that, in one embodiment, to compensate for the game outcome modifications provided to players as loyalty award sequences, the paytables associated with one or more gaming devices in the gaming system are adjusted to account for one or more players modifying one or more game outcomes by utilizing their provided loyalty award sequences. In one example embodiment, the overall average expected payout associated with one or more paytables (when not accounting for any game outcome modifications) is adjusted such that when accounting for one or more players modifying one or more game outcomes by utilizing their provided loyalty award sequences, the overall average expected payouts associated with such paytables retain a gaming system operator desired overall average expected payout. In another example embodiment, to account for a first set of game outcomes potentially being modified to winning game outcomes, the odds of these first set of game outcomes being generated are adjusted accordingly. For example, the odds of a symbol combination which is one nudge modification away from a winning all cherry symbols combination is adjusted to equal the odds of a winning all cherry symbols combination.

In one embodiment, any game outcome which results from a modification (via a player utilizing a game outcome modification of a loyalty award sequence) is associated with a lower award or payout than the same game outcome which does not result from a modification. In another embodiment, any game outcome which results from a modification (via a player utilizing a game outcome modification of a loyalty award sequence) is associated with the same award or payout as the same game outcome which does not result from a modification. In one embodiment, a game outcome modification of a loyalty award sequence may be applied to certain types of game outcomes, but not other types of game outcomes. For example, a game outcome modification may be applied to any outcome associated with an award less than a designated amount, but not applied to any outcome associated with an award greater than the designated amount. In another embodiment, a game outcome modification of a loyalty award sequence may be applied to any types of game outcomes without restriction.

In one embodiment, the number of game outcome modifications and/or the type of game outcome modifications is based on the gaming device the player is currently playing. In this embodiment, if a player switches to a different gaming device, one or more attributes or characteristics of one or more of the provided game outcome modifications of the loyalty award sequence may change. For example, a first game outcome modification, such as a nudging of one or more reels, may be associated with a first average expected payout at a first gaming device associated with a first paytable and a second different average expected payout at a second gaming device associated with a second paytable. In this example, if the player switches from the first gaming device to the second gaming device, the number of game outcome modifications (e.g., the number of times a player may nudge one or more reels) included in the loyalty award sequence may change such that the game outcome modifications of the loyalty award sequence retain an overall average expected value equal or substantially equal to the determined value of the loyalty award. In another example, if the player switches from a first gaming device to the second gaming device, the type of game outcome modifications included in the loyalty award sequence may change such that the game outcome modifications of the loyalty award sequence retain an overall average expected value equal or substantially equal to the determined value of the loyalty award.

In one embodiment, after determining the number and/or type of game outcome modifications to include in the loyalty award sequence, the central controller communicates the determined loyalty award sequence to the player's currently played gaming device. In this embodiment, the player's currently played gaming device informs the player that they have been provided one or more game outcome modifications in a loyalty award sequence. For example, upon a game outcome modification becoming available to the player, the display device may display a suitable input, such as a nudge or reel respin button, to inform the player of and enable the player to utilize an available game outcome modification.

In one embodiment, the gaming device enables the player to selectively activate one or more of the game outcome modifications of the loyalty award sequence. That is, one or more of the game outcome modifications of the loyalty award sequence may be immediately used by the player (to modify a currently generated outcome) or stored by the player and used at a later time (to modify a subsequently generated outcome). In another embodiment, the gaming device and/or the central controller determines when to utilize (or selectively activate) one or more of the game outcome modifications of the loyalty award sequence. As described above, the game outcome modification loyalty award sequence may be stored by the central controller, by an individual gaming device and/or in associated with a player tracking system for any suitable duration.

In one embodiment, if the player selectively activates a game outcome modification of an available loyalty award sequence, the gaming device (or central controller) causes a modification to one or more aspects of a previously generated game outcome in an attempt to improve such previously generated game outcome. For example, if a gaming device generates a losing game outcome for a player and the player has access to at least one available game outcome modification of a loyalty award sequence, the player utilizes the stored game outcome modification of the loyalty award sequence to change or modify the generated losing game outcome (possibly to a winning game outcome associated with an award which is provided to the player).

Figure 8A:
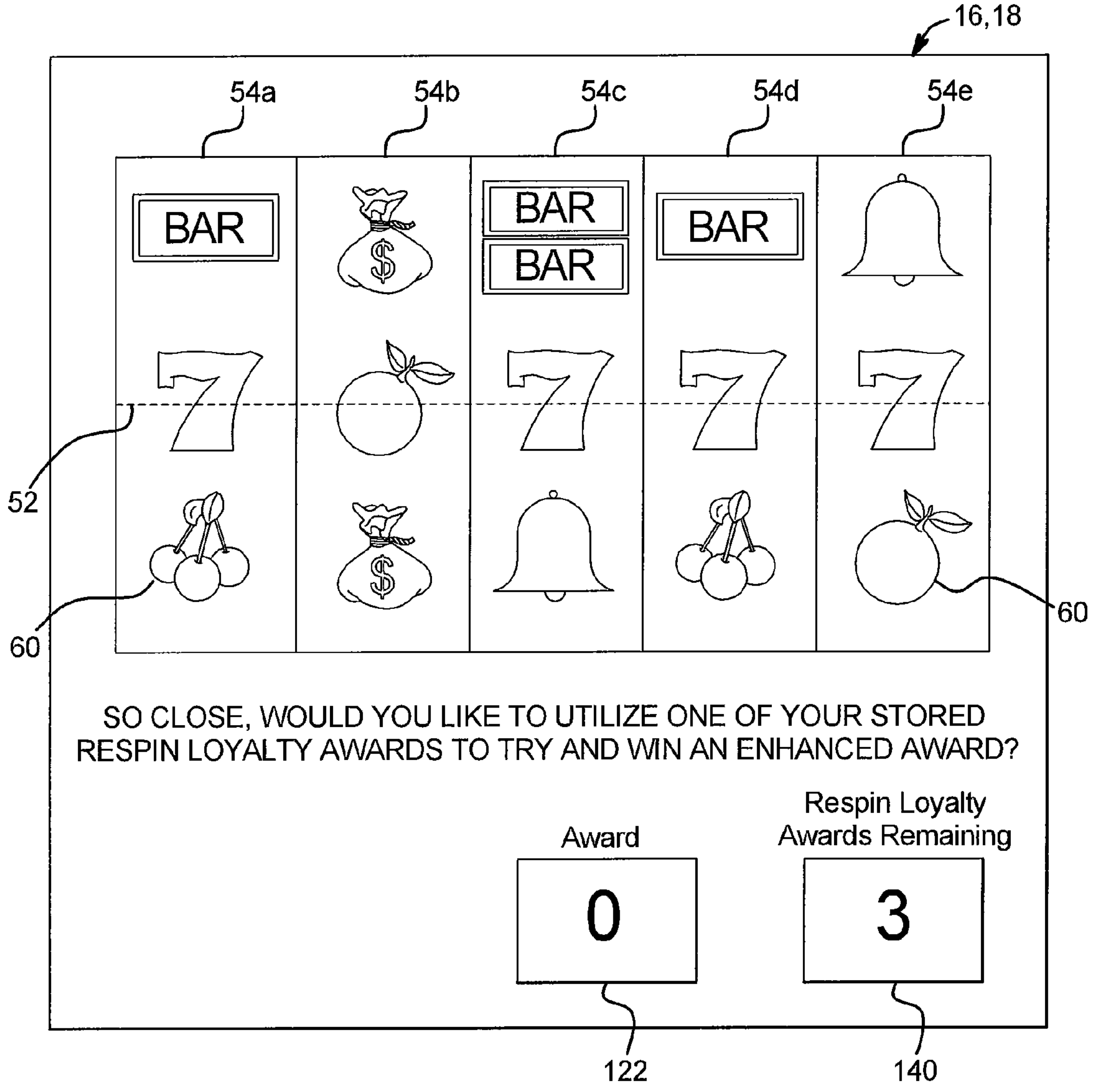
FIGS. 8A and 8B are front-side perspective views of one embodiment of the gaming device disclosed herein illustrating at least one reel respin as part of a provided loyalty award sequence.
Figure 8B:
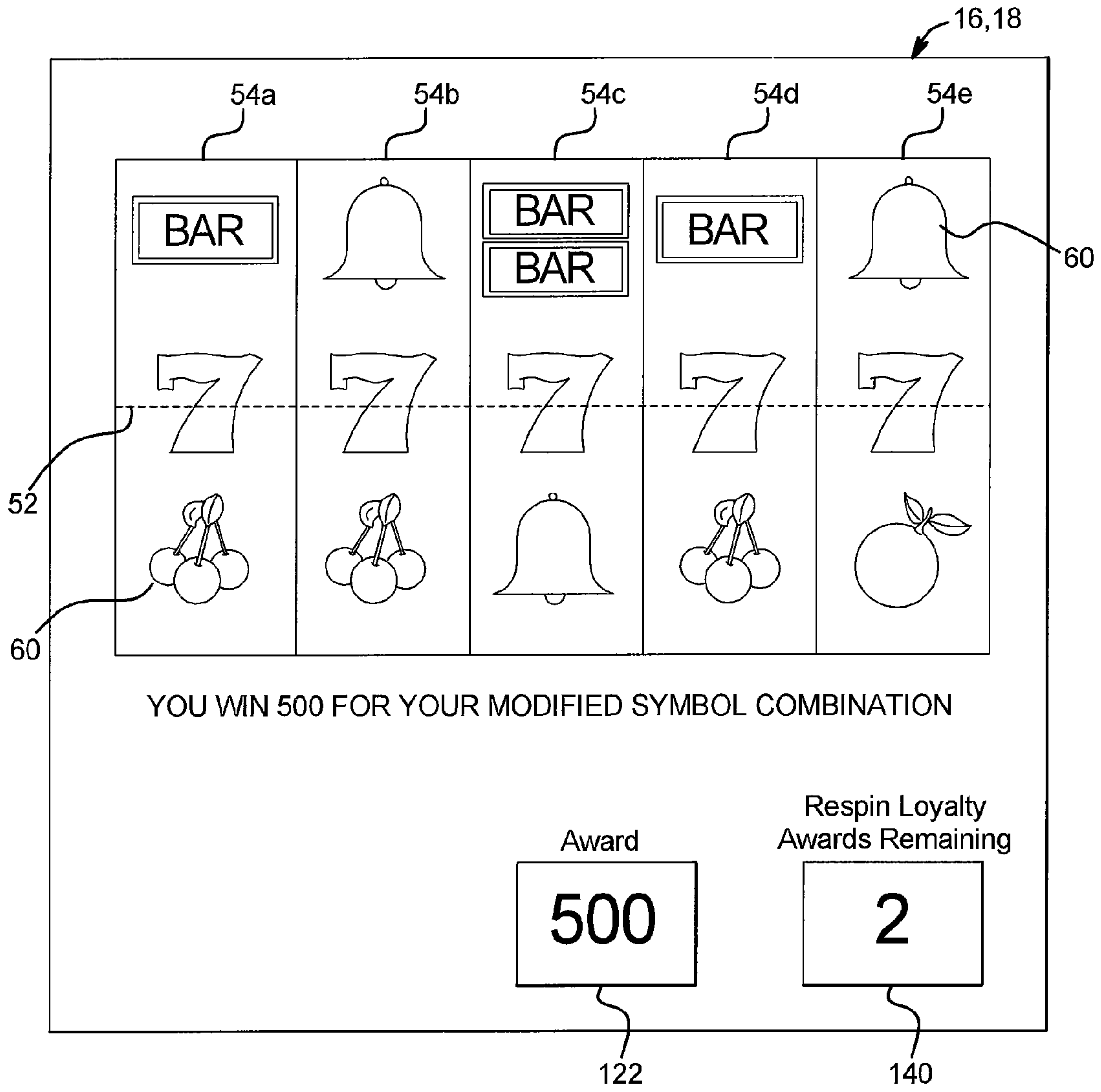

In one such embodiment, one or more game outcome modifications included in one or more loyalty award sequences are associated with moving, such as respinning, one or more reels of a slot gaming device. In this embodiment, if a first outcome associated with a first award is generated in a slot gaming device and the player wants to improve the first generated outcome, then the player utilizes (i.e., selectively activates) at least one game outcome modification of a stored loyalty award sequence to respin one or more of the reels to generate a second outcome potentially associated with a second, greater award. For example, as seen in FIG. 8A, if the gaming device generates a non-winning symbol combination of seven symbol-orange symbol-seven symbol-seven symbol-seven symbol along activated payline 52 and the player has at least one available game outcome modification loyalty award, illustrated as the three respin loyalty awards or tokens in the respin loyalty awards remaining indicator 140, the gaming device enables the player to respin one or more of the reels. Appropriate messages such as "SO CLOSE. WOULD YOU LIKE TO UTILIZE ONE OF YOUR STORED RESPIN LOYALTY AWARDS TO TRY AND WIN AN ENHANCED AWARD?" may be provided to the player visually, or through suitable audio or audiovisual displays As seen in FIG. 8B, after the player selectively activates one of the respins of the provided loyalty award, the gaming device respins the second reel 54*b* (while holding the remaining reels) to generate another symbol on activated payline 52. In this example, the respun second reel generated a seven symbol and thus the gaming device provides the player an award of five-hundred credits associated with the modified winning symbol combination of seven symbol-seven symbol-seven symbol-seven symbol-seven symbol. Accordingly, in this example embodiment, by utilizing one of the game outcome modifications of the provided loyalty award sequence, the player causes a non-winning game outcome to be modified to a winning game outcome. Appropriate messages such as "YOU WIN 500 FOR YOUR MODIFIED SYMBOL COMBINATION" may be provided to the player visually, or through suitable audio or audiovisual displays.

In one embodiment, a game outcome modification of a loyalty award sequence is associated with respinning one reel. In another embodiment, a game outcome modification of a loyalty award sequence is associated with respinning a plurality of reels. In one embodiment, a game outcome modification of a loyalty award sequence is associated with respinning a specific reel, such as the last reel. In another embodiment, a game outcome modification of a loyalty award sequence is associated with respinning any one of the player selected reels. In different embodiments, which reel(s) are respun is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one embodiment, if a player has at least one available game outcome modification loyalty award associated with a respin, the gaming system enables the player to respin one more reels one time. In another embodiment, if a player has at least one available game outcome modification loyalty award associated with a respin, the gaming system enables the player to respin one more reels a plurality of times. In another embodiment, if a player has at least one available game outcome modification loyalty award associated with a respin, the gaming system enables the player to respin one more reels until the player has no more respins remaining. In different embodiments, the number of times the gaming system enables the player to respin one more reels is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

Figure 9A:
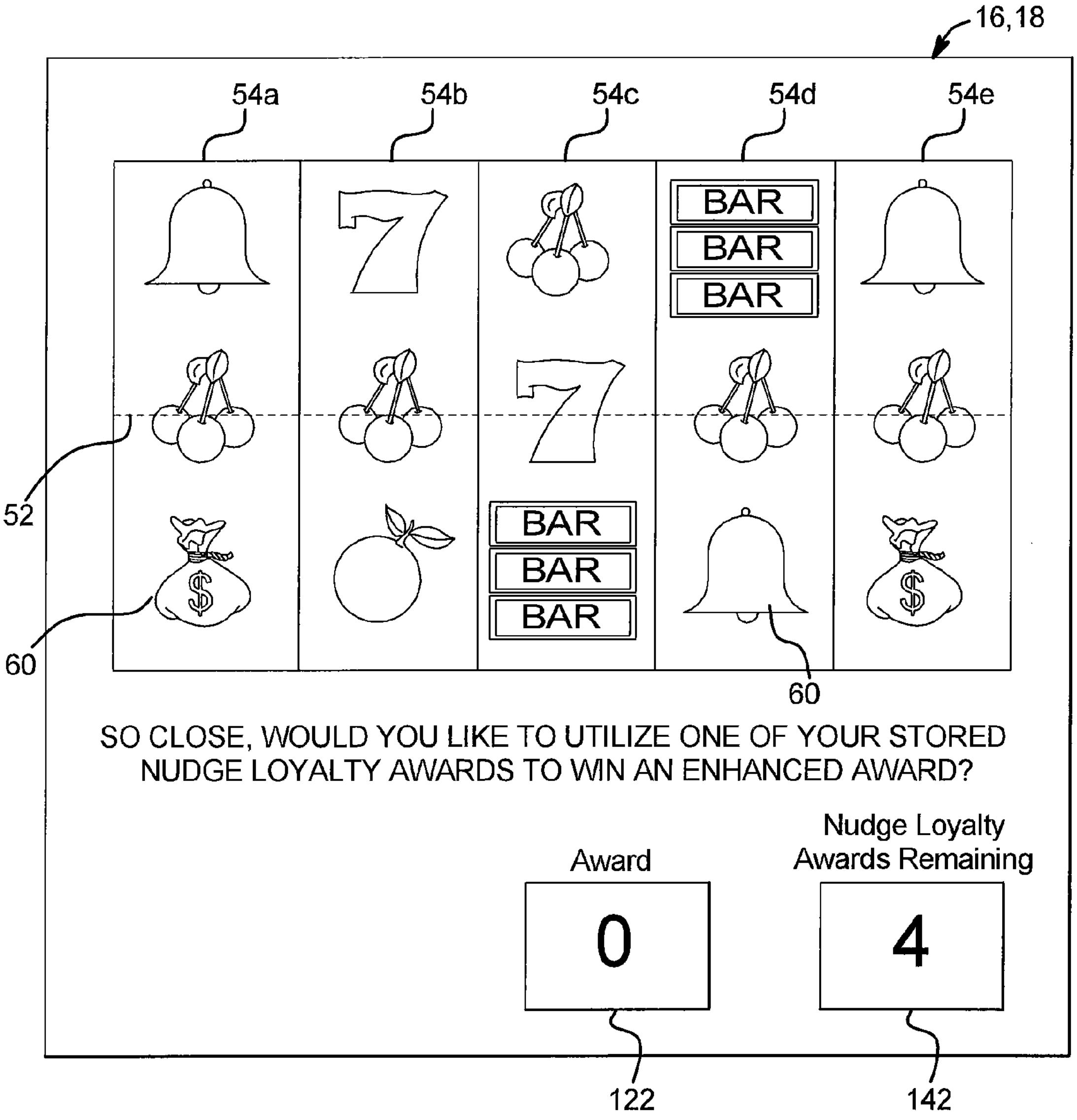
FIGS. 9A and 9B are front-side perspective views of one embodiment of the gaming device disclosed herein illustrating at least one reel nudge as part of a provided loyalty award sequence.
Figure 9B:
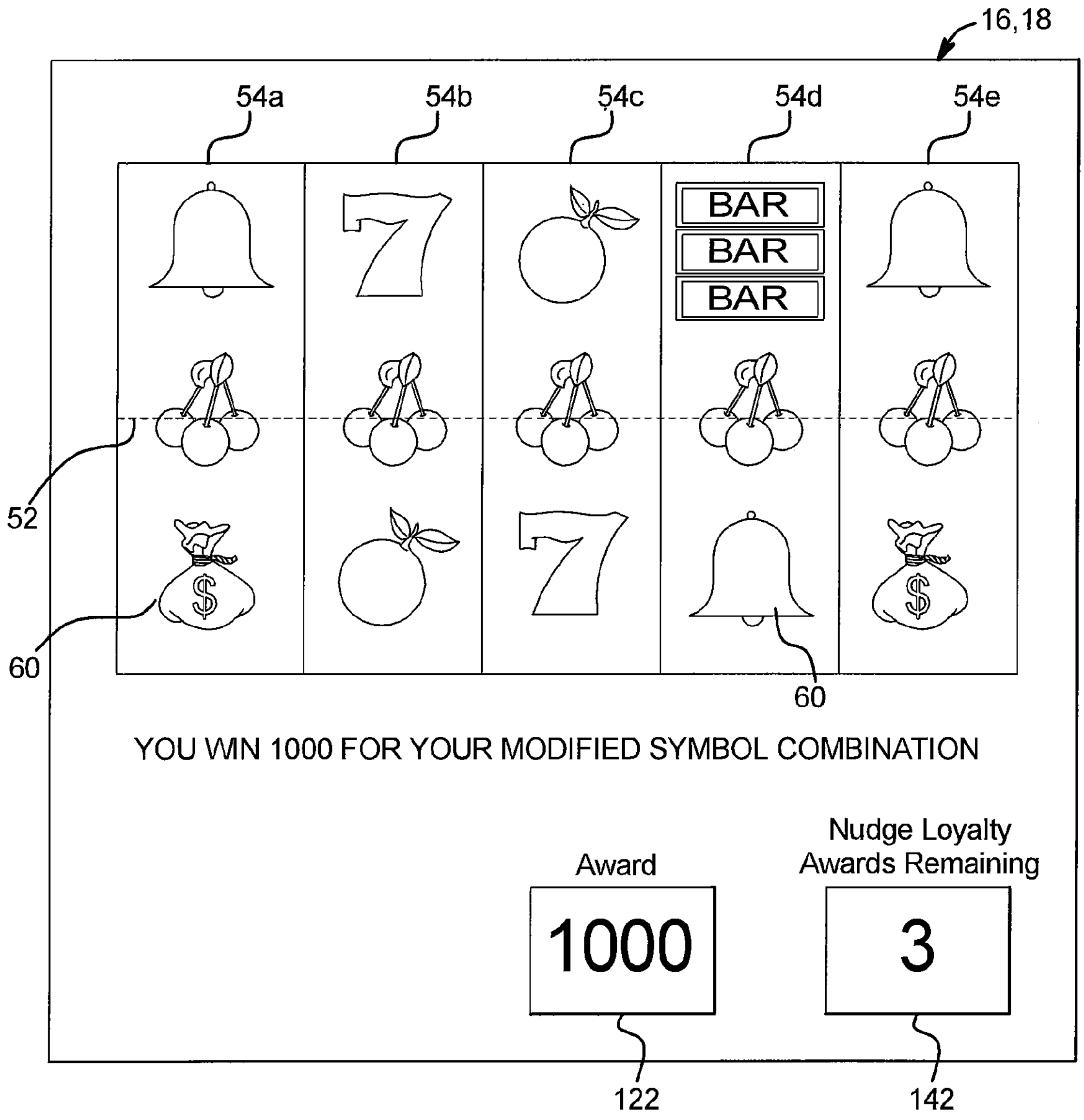

In another such embodiment, one or more game outcome modifications included in one or more loyalty award sequences are associated with nudging one or more reels of a slot gaming device. In this embodiment, if a first outcome associated with a first award is generated in a slot gaming device and the player wants to improve the first generated outcome by nudging at least one symbol, then the player utilizes (i.e., selectively activates) at least one game outcome modification of a stored loyalty award sequence to nudge one or more of the reels to generate a second outcome. For example, as seen in FIG. 9A, the gaming device generated a non-winning symbol combination of cherry symbol-cherry symbol-seven symbol-cherry symbol-cherry symbol along activated payline 52 and further generated a cherry symbol one symbol position removed from being along the activated payline on the third reel. In this example, if the player has at least one available game outcome modification loyalty award, illustrated as the four nudge loyalty awards or tokens in the nudges loyalty awards remaining indicator 142, the gaming device enables the player to nudge one or more of the reels to cause one or more symbols to nudge or shift one or more symbol positions. Appropriate messages such as "SO CLOSE. WOULD YOU LIKE TO UTILIZE ONE OF YOUR STORED NUDGE LOYALTY AWARDS TO WIN AN ENHANCED AWARD?" may be provided to the player visually, or through suitable audio or audiovisual displays As seen in FIG. 9B, after the player selectively activates one of the nudges of the provided loyalty award, the gaming device nudges the third reel 54*c* (while holding the remaining reels) to cause the cherry symbol to nudge or move to a symbol position along activated payline 52. In this example, the nudged third reel causes a winning symbol combination of cherry symbol-cherry symbol-cherry symbol-cherry symbol-cherry symbol to be generated and thus the gaming device provides the player an award of one-thousand credits. Appropriate messages such as "YOU WIN 1000 FOR YOUR MODIFIED SYMBOL COMBINATION" may be provided to the player visually, or through suitable audio or audiovisual displays.

In one embodiment, a game outcome modification of a loyalty award sequence is associated with nudging one reel. In another embodiment, a game outcome modification of a loyalty award sequence is associated with nudging a plurality of reels. In one embodiment, a game outcome modification of a loyalty award sequence is associated with nudging a specific reel, such as the last reel. In another embodiment, a game outcome modification of a loyalty award sequence is associated with nudging any one of the player selected reels. In different embodiments, which reel(s) are nudged is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one embodiment, if a player has at least one available game outcome modification loyalty award associated with a nudge, the gaming system enables the player to nudge one more reels one time. In another embodiment, if a player has at least one available game outcome modification loyalty award associated with a nudge, the gaming system enables the player to nudge one more reels a plurality of times. In another embodiment, if a player has at least one available game outcome modification loyalty award associated with a nudge, the gaming system enables the player to nudge one more reels until the player has no more nudges remaining. In different embodiments, the number of times the gaming system enables the player to nudge one more reels is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one embodiment, if a generated symbol combination can be nudged to form a winning symbol combination and at least one game outcome modification of a loyalty award sequence is stored, the gaming device automatically nudges one or more reels to form the winning symbol combination. In another embodiment, one or more symbols are associated with nudges wherein if these symbols are generated, the gaming device will nudge them each one or more symbol positions. In another embodiment, prior to the generation of any symbols, the gaming device enables the player to designate if they want to apply any nudges to any generated symbol combinations.

In another such embodiment (not shown), one or more game outcome modifications included in one or more loyalty award sequences are associated with causing one or more symbols to function as wild symbols for one or more symbol evaluations. In this embodiment, if a first set of symbols is generated to form a first outcome associated with a first award and the player wants to improve the first generated outcome by causing at least one of the generated symbols to function as a wild symbols, the player utilizes (i.e., selectively activates) at least one game outcome modification of a stored loyalty award sequence to cause at least one of the generated symbols to function as a wild symbol to modify the set of symbols to form a second outcome potentially associated with a different, second award.

In one embodiment, a game outcome modification of a loyalty award sequence is associated with causing one symbol to function as a wild symbol. In another embodiment, a game outcome modification of a loyalty award sequence is associated with causing a plurality of symbols to function as wild symbols. In one embodiment, a game outcome modification of a loyalty award sequence is associated with causing a specific symbol to function as a wild symbol. In another embodiment, a game outcome modification of a loyalty award sequence is associated with causing any one of the symbols to function as wild symbols. In different embodiments, which symbols function as wild symbols is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In another such embodiment (not shown), one or more game outcome modifications included in one or more loyalty award sequences are associated with causing one or more symbols generated on one or more reels to swap positions. In this embodiment, if a first set of symbols is generated to form a first outcome associated with a first award and the player wants to improve the first generated outcome by causing one or more symbols generated on one or more reels to swap positions with one or more symbols generated on different reels, the player utilizes (i.e., selectively activates) at least one game outcome modification of a stored loyalty award sequence to cause at least one symbol generated on at least one reel to swap positions with at least one symbol generated on another reel. Such symbol or reel swapping modifies the set of symbols to form a second outcome potentially associated with a different, second award.

In one embodiment, a game outcome modification of a loyalty award sequence is associated with swapping one symbol position on at least one reel. In another embodiment, a game outcome modification of a loyalty award sequence is associated with swapping a plurality of symbols positions on at least one reel. In another embodiment, a game outcome modification of a loyalty award sequence is associated with swapping a plurality of symbols positions on a plurality of reels. In another embodiment, a game outcome modification of a loyalty award sequence is associated with swapping a plurality of symbols positions on a plurality of reels. In different embodiments, which symbols are swapped with different symbols on different reels is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

It should be appreciated that loyalty award sequences may be associated with modifying any suitable game play feature of any suitable game to cause a modification or alteration of a generated game outcome. In different embodiments, a loyalty award sequence may utilize game play features including, but not limited to: modifiers; multipliers; mathematical operators; split symbols; moving symbols; sub-symbols; changing symbols; locking reels; wild reels; payline modifiers; scatter evaluations; ways to win evaluations; forming/activating new paylines; additional winning symbol combinations that are independent of the paytable; activating symbol positions; symbol evaluation modifiers; holds; respins; bonus games; bonus awards; reel/slot games; card games (e.g., poker, blackjack); lottery games; selection games; offer and acceptance games; wheel games; dice games; free spin games; competition games; skill games; perceived skill games; any other suitable game play feature otherwise known or any combination thereof to modify a generated game outcome.

After the player selectively activates at least one game outcome modification of a stored loyalty award sequence to modify one or more game outcomes, the gaming system adjusts the number of game outcome modifications included in the provided loyalty award sequence and enables the player to return to a normal game play mode as described above.

It should be appreciated that in one embodiment, the gaming system enables the player to selectively activate one game play feature (as described above) of one game outcome modification of a loyalty award sequence per game. In another embodiment, the gaming system enables the player to selectively activate a plurality of game play features of one or more game outcome modifications of a loyalty award sequence per game. In different embodiments, the number of game play features associated with game outcome modifications which the player may selectively activate per game (or per set of games) is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In one embodiment, the gaming system and method disclosed herein is operable to analyze the performance of a particular series of loyalty awards to a player or group of players over a designated time period to determine any variances between the actual loyalty awards provided and the theoretical loyalty awards determined to be provided. In this embodiment, the central server is operable to incorporate rules that determine what to do in the case of a variation over X %, $Y, or any other suitable amount. In one example embodiment, if the actual loyalty awards provided to a player are lower than the theoretical loyalty awards determined to be provided to the player, the central server increases one or more subsequent theoretical loyalty awards determined to be provided to the player. In another example embodiment, if the actual loyalty awards provided to a player are lower than the theoretical loyalty awards determined to be provided to the player, the central server provides a spontaneous award to the player. In one such embodiment, the central server calculates the loyalty award amount as a configured percent of the Variance: X %*Variance $, wherein should the determined variance amount be positive (i.e., higher actual loyalty awards than determined theoretical loyalty awards), the central server reduces one or more subsequent theoretical loyalty awards.

In another embodiment, each gaming device (or player tracking account) in the gaming system is associated with or otherwise maintains a separate pool or meter, wherein each pool is individually funded as a percentage of the total or partial amounts wagered at that individual gaming device. In one embodiment, each gaming device includes a separate coin-in or wager meter which tracks the total or partial coin-in or wagers placed on the primary games played at that gaming device. In another embodiment, as mentioned above, the central controller includes a separate coin-in or wager meter for each individual gaming machine which tracks the total or partial coin-in or wagers placed on the primary games for each of the gaming machines in the gaming system, wherein the central controller maintains an individual pool for each gaming machine in the gaming system. In another embodiment, the central controller maintains a separate pool or meter for each player which is tracked via a player tracking system (implemented through the use of a playing tracking card or any other suitable manner or suitable system). In this embodiment, if a player leaves a gaming machine of the gaming system, that player's wagered amounts and pool are saved for the player (via the player tracking system, the player tracking card or any other suitable system) for later use at another gaming machine.

In these embodiments, if the central server determines to provide a loyalty award at a gaming device in the gaming system, the central server (or alternatively the selected gaming device) determines if the pool associated with the selected gaming device (or the individual player) is equal to or greater than a designated threshold amount. If the pool associated with the selected gaming device (or the individual player) is not equal to or greater than the designated threshold amount, the central server (or selected gaming device) does not provide the player of the selected gaming device a loyalty award. If the pool associated with the selected gaming device (or the individual player) is equal to or greater than the designated threshold amount, the central server determines a value or amount to provide to the player as a loyalty award, wherein the determined value is based, at least in part, on the amount in the pool associated with the selected gaming device (or individual player). After determining a value or amount to provide to the player as a loyalty award, the central server determines an appropriate loyalty award sequence and proceeds as described above. It should be appreciated that the actual amount provided to the player in the loyalty award sequence may be greater than or less than the amount determined based on the pool associated with the selected gaming device (or individual player).

In one embodiment, as described above, the gaming system first determines a loyalty award to provide to a specific player and second determines an appropriate loyalty award sequence to utilize to provide the player a loyalty award. In an alternative embodiment, the gaming system first determines a loyalty award sequence and second determines a specific player to provide a loyalty award. In this embodiment, the determined loyalty award sequence is associated with a theoretical value to provide as a loyalty award (as described above) and the gaming system selects a specific player to provide a loyalty award to based, at least in part, on this theoretical value and criteria associated with each player (or gaming device). In one such embodiment, if the theoretical value is within a first range of values, the central controller selects a player from a first group of players to provide a loyalty award and if the theoretical value is within a second, different range of values, the central controller selects a player from a second, different group of players to provide a loyalty award. For example, if the theoretical value is $10, the central controller may select a bronze level player (determined via a player tracking system) to provide a loyalty award and if the theoretical value is $50, the central controller may select a gold level player (determined via a player tracking system) to provide a loyalty award. In different embodiments, the determination of which player in the appropriate group of players to provide a loyalty award to is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on the amount of coin-in accumulated in one or more pools, or determined based on any other suitable method or criteria.

In another embodiment, upon a determination to provide a specific player a loyalty award, the gaming system enables that player to select the type of loyalty award sequence to utilize to provide the loyalty award. For example, the gaming system enables the player to select if they want a loyalty award provided via a free spin loyalty award sequence, a multiplied payout loyalty award sequence or any other suitable type of loyalty award sequence. In this embodiment, after the player selects a type of loyalty award sequence, the central controller utilizes the selected type of loyalty award sequence and the determined value to provide to the player as the loyalty award to determine the specific loyalty award sequence to provide to the player.

In another embodiment, rather than determining a theoretical value to provide to the player as a loyalty award (wherein the actual value provided to the player as the loyalty award may be different than the theoretical value), the gaming system determines a set value to provide to the player as the loyalty award. In this embodiment, after determining a set value to provide to the player, the gaming system determines, based on this set value, a loyalty award sequence wherein the sum of the awards provided during the loyalty award sequence is equal to the set value. That is, the awards provided for each segment of the loyalty award sequence are predetermined and the total award for the loyalty award sequence equals the set value determined by the central controller. In one application of this embodiment, the gaming system utilizes predetermined outcomes to present the set value award to the player. For example, if the player's award is $10.00 and a 7-7-7 symbol combination represents $2.00, the gaming device provides the player a predetermined loyalty award sequence of 10 free spins with the following outcomes: no award; 7-7-7; 7-7-7; no award; no award; 7-7-7; 7-7-7; no award; no award; and 7-7-7. Such outcomes yield a total award equal to the set value of $10.00. It should be appreciated that other combinations can be determined and used such that the payout associated with the displayed symbol combinations (over the number of free spins of the loyalty award sequence) is equal to the set value award. In different embodiments, the central server controls the display of the predetermined loyalty award sequence or communicates information or data to the gaming device which controls the displayed loyalty award sequence.

In another embodiment, the gaming system determines both a set value and a theoretical value to form a loyalty award. In this embodiment, the central controller determines a theoretical value to provide to the player as part of a loyalty award (wherein, as described above, the actual value provided to the player as part of the loyalty award may be different than the theoretical value) and also determines a set value to provide to the player as part of the loyalty award. This embodiment provides that regardless of if the actual value provided to the player as part of the loyalty award is less than the determined theoretical value, the player is still provided the set value as part of the loyalty award.

In another embodiment, a plurality of players may simultaneously or substantially simultaneously enter a loyalty award sequence based on a single triggering event described above. For example, if the central server triggers a multi-player multiplied payout loyalty award sequence, based on the global knowledge and communication capabilities it possesses, the central server determines X number of gaming machines to provide Y number of games at a Z multiplier for each game played, wherein the variables X, Y & Z are determined to total the average expected cost of the multi-player multiplied payout loyalty award sequence. For example, if it is determined the average expected cost for a multi-player multiplied payout loyalty award sequence is 1 unit per machine per 1× multiplier, the distribution may be as follows: (a) 100 gaming machines for 3 games at 1×, (b) 50 gaming machines for 3 games at 2×, or (c) any other combination therefore that meets the equation of total expected cost=X*Y*Z. In another embodiment, the variables for a specific gaming devices multiplied payout loyalty award sequence are determined by each individual gaming device.

In another embodiment, the loyalty award sequences of the gaming system disclosed herein are utilized to track loyalty award payouts. Such tracking is used for accounting and auditing purposes. Such tracking is also analyzed for marketing purposes and/or slot management purposes regarding the effectiveness of the loyalty award program. In one such embodiment, one or more individual gaming devices and/or the central server track different categories of data, wherein the tracked categories are stored and summarized in one or more meters. Each meter is operable to continuously increase until a final value is set, wherein upon the setting of the final meter value, the meter returns to zero and continues to grow from there. In another such embodiment, one or more individual gaming devices and/or the central server track different categories of data and utilize the tracked data to form and store transactions or records that record a specific instance of a loyalty award and a loyalty award sequence.

In one embodiment, the data tracked for the loyalty awards and loyalty award sequences are classified as Request data, Actual data and Variance data. In this embodiment, the Request data includes the determined theoretical loyalty awards requested (i.e., the amounts or values determined to be provided to the players as loyalty awards); the Actual data includes the actual loyalty awards provided; and the Variance data includes data illustrating the difference between actual loyalty awards provided and the determined theoretical loyalty award requested. For example, the Request data, stored as one or more Request data meters or Request data transactions, includes but is not limited to, data representing: a promotion identifier; a number of games requested; a loyalty amount requested; a player's name and ID; a date and time and/or a multiplier. The Actual data, stored as one or more Actual data meters or Actual data transactions, includes but is not limited to, data representing: a promotion identifier; a number of loyalty games played; a base amount paid (i.e., an amount attributed to the base game portion of a multiplied payout loyalty award sequence); a loyalty award paid; a player's name and ID; a time and date and/or a multiplier. The Variance data, stored as one or more Variance data meters or Variance data transactions includes but is not limited to, data representing: a promotions identifier and/or a variance on the loyalty award.

In addition to tracking this data, in one embodiment, one or more individual gaming devices, the central server and/or a player tracking system track data related but not limited to: the current promotion; the paytable; the gaming device played; and/or the denomination played. Moreover, in one embodiment, one or more individual gaming devices, the central server and/or a player tracking system track data related, but not limited to: a gaming site; a gaming session number; a gaming machine played; a location of the gaming machine; a denomination played; a gaming device manufacturer; a gaming device PAR utilized; a paytable identification; a game description; a number of player tracking points earned; any suitable comps earns; a coin-in amount; a number of games played; any designated awards, such as jackpots, won; a gaming starting time; a gaming ending time; any promotional credits used; a theoretical loyalty award amount; an actual loyalty award amount; a time; an amount of coin-in per minute; any promotional credits earned, any player tracking points redeemed and/or any personal progressive award accrued. It should be appreciated that such data can be stored for each player individually, each gaming device individually, a designated group of players, a designated group of gaming devices, all of the players and/or all of the gaming devices.

In one embodiment, analyzing at least this data for any gaming device, promotion, player, or suitable time period enables the gaming establishment operator to determine the financial attributes of one or more loyalty award sequences. That is, when a gaming establishment offers loyalty awards to a group of players (and not just an individual player) utilizing the gaming system disclosed herein, the gaming establishment is enabled to perform a variety of analysis on the data from the loyalty awards (and the associated player's play) to determine if players are responding to the offered promotions.

In one embodiment, before a promotion is offered, a gaming establishment operator has a general idea of the purpose or objective of the promotion, such as the need to fill up gaming space during a normally slow time or to create additional loyalty from customers suspected of visiting other gaming establishments. To accomplish the objective of the offered promotion, the gaming establishment's marketing department uses CRM tools to identify potential players. Such statistical tools are employed with promotional basics and the proposed player group to determine a theoretical and actual performance from the promotions. Based on such identified potential players and the determined promotion performance, the gaming establishment adds or deletes players from the player set until a group of players meeting the desired objective is created. It should be appreciated that these same tools can be used to establish how much to provide as loyalty awards.

In one embodiment, when these statistical tools have yielded a group of players, one or more loyalty awards and one or more promotional parameters, the gaming establishment operator finalizes the budget for one or more loyalty award sequences. It should be appreciated that key aspects of the budget include expected player win (i.e., theoretical loyalty award and actual loyalty award), expenses, loyalty award funding and frequency of loyalty award sequences. After finalizing the loyalty award sequence budget, configuration of any loyalty award mechanisms begin, any other promotion systems are configured and the identified players receive communication about the promotion.

In one embodiment, during the provided promotion, the gaming system disclosed herein enables gaming establishment operators to monitor one or more key player statistics. Such monitoring is in real-time and reflects key player play values. For active players, the real time play values include, but are not limited to: any coin-in; any wins; any theoretical loyalty awards offered; the amount of any determined theoretical loyally awards; a player's preferred game(s); any loyalty awards provided; the amount of any actual loyalty awards; the player's percentage of hold; and/or any player expenses. The gaming system real time play values include, but are not limited to: the total number of players; the number of gaming sessions; the number of days played; the amount of coin-in; the amount of wins; the amount of any theoretical loyalty awards; the amount of any actual loyalty awards; the player percentages of hold and/or any player expenses.

In one embodiment, during the promotion, a player analytical tool is applied to identify players to invite impromptu to the promotion based on their play characteristics compared to the promotional group. In one such embodiment, the player analytical tool suggests possible promotional parameter changes, wherein the player list and promotion parameters are dynamically changed based on the gaming system's recommendations.

In one embodiment, during or after the promotion, the first level of analysis utilizes the invited group of player's behavior, wherein a second level of analysis focuses on individual players of the invited group. In this embodiment, factors in determining if the gaming establishment's objectives for the provided promotion were satisfied include, but are not limited to analyzing: the amount of time played (i.e., did any player's play longer); the frequency of play (i.e., are player's coming to the gaming establishment more often); the amount of coin-in during the promotion (i.e., are player spending more for coin-in); new player participation (i.e., are new players playing in the promotion); player tracking club participation (i.e., are new players joining the player tracking club based on the promotion); and/or a comparison over previous periods (i.e., have revenues increased based on the promotion).

Moreover, in one embodiment, the gaming establishment analyzes the group of players performance in the promotion by: determining the number of players who participated out of those who were invited; determining if this number meet the objective; determining the promotion profitably by analyzing the Player Win from the promotion less promotion expenses (such as variable costs and fixed expenses); determining if the promotion meet the profitability objective; and determining the number of players who played during the period, but did not qualify for a loyalty award.

In one embodiment, the gaming system disclosed herein is operable to utilize such analyzed data to produce a visitation report which includes selecting a comparable previous time period and comparing the number of visits from the players during the promotion with the selected previous time period. Such a report enables a gaming establishment operator to determine if the promotion encouraged additional visitation. In another embodiment, the gaming system disclosed herein is operable to utilize such analyzed data to produce a spend report which includes selecting a comparable previous time period and comparing the amount spent by the players during the promotion with the selected previous time period. Such a report enables a gaming establishment operator to determine if the promotions encourage additional play. In another embodiment, the gaming system disclosed herein is operable to utilize such analyzed data to produce a new player tracking club member report which includes selecting a comparable previous time period and comparing the number of new enrollments from the players during the promotion with the selected previous time period. Such a report enables a gaming establishment operator to determined if the promotion encourage players to join the player tracking club. It should be appreciated that for the purposes of these reports, the selected time period may be from the previous year, the previous week, a previous holiday, or any other suitable time period.

In addition to these reports, in one embodiment, the gaming system disclosed herein is operable to analyze the actual loyalty awards provided versus the theoretical loyalty awards determined to be provided versus the loyalty awards budgeted to be provided. This comparison results in the variance data, which is compared to the budget for the promotion.

As discussed briefly above, this gaming system configuration provides the central server the ability to control the signage for the gaming machines in the gaming system. In one embodiment, each individual sign is associated with a sign controller which is connected to or otherwise associated with the central controller.

In one embodiment, the central server communicates with the sign controller(s) and instructs what content to display, where to display such content, how to display such content and for how long to display such content. In one embodiment, the sign controller displays any information as long as it has the proper content manager. For example, the sign controller causes a sign to display a recently provided loyalty award (or other loyalty award information) on a gaming machine (or bank of gaming machines). In one embodiment, auxiliary devices, such as player tracking information terminals, have signs which are also connected to the sign controllers in communication with the central server. It should be appreciated that the sign controller is programmed on a loop to display a plurality of information not only on a single sign, but also on other sign in a gaming establishment as well. It should be further appreciated that such information can be provided to the players through any suitable audio, audio-visual or visual devices.

By utilizing of the central server to communicate with each sign controller, the gaming system presents a wealth of information to the player. Furthermore, the central server and sign controller configuration enables for the signs to be custom tailored to the player who is playing each gaming device to provide the player with information that will be most beneficial to their gaming session.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming devices, each gaming device including:
- at least one display device;
- at least one input device;
- at least one gaming device processor; and
- at least one memory device which stores a plurality of instructions, which when executed by the at least one processor, cause the at least one processor to operate with the at least one display device and the at least one input device to display a game, each play of said game has an average expected payback percentage; and at least one controller configured to communicate with said plurality of gaming devices, wherein the at least one controller is programmed to:
- (a) identify each of a plurality of players of a plurality of said gaming devices, wherein each identified player is ranked at one of a plurality of different player tracking levels; and
- (b) when a loyalty award sequence is triggered for a designated one of said identified players:
  - (i) determine a value associated with the triggered loyalty award sequence, said value being determined independent of any of the average expected payback percentages of any of the games of any of the gaming devices,
  - (ii) for said triggered loyalty award sequence, determine a number of plays of the game of the gaming device of the designated player, wherein said determined number of plays of the game is based, at least in part, on the determined value and the average expected payback percentage of each play of the game of the gaming device of the designated player,
  - (iii) for said triggered loyalty award sequence, determine a multiplier to apply to each of the determined number of plays of the game, wherein said determined multiplier is based on the player tracking level of the designated player,
  - (iv) communicate the determined multiplier and the determined number of plays of the game to the gaming device of the designated player, and
  - (v) cause the gaming device of the designated player to display at least one of: (x) the determined number of plays of the game and (y) the determined multiplier.

2. The gaming system of claim 1, wherein for each of the determined number of plays of the game, when executed by the at least one gaming device processor of the gaming device of the designated player, the plurality of instructions cause said at least one gaming device processor of the gaming device of the designated player to:

(i) enable the designated player to place a wager to initiate said play of the game;

(ii) generate and display a plurality of symbols;

(iii) determine if any of said generated symbols form any of a plurality of winning symbol combinations;

(iv) if any of said generated symbols form any of said winning symbol combinations, modify a value associated with said generated winning symbol combination by the determined multiplier; and (v) provide the modified value to the designated player.

3. The gaming system of claim 2, wherein the modified values for the number of plays of the game form a total value different than the determined value associated with the triggered loyalty award sequence.

4. The gaming system of claim 1, wherein the determined value is based on at least one selected from the group consisting of: information received from a player tracking system, and an amount of wagers placed.

5. The gaming system of claim 1, wherein the at least one controller is programmed to:

(a) determine to trigger a loyalty award sequence for another one of said identified players, and (b) when the loyalty award sequence is triggered for the other one of said identified players:

(i) for said triggered loyalty award sequence:

(A) determine a value associated with the triggered loyalty award sequence, said value being determined independent of any of the average expected payback percentages of any of the games of any of the gaming devices, (B) determine a number of plays of the game of the gaming device of the other player, wherein said determined number of plays of the game is based, at least in part, on the determined value and the average expected payback percentage of each play of the game of the gaming device of the other player, and (C) determine a multiplier to apply to each of the determined number of plays of the game, wherein said determined multiplier is based on the player tracking level of the other player, (ii) communicate the determined multiplier and the determined number of plays of the game to the gaming device of the other player, and (iii) cause the gaming device of the other player to display at least one of the determined number of plays of the game and the determined multiplier.

6. The gaming system of claim 5, wherein if the determined values for the designated player and the other player are substantially equal, the average expected payback percentage of each play of the games of the gaming devices of the designated player and the other player are substantially equal, the determined number of plays of the games for the triggered loyalty award sequences for the designated player and the other player are substantially equal, and the designated player has a different player tracking level than the other player, the determined multiplier for the triggered loyalty award sequence for the designated player is different than the determined multiplier for the triggered loyalty award sequence for the other player.

7. The gaming system of claim 1, wherein the at least one controller is programmed to cause the gaming device of the designated player to decrease any displayed number of plays of the game for each of a plurality of the games played.

8. A gaming system comprising:

a plurality of gaming devices, each gaming device including:

at least one display device;

at least one input device;

at least one gaming device processor; and at least one memory device which stores a plurality of instructions, which when executed by the at least one processor, cause the at least one processor to operate with the at least one display device and the at least one input device to display a game, each play of said game has an average expected payback percentage; and at least one controller configured to communicate with said gaming devices, wherein the at least one controller is programmed to:

(a) identify each of a plurality of players of a plurality of said gaming devices, wherein each identified player is ranked at one of a plurality of different player tracking levels; and (b) when a loyalty award sequence is triggered for a designated one of said identified players;

(i) determine a value associated with the triggered loyalty award sequence, said value being determined independent of any of the average expected payback percentages of any of the games of any of the gaming devices, (ii) for said triggered loyalty award sequence, determine a multiplier wherein said determined multiplier is based on, at least in part, on the determined value and the average expected payback percentage of each play of the game of the gaming device of the designated player, (iii) for said triggered loyalty award sequence, determine a number of plays of the game of the gaming device of the designated player to apply said determined multiplier, wherein said determined number of plays of the game is based on the player tracking level of the designated player, (iv) communicate the determined number of plays of the game and the determined multiplier to the gaming device of the designated player, and (v) cause the gaming device of the designated player to display at least one of: (x) the determined number of plays of the game and (y) the determined multiplier.

9. The gaming system of claim 8, wherein for each of the determined number of plays of the game, when executed by the at least one gaming device processor of the gaming device of the designated player, the plurality of instructions cause said at least one gaming device processor of the gaming device of the designated player to:

(i) enable the designated player to place a wager to initiate said play of the game;

(ii) generate and display a plurality of symbols;

(iii) determine if any of said generated symbols form any of a plurality of winning symbol combinations;

(iv) if any of said generated symbols form any of said winning symbol combinations, modify a value associated with said generated winning symbol combination by the determined multiplier; and (v) provide the modified value to the designated player.

10. The gaming system of claim 8, wherein the values provided to the designated player during the determined number of plays of the game form a total value different than the determined value associated with the triggered loyalty award sequence.

11. The gaming system of claim 8, wherein the determined value is based on at least one selected from the group consisting of: information received from a player tracking system, and an amount of wagers placed.

12. The gaming system of claim 8, wherein the at least one controller is programmed to:

(a) determine to trigger a loyalty award sequence for another one of said identified players, and (b) when the loyalty award sequence is triggered for the other one of said identified players:

(i) for said triggered loyalty award sequence:

(A) determine a value associated with the triggered loyalty award sequence, said value being determined independent of any of the average expected payback percentages of any of the games of any of the gaming devices, (B) determine a multiplier wherein said determined multiplier is based on, at least in part, on the determined value and the average expected payback percentage of each play of the game of the gaming device of the other player, and (C) determine a number of plays of the game of the gaming device of the other player to apply said determined multiplier, wherein said determined number of plays of the game is based on the player tracking level of the other player, (ii) communicate the determined number of plays of the game and the determined multiplier to the gaming device of the other player, and (iii) cause the gaming device of the other player to display at least one of the determined number of plays of the game and the determined multiplier.

13. The gaming system of claim 12, wherein if the determined values for the designated player and the other player are substantially equal, the average expected payback percentage of each play of the games of the gaming devices of the designated player and the other player are substantially equal, the determined multipliers for the triggered loyalty award sequences for the designated player and the other player are substantially equal and the designated player has a different player tracking level than the other player, the determined number of plays of the game for the triggered loyalty award sequence for the designated player is different than the determined number of plays of the game for the triggered loyalty award sequence for the other player.

14. The gaming system of claim 8, wherein the at least one controller is programmed to cause the gaming device of the designated player to decrease any displayed number of plays of the game for each of a plurality of the games played.

15. A gaming system comprising:

a plurality of gaming devices, each gaming device including:

at least one display device;

at least one input device;

at least one gaming device processor; and at least one memory device which stores a plurality of instructions, which when executed by the at least one processor, cause the at least one processor to operate with the at least one display device and the at least one input device to display a game, each play of said game has an average expected value; and at least one controller configured to communicate with said at least one gaming device, wherein the at least one controller is programmed to:

(a) identify each of a plurality of players of a plurality of said gaming devices, wherein each identified player is ranked at one of a plurality of different player tracking levels; and (b) when a loyalty award sequence is triggered for a designated one of said identified players:

(i) determine a value associated with the triggered loyalty award sequence, said value being determined independent of any of the average expected values of any of the games of any of the gaming devices, (ii) for the triggered loyalty award sequence, determine a number of free plays of the game of said gaming device of the designated player, wherein said determined number of free plays is based, at least in part, on:

(A) the player tracking level of the designated player, (B) the determined value, and (C) the average expected value of each play of the game of the gaming device of the designated player, (iii) communicate the determined number of free plays of the game to the gaming device of the designated player, and (iv) cause the gaming device of the designated player to display the determined number of free plays of the game.

16. The gaming system of claim 15, wherein for each of the determined number of free plays of the game, when executed by the at least one gaming device processor of the gaming device of the designated player, the plurality of instructions cause said at least one gaming device processor of the gaming device of the designated player to:

(i) generate and display a plurality of symbols;

(ii) determine if any of said generated symbols form any of a plurality of winning symbol combinations; and (iii) if any of said generated symbols form any of said winning symbol combinations, provide a value associated with said generated winning symbol combination to the designated player.

17. The gaming system of claim 15, wherein the values provided to the designated player during the determined number of free plays of the game form a total value different than the determined value associated with the triggered loyalty award sequence.

18. The gaming system of claim 15, wherein the determined value is based on at least one selected from the group consisting of: information received from a player tracking system, and an amount of wagers placed.

19. The gaming system of claim 15, wherein the at least one controller is programmed to:

(a) determine to trigger a loyalty award sequence for another one of said identified players, and (b) when the loyalty award sequence is triggered for the other one of said identified players:

(i) determine a value associated with the triggered loyalty award sequence, said value being determined independent of any of the average expected values of any of the games of any of the gaming devices, (ii) for said triggered loyalty award sequence, determine a number of free plays of the game of said gaming device of the other player, wherein said determined number of free plays is based, at least in part, on:

(A) the player tracking level of the other player, (B) the determined value, and (C) the average expected value of each play of the game of the gaming device of the other player, (iii) communicate the determined number of free plays of the game to the gaming device of the other player, and (iv) cause the gaming device of the other player to display the determined number of free plays of the game.

20. The gaming system of claim 19, wherein if the determined values for the designated player and the other player are substantially equal, the average expected payback percentage of each play of the games of the gaming devices of the designated player and the other player are substantially equal, and the designated player has a different player tracking level than the other player, the determined number of free plays of the game for the triggered loyalty award sequence for the designated player is different than the determined number of free plays of the game for the triggered loyalty award sequence for the other player.

21. A method of operating a gaming system, said method comprising:

(a) causing at least one processor to execute a plurality of instructions to identify each of a plurality of players of a plurality of gaming devices, wherein each identified player is ranked at one of a plurality of different player tracking levels; and (b) when a loyalty award sequence is triggered for a designated one of said identified players:

(i) causing the at least one processor to execute the plurality of instructions to determine a value associated with the triggered loyalty award sequence, said value being determined independent of any average expected payback percentage of any games of any of the gaming devices, (ii) for said triggered loyalty award sequence, causing the at least one processor to execute the plurality of instructions to determine a number of plays of a game of the gaming device of the designated player, wherein said determined number of plays of the game is based, at least in part, on the determined value and an average expected payback percentage of each play of the game of the gaming device of the designated player, (iii) for said triggered loyalty award sequence, causing the at least one processor to execute the plurality of instructions to determine a multiplier to apply to each of the determined number of plays of the game, wherein said determined multiplier is based on the player tracking level of the designated player, and (iv) causing the gaming device of the designated player to display at least one of: (x) the determined number of plays of the game and (y) the determined multiplier.

22. The method of claim 21, which includes, for each of the determined number of plays of the game of the gaming device of the designated player:

(i) enabling the designated player to place a wager to initiate said play of the game;

(ii) causing the at least one processor to execute the plurality of instructions to generate a plurality of symbols;

(iii) causing at least one display device to display the plurality of symbols;

(iv) causing the at least one processor to execute the plurality of instructions to determine if any of said generated symbols form any of a plurality of winning symbol combinations;

(iv) if any of said generated symbols form any of said winning symbol combinations, causing the at least one processor to execute the plurality of instructions to modify a value associated with said generated winning symbol combination by the determined multiplier; and (vi) providing the modified value to the designated player.

23. The method of claim 22, wherein the modified values for the number of plays of the game form a total value different than the determined value associated with the triggered loyalty award sequence.

24. The method of claim 21, which includes:

(a) causing the at least one processor to execute the plurality of instructions to determine to trigger a loyalty award sequence for another one of said identified players, and (b) when the loyalty award sequence is triggered for the other one of said identified players:

(i) for said triggered loyalty award sequence:

(A) causing the at least one processor to execute the plurality of instructions to determine a value associated with the triggered loyalty award sequence, said value being determined independent of any of the average expected payback percentages of any of the games of any of the gaming devices, (B) causing the at least one processor to execute the plurality of instructions to determine a number of plays of a game of the gaming device of the other player, wherein said determined number of plays of the game is based, at least in part, on the determined value and an average expected payback percentage of each play of the game of the gaming device of the other player, and (C) causing the at least one processor to execute the plurality of instructions to determine a multiplier to apply to each of the determined number of plays of the game, wherein said determined multiplier is based on the player tracking level of the other player, and (ii) causing the gaming device of the other player to display at least one of the determined number of plays of the game and the determined multiplier.

25. The method of claim 24, wherein if the determined values for the designated player and the other player are substantially equal, the average expected payback percentage of each play of the games of the gaming devices of the designated player and the other player are substantially equal, the determined number of plays of the games for the triggered loyalty award sequences for the designated player and the other player are substantially equal, and the designated player has a different player tracking level than the other player, the determined multiplier for the triggered loyalty award sequence for the designated player is different than the determined multiplier for the triggered loyalty award sequence for the other player.

26. The method of claim 21, which is provided through a data network.

27. The method of claim 26, wherein the data network is an internet.

28. A method of operating a gaming system, said method comprising:

(a) causing at least one processor to execute a plurality of instructions to identifying each of a plurality of players of a plurality of gaming devices, wherein each identified player is ranked at one of a plurality of different player tracking levels; and (b) when a loyalty award sequence is triggered for a designated one of said identified players;

(i) causing the at least one processor to execute the plurality of instructions to determine a value associated with the triggered loyalty award sequence, said value being determined independent of any average expected payback percentage of any games of any of the gaming devices, (ii) for said triggered loyalty award sequence, causing the at least one processor to execute the plurality of instructions to determine a multiplier wherein said determined multiplier is based on, at least in part, on the determined value and an average expected payback percentage of each play of a game of the gaming device of the designated player, (iii) for said triggered loyalty award sequence, causing the at least one processor to execute the plurality of instructions to determine a number of plays of the game of the gaming device of the designated player to apply said determined multiplier, wherein said determined number of plays of the game is based on the player tracking level of the designated player, and (iv) causing the gaming device of the designated player to display at least one of: (x) the determined number of plays of the game and (y) the determined multiplier.

29. The method of claim 28, which includes, for each of the determined number of plays of the game of the gaming device of the designated player:

(i) enabling the designated player to place a wager to initiate said play of the game;

(ii) causing the at least one processor to execute the plurality of instructions to generate a plurality of symbols;

(iii) causing at least one display device to display the plurality of generated symbols;

(iv) causing the at least one processor to execute the plurality of instructions to determine if any of said generated symbols form any of a plurality of winning symbol combinations;

(iv) if any of said generated symbols form any of said winning symbol combinations, causing the at least one processor to execute the plurality of instructions to modify a value associated with said generated winning symbol combination by the determined multiplier; and (vi) providing the modified value to the designated player.

30. The method of claim 28, wherein the values provided to the designated player during the determined number of plays of the game form a total value different than the determined value associated with the triggered loyalty award sequence.

31. The method of claim 28, which includes:

(a) causing the at least one processor to execute the plurality of instructions to determine to trigger a loyalty award sequence for another one of said identified players, and (b) when the loyalty award sequence is triggered for the other one of said identified players:

(i) for said triggered loyalty award sequence:

(A) causing the at least one processor to execute the plurality of instructions to determine a value associated with the triggered loyalty, said value being determined independent of any of the average expected payback percentages of any of the games of any of the gaming devices, (B) causing the at least one processor to execute the plurality of instructions to determine a multiplier wherein said determined multiplier is based on, at least in part, on the determined value and an average expected payback percentage of each play of a game of the gaming device of the other player, and (C) causing the at least one processor to execute the plurality of instructions to determine a number of plays of the game of the gaming device of the other player to apply said determined multiplier, wherein said determined number of plays of the game is based on the player tracking level of the other player, and (ii) causing the gaming device of the other player to display at least one of the determined number of plays of the game and the determined multiplier.

32. The method of claim 31, wherein if the determined values for the designated player and the other player are substantially equal, the average expected payback percentage of each play of the games of the gaming devices of the designated player and the other player are substantially equal, the determined multipliers for the triggered loyalty award sequences for the designated player and the other player are substantially equal and the designated player has a different player tracking level than the other player, the determined number of plays of the game for the triggered loyalty award sequence for the designated player is different than the determined number of plays of the game for the triggered loyalty award sequence for the other player.

33. The method of claim 28, which is provided through a data network.

34. The method of claim 33, wherein the data network is an internet.

35. A method of operating a gaming system, said method comprising:

(a) causing at least one processor to execute a plurality of instructions to identifying each of a plurality of players of a plurality of gaming devices, wherein each identified player is ranked at one of a plurality of different player tracking levels; and (b) when a loyalty award sequence is triggered for a designated one of said identified players:

(i) causing the at least one processor to execute the plurality of instructions to determine a value associated with the triggered loyalty award sequence, said value being determined independent of any average expected value of any games of any of the gaming devices, (ii) for the triggered loyalty award sequence, causing the at least one processor to execute the plurality of instructions to determine a number of free plays of a game of said gaming device of the designated player, wherein said determined number of free plays is based, at least in part, on:

(A) the player tracking level of the designated player, (B) the determined value, and (C) an average expected value of each play of the game of the gaming device of the designated player, and (iii) causing the gaming device of the designated player to display the determined number of free plays of the game.

36. The method of claim 35, which includes, for each of the determined number of free plays of the game of the gaming device of the designated player:

(i) causing the at least one processor to execute the plurality of instructions to generate a plurality of symbols;

(ii) causing at least one display device to display the plurality of generated symbols;

(iii) causing the at least one processor to execute the plurality of instructions to determine if any of said generated symbols form any of a plurality of winning symbol combinations; and (iv) if any of said generated symbols form any of said winning symbol combinations, providing a value associated with said generated winning symbol combination to the designated player.

37. The method of claim 35, wherein the values provided to the designated player during the determined number of free plays of the game form a total value different than the determined value associated with the triggered loyalty award sequence.

38. The method of claim 35, which includes:

(a) causing the at least one processor to execute the plurality of instructions to determine to trigger a loyalty award sequence for another one of said identified players, and (b) when the loyalty award sequence is triggered for the other one of said identified players:

(i) causing the at least one processor to execute the plurality of instructions to determine a value associated with the triggered loyalty award sequence, said value being determined independent of any of the average expected values of any of the games of any of the gaming devices, (ii) for said triggered loyalty award sequence, causing the at least one processor to execute the plurality of instructions to determine a number of free plays of a game of said gaming device of the other player, wherein said determined number of free plays is based, at least in part, on:

(A) the player tracking level of the other player, (B) the determined value, and (C) an average expected value of each play of the game of the gaming device of the other player, and (iii) causing the gaming device of the other player to display the determined number of free plays of the game.

39. The method of claim 38, wherein if the determined values for the designated player and the other player are substantially equal, the average expected payback percentage of each play of the games of the gaming devices of the designated player and the other player are substantially equal, and the designated player has a different player tracking level than the other player, the determined number of free plays of the game for the triggered loyalty award sequence for the designated player is different than the determined number of free plays of the game for the triggered loyalty award sequence for the other player.

40. The method of claim 35, which is provided through a data network.

41. The method of claim 40, wherein the data network is an internet.

* * * * *

UNITED STATES PATENT AND TRADEMARK OFFICE

CERTIFICATE OF CORRECTION

PATENT NO. : 8,210,930 B2
APPLICATION NO. : 11/830115
DATED : July 3, 2012
INVENTOR(S) : Graham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this
Fourth Day of September, 2012

David J. Kappos
*Director of the United States Patent and Trademark Office*

UNITED STATES PATENT AND TRADEMARK OFFICE

CERTIFICATE OF CORRECTION

PATENT NO. : 8,210,930 B2
APPLICATION NO. : 11/830115
DATED : July 3, 2012
INVENTOR(S) : Jacob Graham et al.

It is certified that error appears in the above-identified patent and that said Letters Patent is hereby corrected as shown below:

IN THE CLAIMS

In Claim 1, Column 62, Line 30, insert --gaming device-- before both instances of “processor”.
In Claim 1, Column 62, Line 33, replace “has” with --having--.
In Claim 8, Column 64, Line 13, insert --gaming device-- before both instances of “processor”.
In Claim 8, Column 64, Line 16, replace “has” with --having--.
In Claim 8, Column 64, Line 32, after “multiplier” insert --,--.
In Claim 8, Column 64, Line 33, delete “on”.
In Claim 10, Column 64, Line 66, replace “8” with --9-- and between “the” and “values” insert --modified--.
In Claim 12, Column 65, Line 20, after “multiplier” insert --,--.
In Claim 12, Column 65, Line 21, delete “on”.
In Claim 15, Column 65, Line 61, insert --gaming device-- before both instances of “processor”.
In Claim 15, Column 65, Line 64, replace “has” with --having--.
In Claim 22, Column 67, Line 65, replace “(iv)” with --(v)--.
In Claim 28, Column 68, Line 59, replace “identifying” with --identify--.
In Claim 28, Column 69, Line 6, after “multiplier” insert --,--.
In Claim 28, Column 69, Line 7, delete “on”.
In Claim 29, Column 69, Line 35, replace “(iv)” with --(v)--.
In Claim 30, Column 69, Line 41, between “the” and “values” insert --modified--.
In Claim 31, Column 69, Line 54, between “loyalty” and “,” insert --award sequence--.
In Claim 31, Column 69, Line 59, after “multiplier” insert --,--.
In Claim 31, Column 69, Line 60, delete “on”.
In Claim 35, Column 70, Line 27, replace “identifying” with --identify--.

Signed and Sealed this
Second Day of July, 2013

Teresa Stanek Rea
*Acting Director of the United States Patent and Trademark Office*